Oct. 6, 1936.   W. H. ROBERTSON   2,056,485
CASH REGISTER
Filed Jan. 10, 1930   15 Sheets-Sheet 1

Inventor
William H. Robertson
By
Earl Benist
His Attorney

Oct. 6, 1936.  W. H. ROBERTSON  2,056,485
CASH REGISTER
Filed Jan. 10, 1930   15 Sheets-Sheet 2

Inventor
William H. Robertson
By
Carl Beust
His Attorney

Oct. 6, 1936.  W. H. ROBERTSON  2,056,485
CASH REGISTER
Filed Jan. 10, 1930  15 Sheets-Sheet 3

Inventor
William H. Robertson
By
Carl Beust
His Attorney

Oct. 6, 1936.  W. H. ROBERTSON  2,056,485

CASH REGISTER

Filed Jan. 10, 1930  15 Sheets-Sheet 4

Inventor
William H. Robertson
By
Earl Beust
His Attorney

Oct. 6, 1936.  W. H. ROBERTSON  2,056,485
CASH REGISTER
Filed Jan. 10, 1930    15 Sheets—Sheet 5

Inventor
William H. Robertson
By
Earl Beust
His Attorney

Oct. 6, 1936.  W. H. ROBERTSON  2,056,485
CASH REGISTER
Filed Jan. 10, 1930  15 Sheets-Sheet 6

Inventor
William H. Robertson
By
Carl Beust
His Attorney

Oct. 6, 1936.  W. H. ROBERTSON  2,056,485
CASH REGISTER
Filed Jan. 10, 1930  15 Sheets-Sheet 7
FIG. 14
FIG. 15  FIG. 16
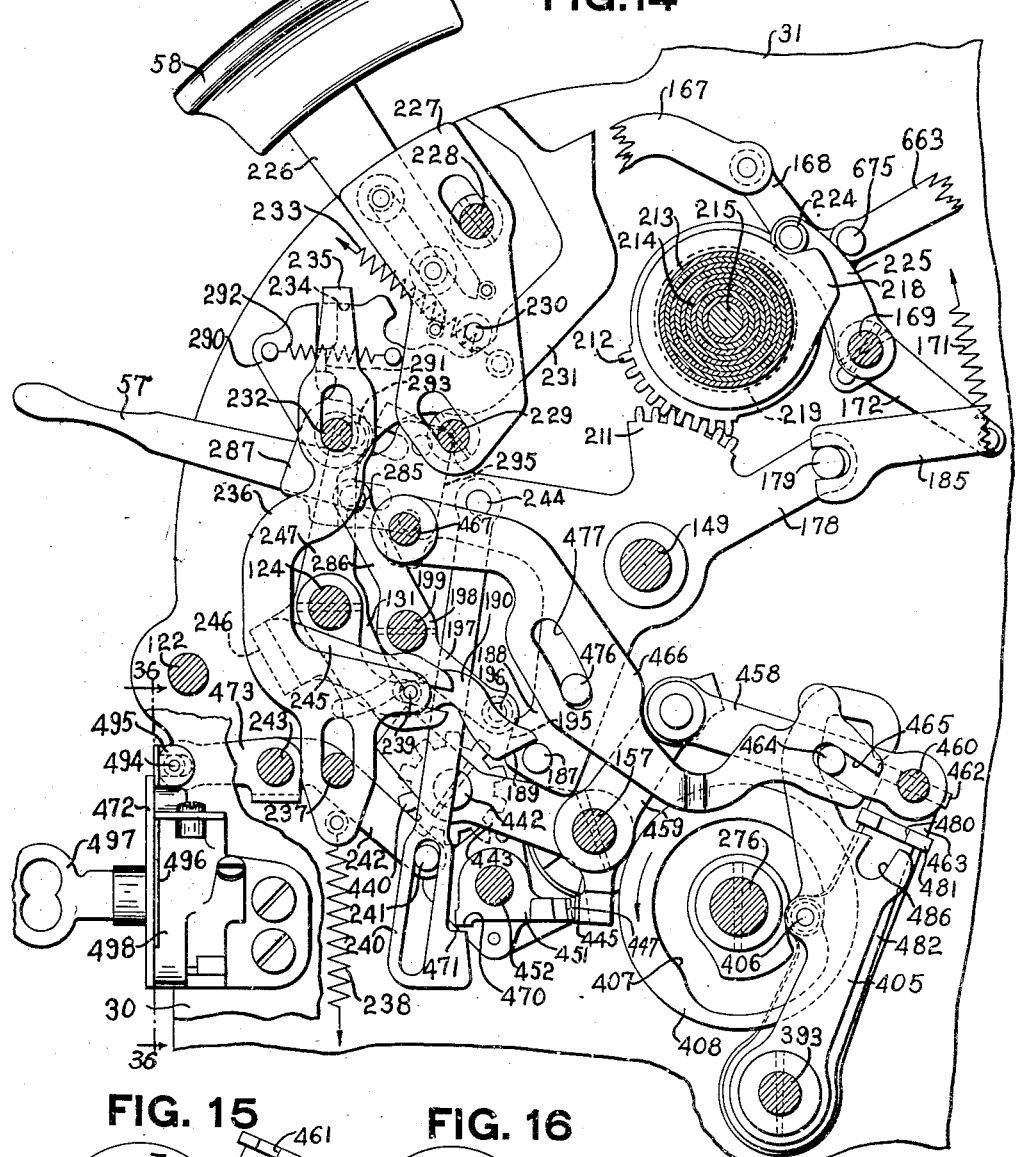
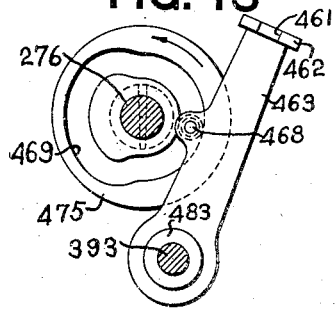
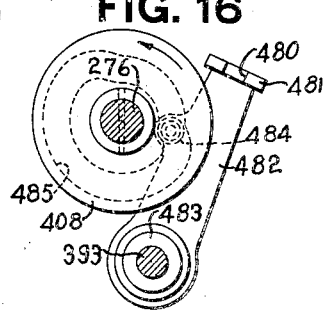
Inventor
William H. Robertson
By Karl Beust
His Attorney Oct. 6, 1936.  W. H. ROBERTSON  2,056,485
CASH REGISTER
Filed Jan. 10, 1930    15 Sheets-Sheet 8

Inventor
William H. Robertson
By
Carl Benst
His Attorney

Oct. 6, 1936.  W. H. ROBERTSON  2,056,485
CASH REGISTER
Filed Jan. 10, 1930  15 Sheets-Sheet 9
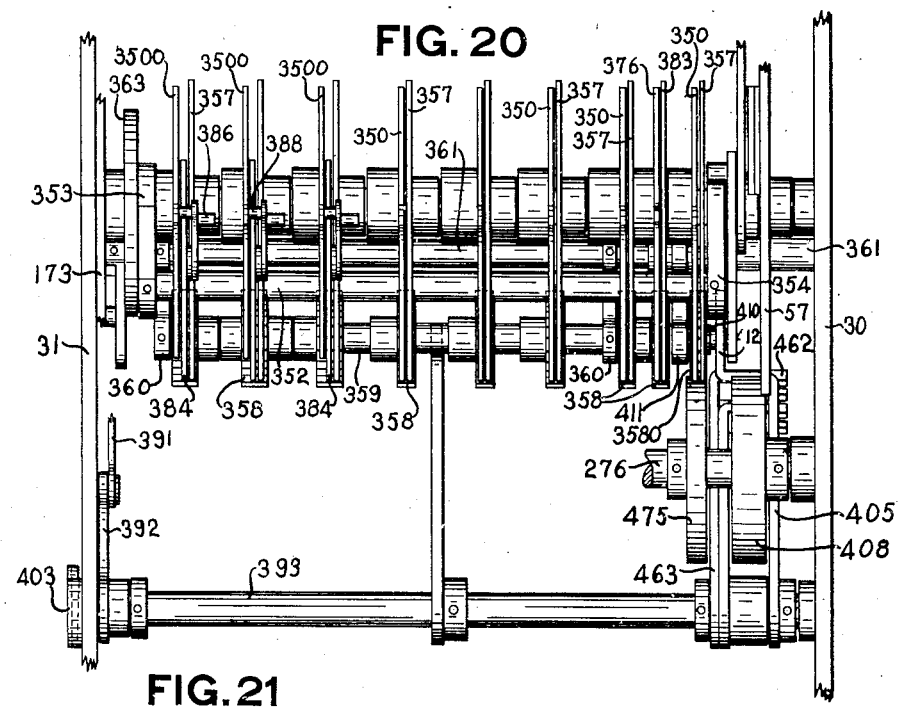
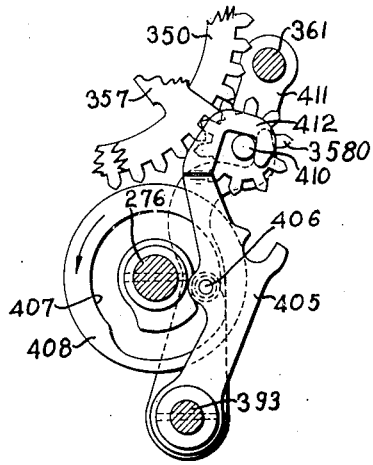
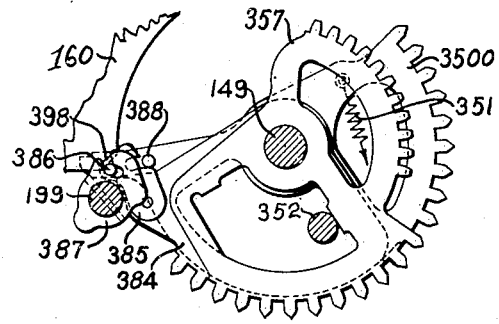
Inventor
William H. Robertson
By
Kearl Beust
His Attorney Oct. 6, 1936. W. H. ROBERTSON 2,056,485
CASH REGISTER
Filed Jan. 10, 1930 15 Sheets-Sheet 10

FIG. 23

Inventor
William H. Robertson
By
Kearl Beust
His Attorney

Oct. 6, 1936.   W. H. ROBERTSON   2,056,485
CASH REGISTER
Filed Jan. 10, 1930   15 Sheets-Sheet 12

Inventor
William H. Robertson
By
Ucarl Beust
His Attorney

Oct. 6, 1936.                W. H. ROBERTSON                2,056,485
                               CASH REGISTER
                         Filed Jan. 10, 1930         15 Sheets-Sheet 13

```
 6 66 6.66        LP   0584  1179
 6 66 6.66        LP   0585  1179
 5 55 5.55        LP   0586  1179
 1 76 5.4 4½INS.  LP   0587  1179
 3 44 5.5 4 COD.  LC   0587  1179
 5 56 0.57½       P    0587  1179
 2 22 2.22        C    0587  1179
    02 4.31       LPZ  0587  1179
    02 4.31       LC   0587  1179
```

PERMIT No. 1179

1  76  5.4 4½INS.
Zone. Wt. Postage.
POSTAGE PAID.
Washington, D.C.

Inventor
William H. Robertson
By
Carl Burst
His Attorney

Oct. 6, 1936.  W. H. ROBERTSON  2,056,485
CASH REGISTER
Filed Jan. 10, 1930   15 Sheets-Sheet 14

Inventor
William H. Robertson
By
Kearl Brust
His Attorney

Oct. 6, 1936.  W. H. ROBERTSON  2,056,485
CASH REGISTER
Filed Jan. 10, 1930   15 Sheets-Sheet 15

Inventor
William H. Robertson
By *Carl Beust*
His Attorney

Patented Oct. 6, 1936

2,056,485

UNITED STATES PATENT OFFICE 2,056,485

CASH REGISTER

William H. Robertson, Dayton, Ohio, assignor to The National Cash Register Company, Dayton, Ohio, a corporation of Maryland Application January 10, 1930, Serial No. 419,988

72 Claims. (Cl. 235—7)

This invention relates to registers and like machines, and more particularly refers to improvements in machines of the type disclosed in Letters Patent of the United States, No. 1,795,509, issued March 10, 1931; No. 1,816,263, issued August 4, 1931; No. 1,924,290, issued August 29, 1933; and No. 1,929,652, issued October 10, 1933, to William H. Robertson.

These patents disclose a type of machine compact in size and light in weight, yet one which is equipped with a full complement of keys and other manipulative devices to control the machine to perform all of the functions of a cash register or an accounting machine, including the accumulation of amounts on any one of a plurality of totalizers which may be selected at will; indicating the amounts registered in the machine; printing the amounts of the registration and other data on an inserted slip, on an issuing check, and on the detail record strip which is retained in the machine; taking totals and subtotals from the several totalizers; printing and indicating the totals; making repeat operations; and, in general, capable of performing all the functions of a much more expensive machine. Machines of the type disclosed in the above-mentioned patents have been adapted for use in motor busses and other media of transportation, ticket offices, telegraph offices, department stores and other business establishments, and is readily adaptable for use in many other types of commercial activities.

In recent years, the now well known postage permit machine, operated under Section 452 of the Postal Laws and Regulations, has been developed, improved and refined to relieve the various post-offices and commercial concerns making use thereof, of the work of cancelling enormous amounts of first-class or letter mail, one effect being to obviate the necessity requiring commercial organization to carry large stocks of valuable stamps which may be mis-appropriated, and another result being to provide a much faster method of stamping envelopes, thereby speeding up the output of mail and saving a great amount of time and labor.

However, such machines are not readily adaptable to the stamping of parcel post packages, due to the wide variety of shapes, sizes and weights of the parcels mailed, and also due to the sliding scale charges for the several parcel post zones. In other words, the postage permit machines now in common use, are set for a fixed amount, whereas a flexible machine is required to handle the wide range of weights, zone and postage charges incident to the transmission by mail of parcel post packages.

It is, therefore, an object of this invention to provide a machine (capable of printing and issuing postage permits) for use in mail order businesses, postoffices, and business establishments wherein a volume of parcels are forwarded by mail.

Another object of the invention is to provide novel means to select one of a plurality of totalizers, by the act of depressing a key.

A further object is to provide mechanism to compel a transfer total operation following a total taking operation, when certain keys are depressed.

Still another object is to provide a machine of the type indicated, with a novel divided key bank mechanism.

A still further object is to provide novel means to directly disable a part of the sectional printing hammer by depression of a certain key.

Still another object is to provide a novel disabling device for the consecutive number printing mechanism.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 14 is a sectional view taken just inside the right side frame of the machine, and showing, in right elevation, the machine releasing mechanism, the total control lever, the totalizer engaging and disengaging mechanism, and the means to control the latter mechanism.

Fig. 15 is a detail view of the cam and arm for engaging and disengaging the totalizer relatively to its actuators on adding operations.

Fig. 16 is a detail view of the cam and cam arm for engaging and disengaging the totalizer relatively to its actuators on "reading" or sub-totalizing operations.

Fig. 20 is a skeletonized view in front elevation of the differential totalizer actuators, the coupling pinions and the totalizer engaging cams and cam arms.

Fig. 21 is a fragmentary view of the mechanism for shifting the transaction coupling pinion into and out of effective position.

Fig. 22 is a detail view of the differential mechanism associated with the overflow banks, that is, the three banks of highest order at the left of the machine.

Fig. 23 is a view in right elevation of the printing mechanism located generally on the right-hand end of the machine.

Fig. 27 is a detail view of the permanent detail paper supply roll and receiving roll, and the operating mechanism therefor. This figure also illustrates the detail paper slackening device.

Fig. 28 is a detail view of the issuing detail paper supply roll and the feeding mechanism therefor.

Fig. 29 is a section of one of the detail strips, both detail strips being identical.

Fig. 30 illustrates one form of printed check or "permit ticket" issued by the machine.

General description

Figure 1:
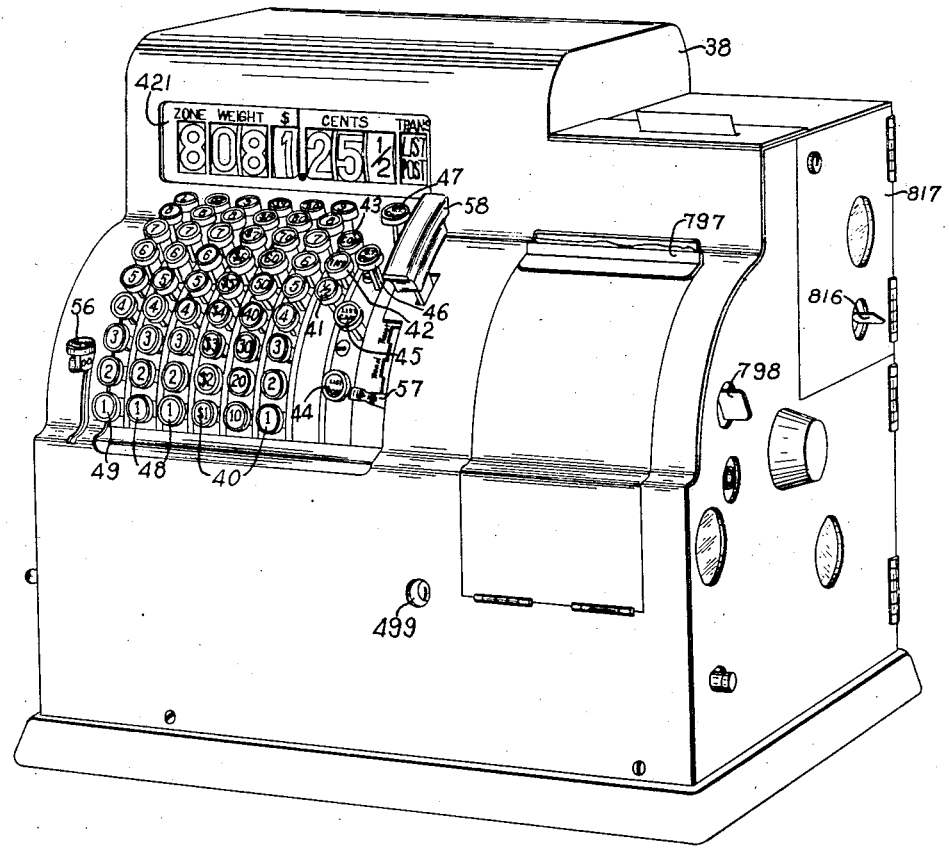
Fig. 1 is a perspective view of the machine.

The machine of the present invention is small, compactly arranged, and is entirely encased in a cabinet provided with an opening to fit around and afford access to a keyboard, having rows of manipulative numeral keys for controlling the registration on the totalizer, of the amounts of postage, other rows of keys being adapted to control the printing of the zone numbers, weights of packages, classification of transactions, and for otherwise controlling the operation of the machine. A lever, projecting through the machine cabinet to the right of the groups of keys, controls the machine to perform adding or totalizing operations. A motor release bar is located to the right of and slightly above the total control lever. To the left of the keyboard is located a repeat key, depression of which controls the machine to repeat exactly, the last operation, and also to release the machine for operation. The entire keyboard, with one exception noted below, is flexible, that is, depression of a key releases the key already depressed in the same row or bank. A manually operated key release lever is also provided, the knob of which projects through the machine cabinet on the left side of the machine. This lever operates mechanism to release all of the depressed keys excepting transaction keys, which can only be released by depression of another key in the same bank. The compact arrangement of the amount and operating control keys enables rapid operation of the machine.

The usual totalizer differential mechanism is provided and operates under the control of the various manipulative devices to add onto a selected totalizer the amount set up on the keyboard, sets up indicators which appear above the keyboard to indicate the entire set-up of the keyboard, and adjusts type carriers in the printing mechanism to print the amounts and other data corresponding to the keys depressed.

A plurality of interspersed totalizers is provided which are arranged in a single line on a shaft, the desired totalizer being selected by depressing its appropriate transaction key, there being, in the present machine, four transaction keys and four interspersed totalizers.

The denominational totalizer actuators or differentials are normally connected to their corresponding auxiliary differential mechanisms by coupling pinions, which are disengaged therefrom at the proper time to permit the totalizer actuator differentials to be adjusted under the control of the depressed keys. Depression of the repeat key disables the means for disengaging these pinions, whereby, without depressing any key but the repeat key, the indicia set up on the last transaction or operation are automatically repeated upon the succeeding operation.

Mechanism is provided which compels the operator to make a repeat operation immediately following that totalizing operation during which a certain totalizer was cleared or reset to zero. In effecting this result, however, the repeat key is not depressed, the total control lever, when shifted to condition the machine to make the particular totalizing operation, also being utilized to set the mechanism to accomplish the functions of the repeat key, except that it does not release the machine for operation. This release is effected when a "transfer total" operation is initiated by depression of the motor bar in the usual manner.

The indicators are similar in structure and operation to those disclosed in the Robertson patent and applications referred to above, and are adapted to be set under the control of the keys to indicate the zone, weight of package, amount of postage, and the kind of transaction.

The printing mechanism is located generally to the right of the break or step in the top of the machine cabinet. This mechanism prints the information set up on the keyboard, and in addition, the date, consecutive number, "Permit No.", "Postage Paid" and the place from which the parcel is mailed, on a strip or web of gummed check paper fed from a supply roll in the machine. The printed portion of the check paper is then severed from the web to form the "permit ticket", which is fed out of the machine. These tickets are removed as they are issued, moistened, and attached to the correct parcels by the operator.

The information set up on the keyboard is also printed on at least two strips of paper at the same operation on which the "permit ticket" is printed. One of these strips, known as the "issuing record strip", is issued from the machine, and the other strip of paper, having the same data printed thereon, is retained in the machine and is known as the "permanent record". As each "permit ticket" is printed and issued, the same data are printed on the "issuing detail strip", and before this strip is detached from its web, the machine is operated to take a total of a group of parcels.

The purpose of issuing the detail record strip is to enable a compact record of a plurality of parcels to be made, detached and sent to the postoffice along with the parcels, where it forms a convenient medium for checking the parcels and the amount of postage. The "permanent record strip" is, of course, retained in the machine under lock and key. At certain periods or intervals, this strip may be removed for checking purposes by either the postal authorities or the executives of those business concerns which avail themselves of permit mailing privileges provided under Section 452 of the Postal Laws and Regulations.

This machine, when used by a mail order house or other business concern having a large number of parcels to ship by parcel post, offers a great many advantages over the old method of laboriously affixing denominational stamps at the postoffice. A few of the more salient of these advantages are as follows:

It is not necessary to purchase stocks of valuable stamps and store them at the place of business. Instead, a stock of paper rolls gummed on one side and having very little commercial value may be carried. The face values of all stamps issued by the machine are accumulated on locked totalizers accessible only to the duly authorized postoffice officials, so that no mis-manipulation of the account can be effected. It provides means to accurately check correctness as to zone, weight and amount, and to control the stamps issued. An accurate list of the values of all stamps issued, together with the total value of the same, is kept locked in the machine for checking purposes. When used in post-offices, the machine obviates the necessity of carrying a stock of stamps of various denominations at the parcel post windows, and saves the checking and re-checking of the amount and kind of stamps on hand. Moreover, and of first importance, is the fact that the machine saves time by providing one stamp for any desired amount.

*Main frame*

The main body of the machine is supported between two side frames, a right side frame 30 (Figs. 12, 20 and 24), and a left side frame 31 (Figs. 3, 4, 7, 12, 13, 14 and 20). The side frames 30 and 31 are secured to a base 32 (Fig. 7) and are rigidly connected by a cross frame or partition 33, and by a tie-bar 34 located at the central and front portions of the machine, respectively, and of which further mention will be made later in the specification.

Indicator end frames 35 and 36 are secured to and lie adjacent the side frames 30 and 31, respectively, to support the indicator mechanism. Another tie bar 37 (Fig. 7) connects these indicator end frames at the rear of the machine, and besides acting as a strengthening member between the indicator frames, also provides a convenient anchorage and backing for a cabinet 38, which encases the entire machine, and which is secured at various points to the base 32 of the machine.

*Keyboard*

The keyboard of the machine selected to illustrate the present invention, is generally the same as those disclosed in the Robertson Patents Nos. 1,816,263, 1,924,290, and 1,929,652 above referred to. Besides a plurality of banks of amount keys 40, (Figs. 1 and 3), the keyboard of the present machine includes a split or divided bank of keys containing a ½ cent key 41, (Figs. 1 and 4), for registering amounts of postage ending in such fraction, an "insured" key 42, and a "C. O. D." key 43. The latter two keys control the setting of type wheels to print identifying characters on the "permit tickets" and on two detail record strips, but do not control the setting of corresponding indicators. However, mechanism, like that shown, could readily be associated with the keys 42 and 43, if desired, to enable them to control an indicator.

A group of transaction keys 44, 45, 46 and 47 (Figs. 1, 7 and 8) controls a differential to set an indicator and type wheel to indicate and print characters designating the kind of transaction registered. These keys, respectively, bear the following legends—"List Postage", "List Cancellations", "Group Totals", and "Group Total Cancellations". Depression of any one of these transaction keys shifts the totalizer line to select the corresponding totalizer and sets certain mechanism to permit the machine to be released for actuation. To the left of the amount keys 40 (Fig. 1) are located banks of "weight keys" 48, and a bank of "zone" keys 49, which control their respective differential mechanisms to set the indicators and type elements to indicate and print characters indicating the weight of the parcel and the zone to which it is to be shipped.

A repeat key 56 (Figs. 1 and 13) projecting through a slot in the cabinet 38 to the left of the main keyboard (Fig. 1) controls the machine to repeat the registration of the amount last set up on the keyboard, or handled by the machine.

A total control lever 57 (Figs. 1 and 14) projecting through a slot in the cabinet to the right of the transaction keys 44—47, provides a convenient means to condition the machine to perform totalizing, sub-totalizing and adding operations. A machine release or "motor release" key bar 58 (Figs. 1 and 14) is located also to the right of the transaction keys. Depression of this bar releases the machine for operation, it being first necessary, however, to depress one of the transaction keys 44—47. A detailed description of the keyboard mechanism and the mechanisms operated and controlled by manipulation of the various components thereof follows.

Amount keys

Figure 2:
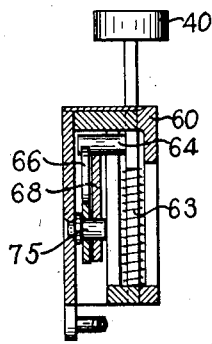
Fig. 2 is a sectional view through one of the amount key banks taken on line 2—2 (Fig. 3).
Figure 3:
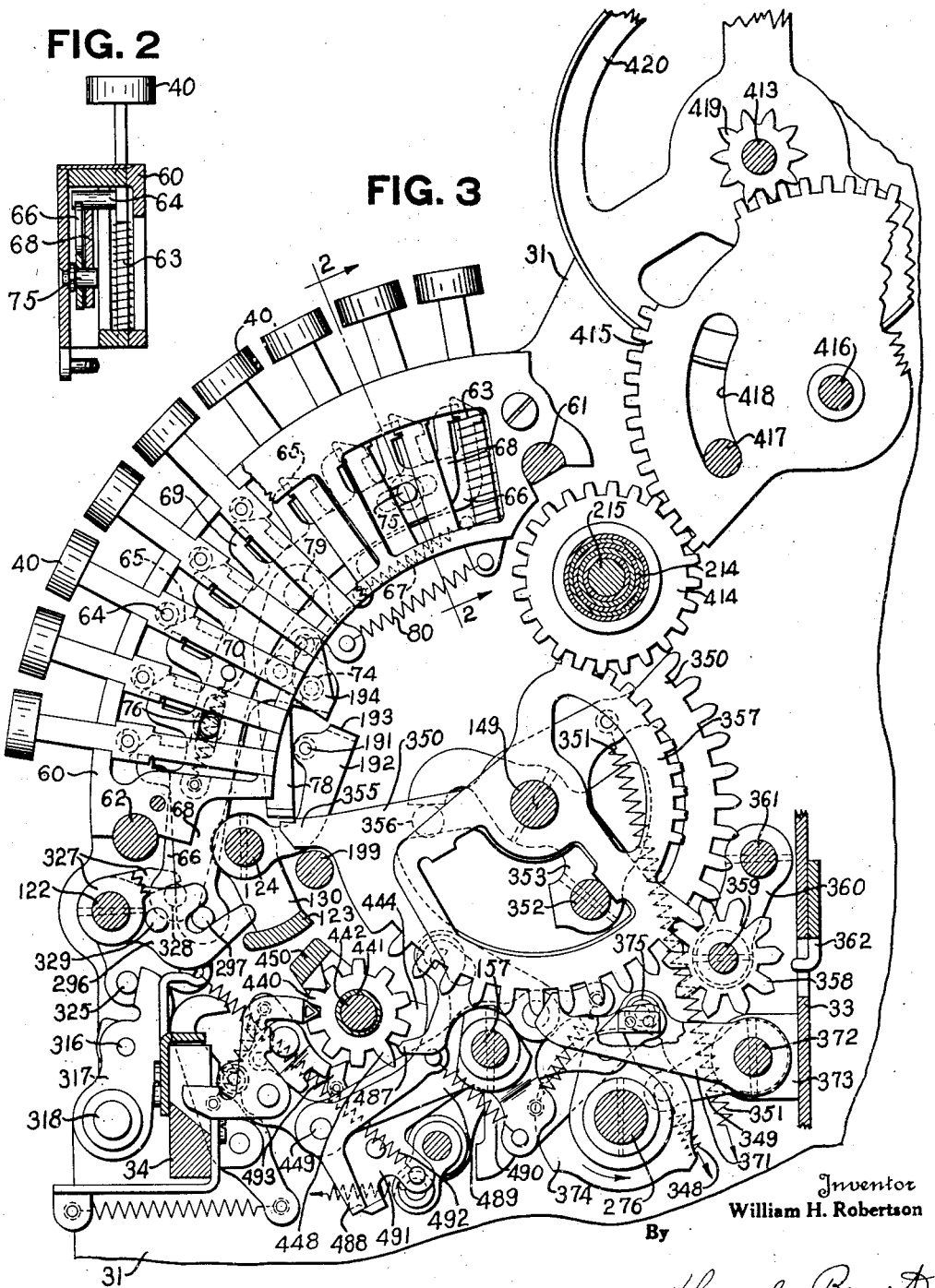
Fig. 3 is a transverse sectional view through the machine, taken to the right of one of the amount banks and showing an amount key bank, the differential mechanism associated therewith, and the indicator mechanism in right elevation.
Figure 4:
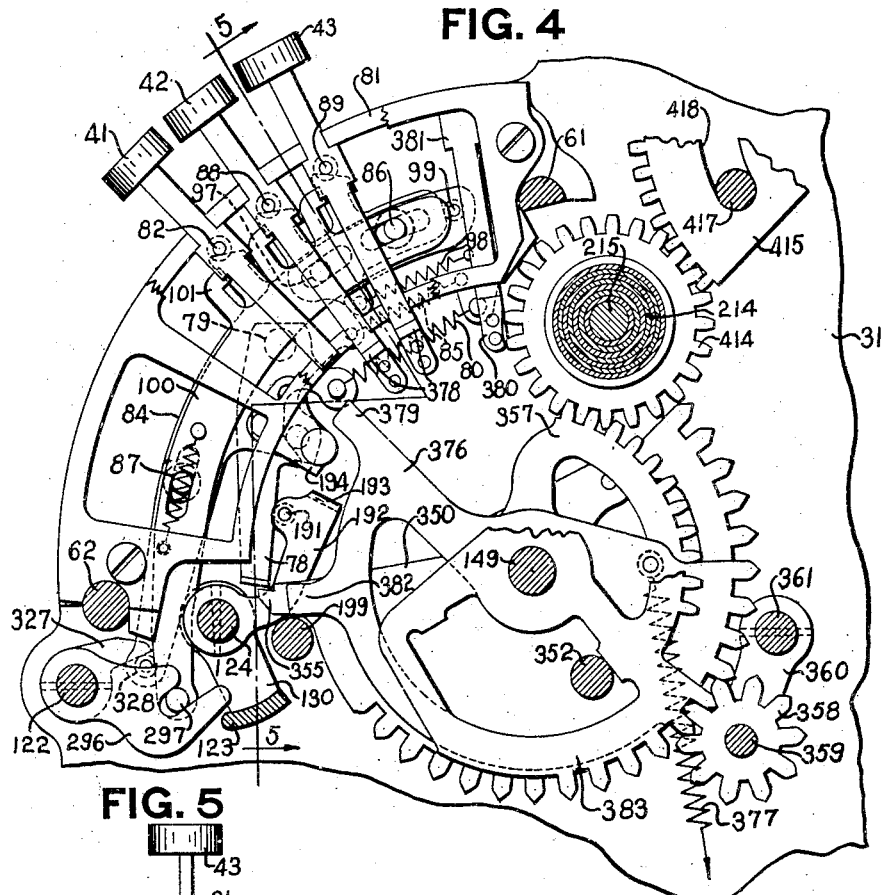
Fig. 4 is a detail view in right elevation of the divided or one-half cent key bank.
Figure 5:
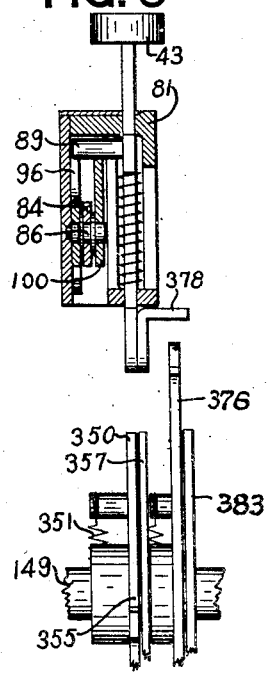
Fig. 5 is a view, partly in section and partly in front elevation, taken, generally, on line 5—5 (Fig. 4).

The machine illustrated is provided with three banks of amount keys 40 (Figs. 1, 2 and 3), the keys of each bank being slidably mounted in their respective denominational key frames 60 (shown partly broken away for clearness in Fig. 3). Each key frame 60 is supported at its upper and lower ends, respectively, by cross rods 61 and 62 carried by and extending between the side frames 30 and 31 of the machine. Key springs 63, only one of which is shown, coiled about the shanks of the individual keys, normally hold the keys in and return them to their undepressed positions.

Any key 40 (Fig. 2), when depressed, causes its key pin 64, one of which is secured to the shank of each of the amount keys, to wipe along the beveled edge of a shouldered projection 65 (Fig. 3) on a flexible detent bar 66 and cam the detent bar downwardly until the particular key pin 64 has passed the shoulder on the projection 65, whereupon a restoring spring 67 pulls the detent bar 66 back towards its normal position to engage the shoulder on the projection 65 over the key pin 64, and thereby hold the key in its depressed position. The detent bar 66 is longitudinally slotted near its upper and lower ends to accommodate supporting and guide studs 75 and 76 (Figs. 2 and 3) projecting inwardly from one wall of the U-shaped key frame 60.

Each bank of amount keys, and the divided bank also, is provided with its individual zero stop 78 (Fig. 3) pivoted at 79 to the respective key frames 60, to normally arrest the individual differential mechanisms associated therewith in their zero positions when the machine is operated with no key depressed in certain of the banks. When a detent bar 66 is forced downwardly by depression of a key in its associated bank, a stud 74 carried by a lug on the bar, contacts and rocks the zero stop 78 to its ineffective position out of the path of the differential mechanism. When the key is released near the end of the operation, and the spring 67 restores the detent bar 66 to its normal position, a spring 80 returns the zero stop 78 to its normal effective position in the path of its differential mechanism.

Differential mechanism

The amount keys 40, when depressed, control the excursions of differential mechanisms appropriate to the respective amount banks of keys to determine the items which may be registered on the selected totalizer.

The differential mechanism provided in the machine chosen to illustrate the present invention is substantially the same as that disclosed in the Robertson patents, Nos. 1,816,263, 1,924,290, and 1,929,652, mentioned above, and for this reason only a brief description thereof will be included in this specification.

The differentials are of the spring-actuated type and are identical for the amount banks and the transaction banks. The differentials associated with the one-half cent key bank or divided bank, and those of the weight and zone key banks embody a few differences in structure and operation which will be fully described in due course.

Amount differentials

The individual differentials associated with the respective amount banks are identical, and in this connection the movements of the parts will be described as when performing an adding operation.

An amount differential includes an actuator 350, (Fig. 3), journaled on the differential supporting shaft 149 and constantly urged to rotate in clockwise direction by a spring 351, secured at one end thereto. A restraining and restoring bail 352, including a universal rod extending between two arms 353, (Figs. 3 and 11), and 354, (Fig. 7), fast on the shaft 149, normally restrains all the actuators 350 in their home positions. When the machine is operated, mechanism, to be described later, rocks the shaft 149, and the restraining and restoring bail 352 first clockwise and then counter-clockwise through an invariable path of travel.

As the bail 352 is withdrawn from in front of the actuator 350, the latter follows the bail under the influence of its spring 351 until the actuator is arrested by contact of a finger 355 extending forwardly from the actuator, with either the corresponding zero stop 78 or the inner end of a depressed key 40. The bail 352 completes its invariable advance, and on its return or counter-clockwise movement, picks up the actuator 350 and restores it to its normal position. The stud 356 (dotted lines, Fig. 3) projecting from the frame 31 limits the movement in both directions of the universal bail 352. The actuators 350 corresponding in denomination to the banks wherein keys have been depressed, advance until arrested by the inner ends of the depressed keys, after which the universal bail completes its clockwise travel.

Shortly after the universal bail 352 arrives at the end of its clockwise movement, and before it starts its return travel, a totalizer 441, to be later described, rocks into engagement with the actuators 350, and as the advanced actuators are restored by the bail 352 on its return, they advance their correspnding totalizer wheels to add thereon an amount equal in value to the keys depressed.

Of course, if no key has been depressed in a bank, the zero stop 78 arrests its actuator 350 before the latter has advanced an appreciable distance, and although the corresponding totalizer wheel 441 is engaged with its actuator, at the usual time, the actuator is not restored by the bail 352 until the latter has practically arrived in its home position, so that the totalizer wheel is not rotated.

A skeleton segmental gear 357 is journaled alongside each actuator 350 on the supporting shaft 149 to enable the actuators to set their corresponding indicators and type carriers, to be described later.

The skeleton setting segments 357 are under control of the universal restraining and restoring bail 352 which passes through the space between two of the spokes of the respective setting segments, but there being no driving spring for the setting segments, the latter, at the beginning of an operation, remain in the positions in which they were set at the preceding operation.

Hence, at the beginning of an operation, the universal bail 352 will pick up the setting segments 357 at whichever positions they may have been left at the end of the preceding operation, and will restore the segments to their home positions.

It is to be noted that the home positions of the adding segments or actuators 350 and the setting segments 357 lie at the respective opposite limits of travel of the universal bail.

Coupling pinions

Coupling pinions 358 rotatively mounted on a rod 359 supported by a pair of arms 360 fast on a shaft 361 supported in the frames 30 and 31, the whole constituting a swinging frame for the pinions, normally couple the respective denominational setting segments 357 and their actuators 350 in pairs. However, just before the universal bail 352 begins its clockwise travel to permit the springs 351 to advance the actuators, mechanism, to be described later, operates to rock the shaft 361 counter-clockwise to carry the coupling pinions 358 out of mesh with the actuators 350 and the setting sements 357, to enable independent movement of these parts. An aligner comb 362 (Fig. 3) secured to the back plate or frame 33, with which the coupling pinions 358 engage as they are disengaged from the setting segments 357 and actuators 350, prevents the coupling pinions 358 from turning when out of mesh with the actuators 350 and segments 357. The aligner 362 also insures proper meshing of the pinions with the actuators and segments when the pinions are re-engaged with these parts, at or just prior to the time when the universal bail starts its return to its normal position. At this time the actuators 350 have either been differentially set under control of depressed keys 40, or have been arrested by their zero stops 78, and the setting segments 357 having been restored to their home positions by the universal bail. Immediately thereafter the coupling pinions 358 are rocked into mesh with both the actuators and the segments.

The universal bail 352 then commences its counter-clockwise return to restore the advanced actuators 350 to normal positions and the actuators, through the coupling pinions, rock the setting segments 357 counter-clockwise a distance equal in steps of movement to the distance advanced by the actuators which corresponds with the values of the depressed keys. Thus, if an actuator 350, when advanced clockwise by the spring 351, is stopped by the inner end of the "7" key, its counter-clockwise travel, when returned by the universal bail 352, amounts to seven steps, which extent of travel is transmitted to the corresponding setting segment 357 by the broad coupling pinion 358, thereby moving the setting segment seven steps to set the particular indicator and type carrier adapted to be adjusted thereby, to the "7" position.

Figures 10, 11:
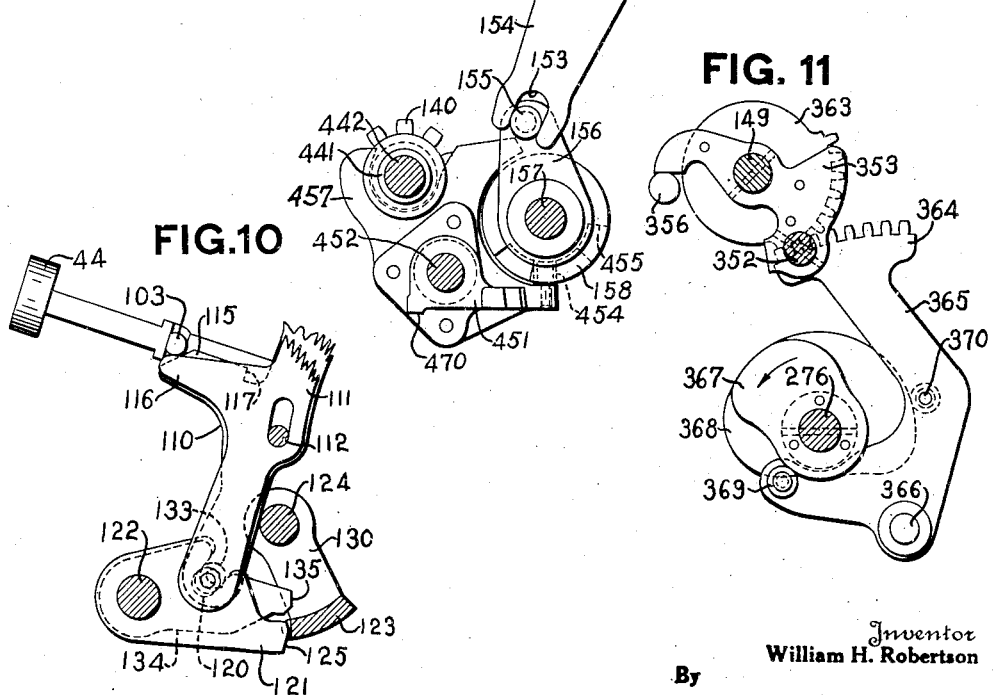
Fig. 10 is an enlarged fragmentary view of a means to compel depression of a transaction key before the machine may be released for operation, and to compel complete depression of the transaction key.
Fig. 11 is a detail view of the differential actuator driving mechanism.

The mechanism for driving the supporting shaft 149 and universal bail 352 through its invariable oscillatory movement, is best shown in Fig. 11.

The main drive shaft 276 extends between and is suitably journaled in the machine side frames 30 and 31, and is given one complete rotation at each operation of the machine.

Cam plates 367 and 368 hubbed together and fast on the drive shaft 276 cooperate with projections 369, 370 respectively, on the respective arms of a bell crank 365 pivoted at 366 to the side frame 31.

A segment 364 on one arm of the bell crank 365, meshes with a partial gear 363 fast on the differential supporting shaft 149.

When the drive shaft 276 rotates in counter-clockwise direction, the cam 367, acting on the projection 369, rocks the bell crank 365 and segment 364 counter-clockwise to rock the partial gear 363, and supporting shaft 149 clockwise. The universal bail 352 with its arms 353, being fast on the differential supporting shaft 149, rocks clockwise therewith away from the actuators 350 to free the latter to the action of their drive springs 351 which advance the actuators as the universal bail retreats.

When the universal bail arrives at the limit of its travel farthest from its home position, the cam 367 is provided with a short dwell during which the bail remains at such limit of travel to afford time within which the totalizer is engaged with the advanced actuators, and other mechanism is adjusted, after which the cam 368, acting on the projection 370, rocks the bell crank 365 and segment 364 clockwise to rock the shaft 149 and swing the universal bail 352 counter-clockwise to normal.

Coupling pinion operating mechanism

The coupling pinions 358 for the amount, divided bank, weight and zone differentials are rocked out of mesh with their respective actuators 350 and setting segments 357 shortly after the beginning of adding and totalizing operations of the machine. The coupling pinions 358 are held out of mesh until after the actuators have been differentially positioned under the control of the depressed keys, the zero stop arms 78, or the totalizer wheels 440, and are then re-engaged with the actuators and segments. The coupling pinions 358 associated with the amount, divided bank, weight and zone differentials are disengaged from their differentials and re-engaged therewith at each operation of the machine, whether the operation be an adding, a "reading" or a "resetting" operation, but are held in mesh with their actuators throughout the entire operation of the machine on repeat operations, as it is not desired to change the relative radial positions of the respective actuators 350 and their companion setting segments 357 on such operations.

The mechanism for operating the coupling pinion shaft 361, best shown in Figs. 13 and 14, will now be described.

An arm 389 (Fig. 13) fast on the shaft 361 carries a stud 390 normally engaged by a notched link 391 pivoted at its lower end to an inverted U-shaped arm 392 journaled on a shaft 393 extending between the side frames 30—31. A stud 395 in the upper end of the link 391 projects through a slot 396 in the repeat lever 174 to guide the link 391 in its travel and to hold the notch therein engaged with the stud 390 of the arm 389.

Figure 19:
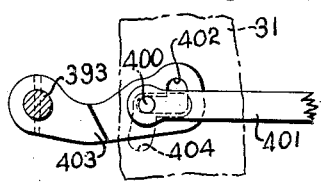
Fig. 19 is a fragmentary view of the means to disconnect the coupling pinion actuating mechanism from its driving mechanism.
Figure 19A:
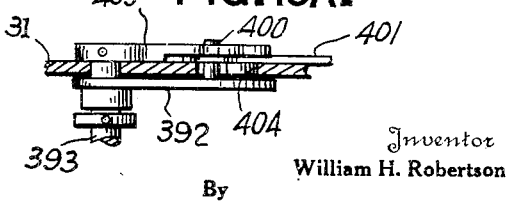
Fig. 19A is a detail plan view of part of the means to disconnect the coupling pinion actuating mechanism from its driving mechanism.

The free end of the arm 392 is enlarged and has formed therein a slot 394. One end of a drive link 401 projects between the end of the bent arm 392 and the adjacent end of an arm 403 fast on the shaft 393, and having an L-shaped slot 402 formed therein. A coupling stud 400 projecting from opposite sides of the link 401 extends into both the slot 394 and the slot 402. The inverted U-shaped arm 392 lies adjacent the inside of the left side frame 31 (see Fig. 20), and the arm 403 occupies a similar position just outside the left side frame 31. The arm 403 (Figs. 19 and 19A) is cut away at its free end to admit the link 401 between this arm and the frame. The coupling stud 400 projects through an inverted L-shaped slot 404 (Fig. 19) in the frame 31. An arm 405, (Figs. 14 and 20), fast on the shaft 393 immediately inside the right side frame 30, carries a stud 406 projecting into a cam groove 407 in the face of a cam disk 408 fast on the drive shaft 276.

When the shaft 276 and cam disk 408 rotate counter-clockwise the walls of the cam groove 407 rock the arm 405 and shaft 393 clockwise. This rocks the arm 403 (Figs. 13 and 19), and through the coupling stud 400, rocks the bent arm 392 clockwise, drawing the link 391 downwardly to rock the arm 389 and the shaft 361 counter-clockwise, and with them the coupling pinion frame including arms 360 and 359 to disengage the coupling pinions 358 from the actuators 350 (Figs. 2, 3 and 7) and 376 (Fig. 4) and their setting segments 357, thereby enabling the actuators, upon withdrawal of the universal bail 352, to be differentially positioned under the control of the depressed keys, or if no key is depressed, then the actuators are arrested under the control of the zero stop arms 78.

Thereupon, the walls of the cam groove 407 rock the arm 405, shaft 393 and arm 403, and by means of the stud 400, the bent arm 392, counter-clockwise to raise the link 391, to re-engage the coupling pinions 358 with their respective actuators and setting segments. The universal bail 352 is now returned in counter-clockwise direction to restore the actuators 350 to their normal positions, adding the amounts on the totalizer and setting the type wheels and indicators by the setting segments 357, as hereinafter explained.

During such operations, the coupling stud 400 lies near the parallel left-hand ends (Figs. 13, 18 and 19) of the slot 394 in the bent arm 392 and the L-shaped slot 402 in the arm 403 to maintain these arms coupled, the stud traversing the vertical portion of the slot 404 in the side frame 31.

The coupling pinion 358 for the actuator 350 and setting segment 357 appropriate to the transaction bank of keys, although alined with the coupling pinions 358 of the amount banks of keys, is capable of swinging independently thereof, a control separate from that for the coupling pinions of the amount banks, being provided, as will be explained in connection with the transaction bank of keys.

Transaction coupling pinion

Because any of the transaction keys 44, 45, 46 and 47 remain depressed until the depression of another key in the same bank releases the previously depressed key, it is necessary to prevent repeat operations from affecting the control of the differential mechanism of this bank of keys. Otherwise damage to the machine would occur on repeat operations. To this end, the coupling pinion 358D (Figs. 7, 20 and 21) for the transaction differential mechanism is disengaged and re-engaged at each operation of the machine irrespective of the kind of operation performed. Due to this fact, it is necessary to provide separate means for supporting and actuating the coupling pinion.

The pinion 358D for the transaction differential is rotatively mounted on a stud 410 carried on an arm 411 loose on the shaft 361 and separate from the arms 360 supporting the rod 359 on which the coupling pinions 358 for the amount banks are journaled. The stud 410 projects through a hook 412 (Fig. 21) extending upwardly from the arm 405 (Figs. 14, 20 and 21) which, it will be remembered, is rocked clockwise and then counter-clockwise at each operation of the machine by the cam 408. The arm 405, through the hook 412 and stud 410, rocks the coupling pinion 358D for the transaction differential, first, out of mesh with the actuator 350 and setting segment 357 associated therewith at the beginning of each forward stroke, and then re-engages the pinion therewith at the beginning of the return stroke.

Indicators

The denominationally arranged differential mechanisms, corresponding with the denominational banks of amount keys 40, are associated with and set denominational indicators to indicate the values, or other data, determined by the keys depressed. These indicators are of the same type, and are set in the same manner, as those disclosed in the Robertson patents, Nos. 1,816,263, and 1,929,652 mentioned above. However, a brief description of the indicators will be given here.

The indicators are all rotatively mounted on a shaft 413 supported between the indicator frames 35 and 36, secured to the side frames 31 and 32. The indicators are all alike except for certain indicia peculiar to certain banks of keys. They are, however, set in the same manner, therefore, it is thought that a description of one of the indicators and its setting means will suffice.

A setting segment 357 (Fig. 3) meshes with a gear 414 secured to one end of one of the nested tubes 214 surrounding the shaft 215 which, with the tubes, extends into the printing mechanism to set type carriers as hereinafter explained. The gear 414 meshes with one of two sets of teeth formed on a segmental gear 415, the segmental gear being journaled on a rod 416 supported in the side frames 30 and 31. A universal stop rod 417, also supported between the side frames, extends through an arcuate slot 418 in the segmental gear 415. Another set of teeth on the segmental gear 415 meshes with an indicator pinion 419 secured to the hub of an indicator wheel 420.

The pinions 419 and their indicator wheels 420 are journaled on a cross rod 413 extending across the machine and mounted at its opposite ends in the indicator side frames 35 and 36.

It is obvious that the differential setting of the setting segment 357 is transmitted through this train of gears to the indicator 420, thereby setting the indicator to display amounts or other data, corresponding to the particular key depressed, through a sight opening 421 in the cabinet just above the keyboard, as is plainly evident in Fig. 1.

Indicator aligner

Figure 7:
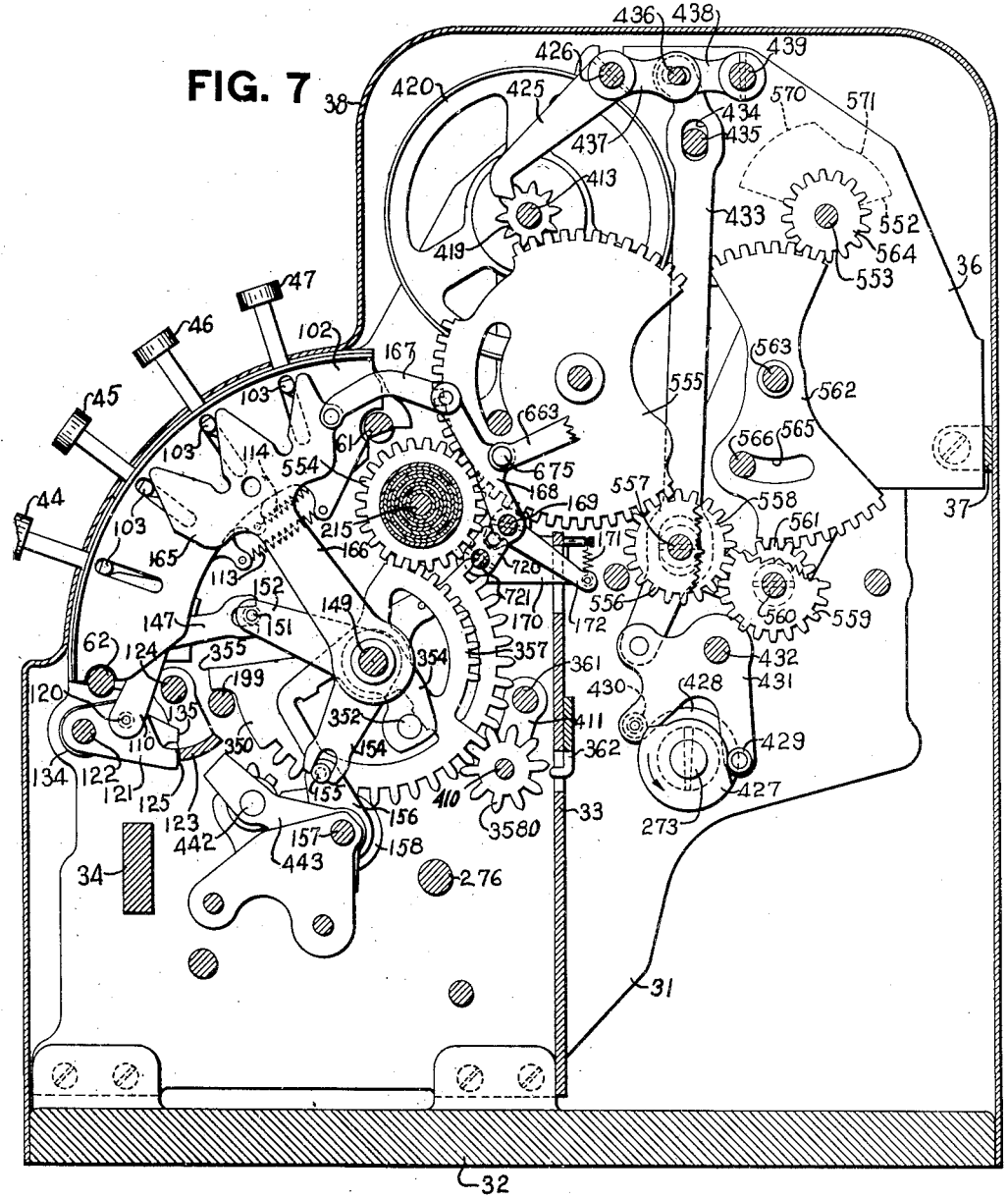
Fig. 7 is a transverse sectional view through the machine, taken to the right of and showing in right elevation the bank of transaction keys.

Before the indicator wheel 420 can be rotated to display the new setting, it is necessary to rock a normally engaged aligner finger 425 (Fig. 7)

out of engagement with the teeth of the indicator pinion 419. There is an aligner finger 425 for each of the indicators. These fingers are all fast on an aligner shaft 426 extending between and journaled in the indicator frames 35 and 36, and are engaged with and disengaged from the respective indicator pinions 419 under the control of a pair of cams 427 and 428, fast on the inner end of a short restoring shaft 273 driven by the motor, as hereinafter explained. As the cams 427 and 428 rotate counter-clockwise with the shaft 273, they coact with projections 429 and 430, respectively, on a bell crank 431 journaled on a cross rod 432 supported at its opposite ends in the side frames 30 and 31, to rock this bell crank first counterclockwise and then clockwise to lower and then raise a link 433 pivotally connected at one end to the bell crank 431, and having its upper end guided by a cross rod 435 passing through a slot 434 in the link and connecting the indicator frames 35 and 36.

A stud 436 on the upper end of the link 433 projects through a slot in an arm 437 fast on the indicator aligner shaft 426 and communicates the reciprocating movement of the link 433 to the indicator shaft 426 to rock this shaft first clockwise to disengage the aligner fingers 425, and then counter-clockwise to re-engage the aligner fingers with their respective pinions 419. The stud 436 in the upper end of the link 433 also projects through a slot in an arm 438 fast on a shaft 439 extending between and journaled at its opposite ends in the indicator frames 36 to rock this shaft first counter-clockwise and then clockwise as the cams 427—428 lower and then raise the link 433. Both the indicator aligning shaft 426 and the shaft 439 extend into the printing mechanism located to the right of the right side frame 30 of the machine, where they control the operation of the permanent detail impression hammer in a manner and by mechanism to be described later.

*Multiple totalizers*

The totalizers of the present machine are similar in structure and operation to those disclosed in the above mentioned patent and co-pending applications, especially the multiple interspersed totalizers of the Robertson patent, No. 1,924,290, the chief difference being that the totalizers in the machine of the prior patent just mentioned are selected manually by a manipulative crank which, when turned, slides the totalizer frame axially of the guide rod on which it is mounted, to bring the desired set of totalizer wheels into alignment with the totalizer actuators.

In the machine chosen to illustrate the present invention, depression of any one of the transaction or totalizer selecting keys 44 to 47, inclusive, shifts the plurality of totalizers longitudinally in the machine to select the particular totalizer corresponding to the key depressed.

The drawings in the present case disclose four interspersed sets of totalizers and four totalizer selecting keys. It is to be understood, however, that the number of sets of totalizers and the selecting keys therefor may be varied without departing from the spirit and scope of the invention.

Each totalizer consists of a plurality of totalizer wheels 440 (Figs. 3, 12 and 14) interspersed in a plurality of spaced denominational groups along a tube 441 slidably mounted on a cross rod 442, the opposite ends of which are secured in a pair of spaced brackets 443 and 444 fast on the totalizer supporting shaft 157 journaled at its opposite ends in the machine side frames 30 and 31. The brackets 443 and 444 joined by the axle rod 442, the totalizer frame supporting shaft 157, and an aligner bar 450 for the totalizers, carried between the free ends of the brackets, form a rigid totalizer frame adapted to be rocked clockwise and counter-clockwise, as viewed in Fig. 14, to engage the selected totalizer with and disengage it from the actuators 350.

*Totalizer engaging and disengaging mechanism*

The mechanism for engaging the totalizer wheels 440 with the actuators 350 is the same as that disclosed in the above referred to Robertson patent, No. 1,924,290 for which reason only a brief description of this mechanism will be given herein.

A link 458 (Fig. 14) pivotally connected to an arm 459 fast on the totalizer frame supporting shaft 157, carries a coupling stud 460 normally held in a slot 461 (Fig. 15) formed in a conveniently bent lip 462 on an engaging arm 463 journaled on the cross shaft 393, by a totalizer controlling lever 466 pivoted at 467 to the adjacent side frame, and bifurcated at its free end to embrace a stud 464 on the link 458. A stud 468 (Fig. 15) on the engaging arm 463 projects into a cam groove 469 in the face of a cam disk 475 fast on the drive shaft 276. The drive shaft 276 and cam disk 475 make one complete rotation counter-clockwise during the operation of the machine, and after the actuators 350 have had time to advance, the walls of the cam groove 469 rock the arm 463 first clockwise to engage the totalizer wheels 440 with their respective actuators 350, and then, near the end of the rotation, after the actuators 350 have been restored to their home positions, the walls of the cam groove 469 will rock the arm 463 counter-clockwise to disengage the totalizers from their actuators.

*Totalizer transfer or carrying mechanism*

Means are provided in the machine to advance the totalizer wheels of higher order one step of movement when the totalizer wheels of the next lower orders pass from "9" to "0". This transfer mechanism is fully illustrated and disclosed in the patents of Robertson above referred to, and forms no part of the present invention. Therefore, only a brief description of this structure is included in this specification.

As the totalizer wheel 440 (Fig. 3) passes from "9" to "0" a tripping tooth 448 thereon wipes past and rocks a restraining arm 487 to release a tripping pawl 488 pivoted at 449 on an arm 489 fast on the totalizer supporting shaft 157, to the action of its spring 490, which immediately rocks the tripping pawl 488 to free a transfer arm 491, pivoted on the shaft 157, to the influence of a spring 492. The transfer arm 491 carries a transfer pawl 493, and when the spring 492 rocks the transfer arm 491 clockwise, as viewed in Fig. 3, the transfer pawl 493 pivoted on the transfer arm 491, engages and advances the next higher order totalizer wheel 440 one step of movement. However, should the tripping tooth 448 initiate a "carry" at the time the totalizer is still engaged with the actuators, mechanism is provided to delay the transfer until near the end of the operation. This delaying mechanism is fully illustrated and described in the Robertson patents, Nos. 1,924,290 and 1,929,652, to which reference may be had for a complete disclosure and understanding of the transfer mechanism.

Transaction keys

The bank of transaction keys 44, 45, 46 and 47 (Figs. 1, 7 and 8) enables the operator to select the desired totalizer, disable certain mechanism in the printer, control the setting of the transaction indicators and type wheels, and enable the machine release key 58 to be depressed, all of which will be fully explained hereinafter.

Conveniently the lower key 44 is the "List Postage" key. It is depressed when it is desired to operate the machine to issue a "permit ticket", and depression thereof selects the "List Postage" totalizer upon which is accumulated the amount of postage or value of the "permit tickets" or stickers issued.

The next higher key above the "List Postage" key, is the "List Cancellation" key 45, which is depressed when it is desired to list a group of erroneously issued "permit tickets", that is, if, for instance, after the parcels in a group have been individually weighed, the zones noted, the amounts of postage computed, and the machine operated to issue the "permit ticket" for such individual package, the operator learns that certain of the tickets issued bear the incorrect indicia, these incorrect tickets may be cancelled, and listed on the machine under the control of the "List Cancellation" key.

The "List Cancellation" key 45 controls means to disable the ticket issuing mechanism so that no "permit ticket" is issued on operations when this key is depressed. A special totalizer 440, selected by the "List Cancellation" key, accumulates the amounts of postage represented by the cancelled tickets.

The upper keys, 46 and 47, are known as the "Group Total Postage" key and the "Group Total Cancellation" key, respectively. These keys select totalizers 440 to accumulate amounts or totals as indicated by the symbols on the caps of the keys, and are only used when a transfer total operation is to be made. Thus, after a group of parcels has been registered and the "permit tickets" or stickers therefor issued, the "List Postage" totalizer is cleared under the control of the total lever 57, as will be later described. The "Group Total Postage" key 46 is then depressed and the machine operated, whereupon the amount of the total taken from the "List Postage" totalizer is automatically added onto the "Group Total Postage" totalizer.

The same procedure, using the "Group Total Cancellation Key", is followed after a series of "List Cancellation" operations have been made, to accumulate the totals of "List Cancellations" on the "Group Total Cancellation" totalizer, all of which will be described in full later in the specification. Depression of any of the "Group Total" keys also disables the "permit ticket" issuing mechanism so that no ticket or sticker is issued on operations when one of these keys is depressed.

Figure 9:
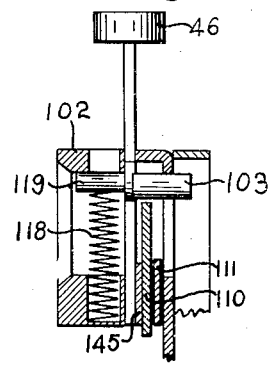
Fig. 9 is a cross-sectional view, taken transversely through the bank of transaction keys.

The transaction keys are slidably mounted in a key frame 102 (Figs. 7 and 9) supported in the machine on the cross rods 61 and 62 described above. Each of the keys 44 to 47, inclusive, is provided with a key pin 103 projecting from the shank of the key and adapted to cooperate with a detent bar 110 and a control bar 111 (Figs. 9 and 10) arranged side by side, both bars 110 and 111 being slotted for slidable support on studs 112, only one of which is shown, projecting interiorly into the key frame 102.

Springs 113 and 114 (Fig. 7) individual to the respective bars, normally hold the detent bar 110 and the control bar 111, in their uppermost positions in which, projections 115 (Fig. 10) on the detent bar 110, and projections 116 on the control bar 111 contact the key pins 103 of the several keys, there being a projection 115 and a projection 116 for each of the transaction keys. Depression of one of the transaction keys forces its pin 103 along the inclined edges of the adjacent projections 115 and 116, and crowds both the detent bar 110 and the control bar 111 downwardly against the tensions of their respective springs 113 and 114. The spring 113 shifts the detent bar 110 upwardly part way, when the key pin 103 passes below a shoulder 117 (Fig. 10) on the projection 115 of the detent bar 110, thereby latching the key in its depressed position. The projections 116 on the control bar 111 are not provided with shoulders, and the control bar 111 is held in its adjusted position during the operation of the machine and until another transaction key is depressed, by contact of the projection 116 with the pin 103 of the depressed key, the keys 44, 45, 46 and 47 not being released during the operation of the machine. Nor are the transaction keys released manually except by depression of another key in the same bank, which, upon depression, causes its pin 103 to cam the detent bar 110 downwardly far enough to free the shoulder 117 from the key pin 103 on the key depressed, whereupon a key spring 118 (Fig. 9) compressed between the bottom of the key frame 102 and a stud 119 projecting from the key stem on the opposite side from the pin 103, restores the key to its normal outward position.

Transaction key indicator mechanism

A differential mechanism (Fig. 7) similar to those for the banks of amount keys, is provided for the transaction bank of keys, and comprises an actuator 350 and a setting segment 357 journaled on the supporting shaft 149 and controlled by the restraining and restoring bail 352 in the same manner as are the actuators and setting segments of the amount banks.

The transaction keys, when depressed, interpose their inner ends in the path of the nose 355 on the actuator 357 to differentially arrest the actuator on its advance, and the setting segment is restored to its home position, after which the corresponding coupling pinion 3580 is meshed with the actuator and its setting segment to enable the actuator as it is returned to its home position by the universal bail 352, to adjust the setting segment 357 in accordance with the particular transaction key depressed.

No totalizer wheel is associated with the actuator, but the setting segment 357 meshes with a gear 554 secured to the left-hand end of one of the tubes 214 surrounding the printer shaft 215. The gear 554 drives an indicator segment 555 similar to the indicator segments 415 (Fig. 3) set under the control of the amount keys, which, in turn, meshes with an indicator pinion 419 fast with an indicator journaled on the indicator shaft 413 to set the latter to indicate the particular transaction totalizer selected for operation.

Transaction key control of machine release

The control bar 111 also compels the operator to depress a transaction key 44 to 47, inclusive, before the machine can be released for operation. A stud 120 (Figs. 7 and 10) projects from the lower end of the control bar 111 into an open slot in a locking arm 121 journaled on a key release shaft 122 having suitable bearings in the side frames 30 and 31 of the machine. The nose 125 of the locking arm 121 normally rests in the clockwise path of a release bail 123, the arms 130 and 131 (Figs. 10 and 14) of which swing from a shaft 124 journaled in the machine side frames 30—31. The bail 123, when permitted to rock clockwise, operates means to release the machine for operation. It is obvious that as long as the nose 125 of the locking arm 121 remains in its normal position in the path of the bail 123, the bail is prevented from making a releasing movement. However, when the control bar 111 is lowered by depression of any one of the transaction keys, the stud 120 therein rocks the locking arm 121 clockwise out of the way of the releasing bail 123.

To make certain that the transaction key shall be fully depressed, before the lock which prevents depression of the starting key is released, the lock is held effective until the transaction key has been depressed sufficiently to enable the detent bar 110 to latch it in its depressed position.

To this end the detent bar 110 carries a stud 133 on the lower end thereof projecting through an open slot in a normally idle obstructing arm 134 also pivoted on the key release shaft 122. The transaction key, when depressed to operate the control bar 111, also shifts the detent bar 110 to rock the nose 135 of the arm 134 downwardly into the path of the bail 123 where it remains until the key pin 103, on the particular transaction key depressed, has passed the shoulder 117 on the projection 115 of the detent bar 110, thus insuring the completion of the key depression, and its retention in such position by the detent bar 110. At this time, the spring 113 returns the detent bar 110 upwardly to retain the key in its depressed position, as heretofore explained, and as the stud 133 returns, it rocks the obstructing arm 134 counter-clockwise to raise the nose 135 from the path of the bail 123, whereupon the bail is free to make its releasing movement.

As can be seen from Fig. 10, the effective angle of the projection 115 on the detent bar 110 cooperating with the key pin 103 is much greater than the angle of the inclined edge of the projection 116 on the control bar 111, for which reason the key pin 103 operates on the projection 115 to shift the detent bar 110 to its opposite limit of travel much more quickly than it operates on the gradual incline of projection 116. The result is a quick movement of the obstructing arm 134 into the path of the bail 123, where it remains until the key pin 103 passes the shoulder 117, and a slow movement of the locking arm 121 out of the path of the bail.

The spring 113, as above described, snaps the obstructing arm 134 upwardly out of the path of the bail, the locking arm 121 being also out of the path of the bail, the latter may now rock clockwise between the arms 121 and 134 to release the machine upon depression of the release key 58, as follows:

Release key

After the desired amount, transaction, weight and zone keys have been depressed, or the machine is otherwise prepared to operate, it is released for operation by depression of the motor release key 58 (Figs. 1 and 14).

The stem 226 of the release key 58 (Fig. 14) is removably supported on a release key plate 227 slidably mounted on studs 228 and 229 projecting from the right side frame 30 of the machine. A stud 230 in the release key plate 227 projects across a release arm 231 pivotally supported on a stud 232 projecting inwardly from the right side frame 30. A spring 233 constantly urges the release arm 231 counter-clockwise against the stud 230 to hold the release key plate 227 and the release key 58 in their uppermost positions. When the release key 58 is depressed, the stud 230 on the key plate rocks the release arm 231 clockwise against the tension of the spring 233 to remove a shoulder 234 on the release arm from beneath an ear 235 on the upper end of a slotted slide 236 adapted to shift vertically on the studs 232 and 237 projecting from the side frame 30. As soon as the shoulder 234 releases the ear 235, a spring 238, attached to the lower end of the slide 236, draws the latter quickly to its lowermost position.

The releasing slide 236 on its downward travel, operates the locking bail 123 to release the machine for operation, as follows:

A stud 239 on the slide 236 projects through a slot in an arm 245 connected by a yoke 246 to a lever 247 pivotally supported on the shaft 124. As the slide 236 moves downwardly, it rocks the arm 245 and lever 247 in clockwise direction. The arm 131 which, with the arm 130 (Figs. 3, 4, 7 and 10), supports the releasing bail 123, is a part of the lever 247 and, of course, rocks therewith when the slide 236 rocks the arm 245. By viewing Fig. 13, it can be seen that a stud 248 connects the bail arm 130 with a curved arm 249 pivoted on the shaft 124 and with an arm of a locking lever 251 (coacting with the repeat key) located between the bail arm 130 and the curved arm 249, the lever 251 also being pivoted on the shaft 124. A stud 252 on the arm 249 projects through a curved clearance slot 253 in the side frame 31, and through an open slot in the forwardly extending arm of a motor release lever 255 pivoted to the side frame 31.

Figure 34:
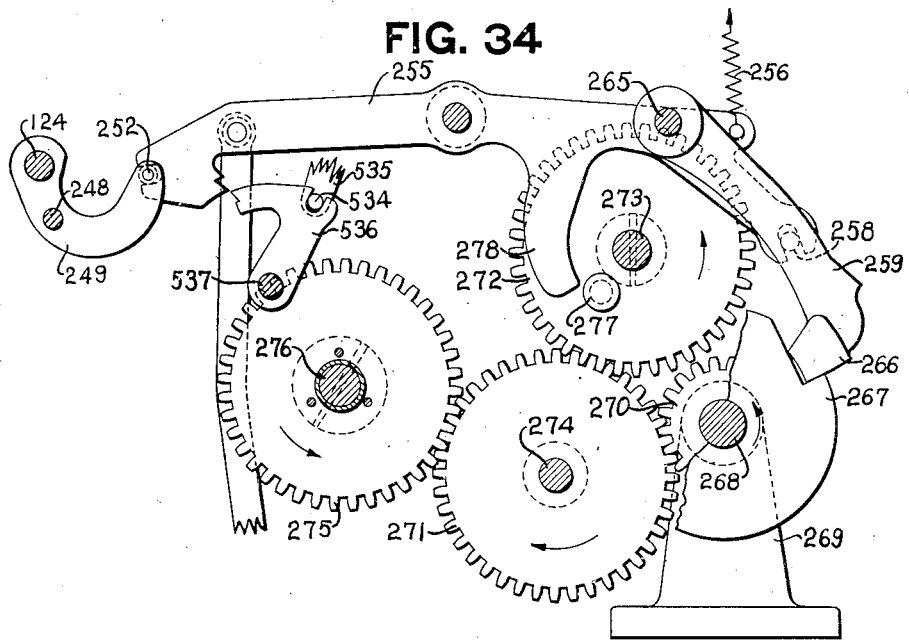
Fig. 34 is a detail view of the driving gears and a part of the mechanism for connecting the gears with the driving means.

The rearwardly projecting arm (Fig. 34) of the motor release lever 255 is forked to embrace a stud 258 projecting from a clutch release latch 259 pivoted on a shaft 265 journaled in the side frames 30 and 31. Normally, the nose 266 of the clutch release latch engages a shoulder on the driven member 267 of a clutch of well known design, to retain the clutch uncoupled. The clutch is conveniently mounted on a counter shaft 268 journaled in a bracket 269 secured to the base 32 of the machine, a drive pinion 270 being connected to the driven member of the clutch and meshing with an intermediate gear 271 journaled on a stud 274 projecting from the left side frame 31.

The intermediate gear, in turn, meshes with a clutch disabling gear 272 fast on the short release shaft 273 journaled in the side frame 31, and also with a drive gear 275 fast on the main drive shaft 276.

The clutch mechanism is of the type disclosed in United States Letters Patent to Kettering and Chryst, No. 1,144,418, dated June 29, 1915, and is also disclosed in connection with a machine of the same type as that shown in the present invention, illustrated in the United States Patent No. 1,816,263 issued to W. H. Robertson on August 4, 1931.

The arm 245 (Fig. 14) and the lever 247, when rocked clockwise by the downward movement of the slide 236, rock the locking bail 123 (Fig. 13), lever 251 and arm 249 also clockwise. The arm 249 (Fig. 34), through stud 252 carried thereby, rocks the release lever 255 counter-clockwise to swing the clutch control arm 259 away from the clutch member 267 of the clutch. A spring 256 attached to the release lever 255, aids in properly operating this train of mechanism and particularly in insuring the complete removal of the nose 266 from the notch in disk 267. Lost motion in the numerous connections in this train of mechanism may be sufficient to prevent the entire removal of the nose 266, but the spring 256 will overcome this. When released by removal of the nose 266, the clutch member 267 rotates, under spring tension, to connect an electric motor, or other conventional driving means (not shown) to the pinion 270 to impart two counter-clockwise rotations thereto at each operation of the machine. The ratio of the gears 270, 271, 272 and 275 is such that two counter-clockwise rotations of the pinion 270 imparts one complete counter-clockwise rotation to the gears 272 and 275 and drive shafts 273 and 276, respectively, at each operation of the machine to operate various mechanisms, such as the differentials, totalizer engaging and disengaging means, indicator, and printing mechanisms.

Near the completion of the rotation of the clutch-disabling gear 272, which also corresponds with the end of each operation of the machine, a restoring stud 277 projecting from the face of the clutch-disabling gear 272, contacts a curved prong 278, depending from the rearwardly extending arm of the clutch release lever 255, to rock the lever clockwise (Fig. 34), and restore the nose 266 of the clutch controlling arm 259 against the tension of its spring 256, into the path of the shoulder on the clutch disk 267 to disconnect the driving motor from the machine and bring the machine to rest in its home position.

At the same time, the clutch releasing lever 255, acting upon the stud 252 and arm 249, rocks the locking bail 123, (Fig. 13), the lever 247 (Fig. 14), and the arm 245 counter-clockwise to permit the release of depressed keys and to raise the slide 236 above its normal position and against the tension of its spring 238 sufficiently to permit the spring 233 to rock the releasing arm 231 counter-clockwise, thereby positioning the shoulder 234 beneath the ear 235 on the slide, and restoring the releasing key 58 to its normal undepressed position. Just at the end of the operation, the stud 277 (Fig. 34) passes the end of the depending prong 278 to free the clutch disabling lever 255 to the action of its spring 256 which rocks the lever 255 slightly counter-clockwise, and with it, the train of linkage including the curved arm 249, bail 123, arm 245 and slide 236, until arrested by the ear 235 on the slide coming to rest on top of the shoulder 234 of the releasing arm 231, which retains the parts in their normal positions until the release key 58 is again depressed to release the machine for operation.

Figure 35:
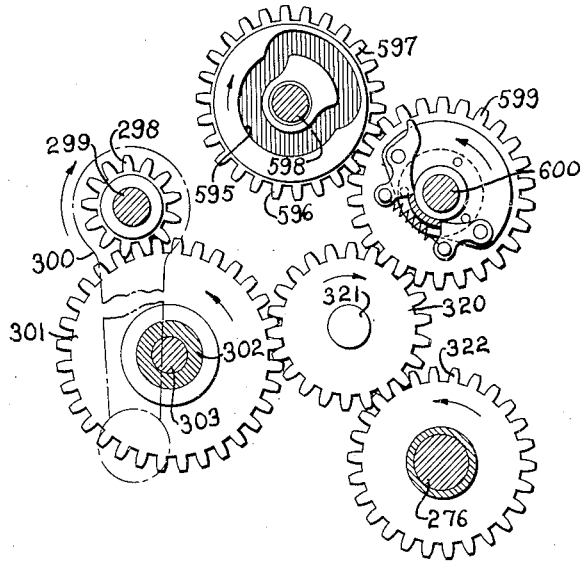
Fig. 35 is a detail view of the crank and gears for manually operating the machine.
Figure 36:
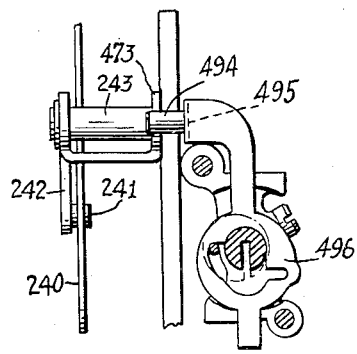
Fig. 36 is a detail view of the slide, operated by the total lever lock, for determining the effectivity of the total bar.

In case of failure of the electric current or other power source, provision is made to operate the machine manually. To this end a crank 300 (shown in dot-and-dash lines in Fig. 35) is adapted to be clutched in the usual manner, (not shown), to a gear 298 (Fig. 35) journaled on a stud 299 projecting from the right side frame. The gear 298 meshes with an intermediate gear 301 journaled on the hub 302 of a hammer lever 612 (to be described later), the hub being journaled on a stud 303 projecting from the side frame 30 of the machine. An idler gear 320 supported on a stud 321 in the frame 30 meshes with the intermediate gear 301 and with a gear 322 fast on the drive shaft 276.

The ratio of this train of gears is such that two rotations of the crank 300, and therefore, of the gear 298, in clockwise direction (as viewed in Fig. 35) imparts one rotation in counter-clockwise direction to the gear 322 and the drive shaft 276.

A means is provided for preventing repeat operations of the machine, without first releasing and again depressing the motor bar 58. Loosely mounted on the shaft 232 (Fig. 14) is a non-repeat pawl 290 normally held in engagement with a flange 291 on the arm 234 of the release 231, by a spring 292. When the arm 234 is withdrawn from beneath the lip 235, the pawl 290 moves into contact with the left side of the lip 235 under the influence of the spring 292. When the slide 236 is raised at the end of the machine operation, the arm 234 again moves beneath the flange 235.

Should the release key 58 (Fig. 14), be held in its depressed position at the end of an operation, thus holding the arm 234 from beneath the flange 235 when the slide 236 is raised, the non-repeat pawl 290 is rocked under the ear 235 of the release slide 236 by spring 292 to prevent continuous operation of the machine.

Key lock

The locking bail 123 controls means which becomes effective to lock the banks of keys, except the transaction keys, against mismanipulation during the operation of the main drive shaft of the machine.

In effecting this result, each of the banks of amount keys 40 is provided with a locking bar 68 (Fig. 3), having a series of hooked retainers 69 corresponding with and located adjacent the key shanks 40, the purpose of which retainers is to lock the depressed keys against return and the undepressed keys against depression, after the machine is released for operation and during such operation. Slots in the opposite ends of the locking bars embrace the supporting studs 75 and 76. As soon as the machine is released for operation, each of the locking bars 68 is shifted upwardly to engage the appropriate hooked retainers 69 with the key pins 64 of the depressed keys, to lock these keys in depressed positions, and at the same time, to position the remaining retainers 69 beneath the key pins 64 of the undepressed keys, thereby preventing depression of these keys during operation of the machine. Restoring springs 70 normally hold the locking bars 68 in their normal positions with the upper walls of the slots therein bearing against the supporting studs 75 and 76.

Also the lever 247 (Fig. 14) when rocked clockwise, rocks the bail 123 (Fig. 13) clockwise to position the latter in the path of movement of a series of arms 296, (Figs. 3 and 4), journaled on the key release shaft 122, one of which arms is associated with each bank of amount keys, each bank of weight and zone keys, and the one-half cent or divided key bank. Each of the arms 296 is slotted to embrace a pin 297 on the locking bars 68 and 100 associated with its corresponding bank of keys.

As the bail 123 swings clockwise, it rocks the slotted arms 296 counter-clockwise which arms, in turn, raise the locking bars 68 and 100 against the tension of their springs 70, to lock all of the depressed amount, weight, zone and divided bank keys in depressed position, and to lock all of the undepressed keys in these banks against depression during the operation of the machine.

At the end of the operation, as the bail 123 restores to its normal positon, as above explained, it withdraws from the intermediate slotted arms 296, whereupon the springs 70 (Figs. 3 and 4) shift the locking bars 68 and 100 to release the keys in their respective banks.

*Key restoring mechanism*

It has been stated above that mechanism is operated near the end of an operation to release all of the depressed keys except the transaction keys 44 to 47 inclusive. This mechanism is adapted to rock the key release shaft 122 (Figs. 3 and 4) to lower the respective detent bars 66 and (if necessary) the locking bars 68 associated with the several amount, weight and zone key banks and the detent bars 84 and 96, and the locking bar 100 for the divided key bank, to release the depressed keys. The mechanism for rocking the key release shaft 122 is best shown in Fig. 13, and will now be described.

Figure 13:
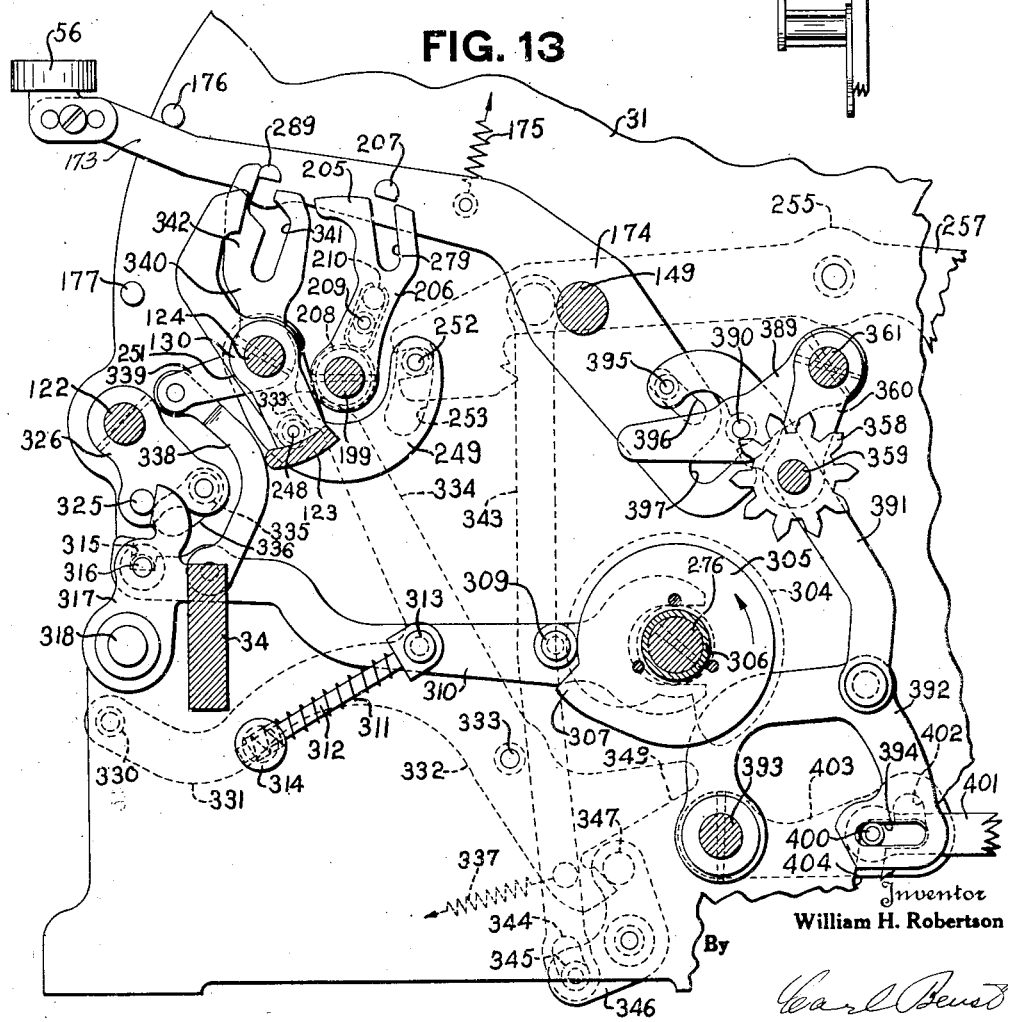
Fig. 13 is a detail view of the repeat key and of the various controls operated thereby.

A cam disk 305 (Fig. 13) having its hub 306 fast on the drive shaft 276, and making one rotation in counter-clockwise direction at each operation of the machine, carries a cam 307 adapted, near the end of each operation of the machine, to strike a projection 309 on a pitman 310 bifurcated at one end to straddle the drive shaft 276 and shift the pitman towards the left, as viewed in Fig. 13, against the tension of a spring 311 coiled about a plunger 312 pivoted at one end at 313 to the pitman 310. The opposite end of the plunger lies in line with a spring seat formed in a stud 314 secured to the side frame 31. The spring 311 is compressed between a shoulder on the plunger 312 and the bottom of its spring seat in the stud 314, and normally presses the projection 309 against the periphery of the cam disk 305. The forward end of the pitman is recessed, as at 315, the bottom of which is pressed upwardly by the spring 311 against a projection 316 on a lever 317 journaled at 318 on the side frame 31. When, near the end of the counter-clockwise rotation of the cam disk 305, the cam 307 strikes the projection 309, it forces the pitman 310 towards the left, (in Fig. 13), compressing the spring 311 and rocking the lever 317 counter-clockwise. The free end of the lever 317, in turn, strikes a stud 325 on an arm 326 fast on the key release shaft 122 to rock the arm 326 and key release shaft 122 clockwise. As the key release shaft 122 rocks clockwise, a series of restoring fingers 327 (Figs. 3 and 4) normally overlying studs 328 on the respective detent bars 66 and 84, lower these detent bars to release the depressed keys 40, 41, 48 and 49. The forked arms 296 connected with the respective locking bars 68 and 100 carry studs 329 which enter the paths of the restoring fingers 327 when the locking bars are in effective position.

Figure 6:
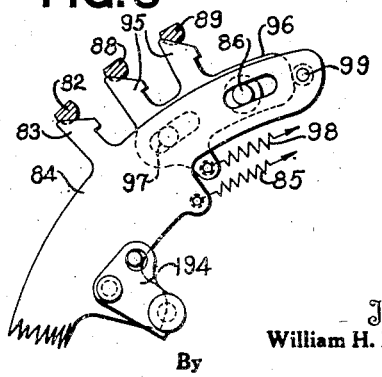
Fig. 6 is a fragmentary view of the split detent bar associated with the keys in the divided or one-half cent key bank.

If for any reason the springs 70 fail to restore the locking bars and their forked arms to idle positions at the end of an operation, such return is assured by the restoring fingers 327 which, on their clockwise movement, will encounter the studs 329 projecting from the slotted arms 296 which have failed to return, and rock these arms clockwise to lower the locking bars 68 (Fig. 3) and 100 (Fig. 4), thereby permitting depression of any of the amount, weight, zone, and the keys in the divided bank on the next operation. As the cam 307 (Fig. 13) moves beyond the projection 309, the spring 311 restores the pitman 310 to its normal position, rocking the lever 317 clockwise until it is arrested by a lug thereon striking the cross bar 34. The arm 326 and key release shaft 122 follow in counter-clockwise direction under the influence of the springs 67 (Fig. 3) and the springs 85 (Figs. 4 and 6) which act to raise the detent bars 66 and 84, respectively, with their studs 328, the latter, in turn, rocking the fingers 327 and the key release shaft 122 counter-clockwise, to hold the stud 325 (Fig. 13) on the arm 326 pressed against the free end of the lever 317.

*Manual key release*

Sometimes it is desired to release the depressed keys in all of the key banks except the transaction bank, as for instance, when an erroneous set-up has been made. In such cases, it is only necessary for the operator to grasp a knob 330 (dotted lines, Fig. 13) on an arm 331 of a Y-shaped key release lever 332 pivoted at 333 on the side frame 31, and rock the lever counter-clockwise as viewed in this figure, against the tension of its return spring 337. The release lever 332 appears in dotted lines in Fig. 13 behind the side frame 31. The free end of the arm 334 of the release lever 332, on its counter-clockwise travel, contacts a stud 335 projecting from the arm 326 through a concentric slot 336 in the side frame 31, and rocks the arm 326 and the key release shaft 122 clockwise to release the depressed keys, as above described.

It is desired to prevent manipulation of the manual key release lever 332 to release the depressed keys after the machine has been released for operation, and to this end it is necessary to provide means which will be effective when the machine is motor driven, as well as when operated by the handle 300 (Fig. 35), as follows.

When the machine is released for operation, it will be remembered that the bail 123 rocks clockwise to engage and rock the slotted arms 296 (Fig. 3) counter-clockwise, thereby raising the locking bars 68 and 100 to render them effective. The slotted arms 296, when thus rocked, position the studs 329 thereon immediately under the restoring fingers 327, and as the bail 123 remains at the limit of its clockwise travel until returned near the end of the operation of the machine, it maintains the studs 329 in position to prevent clockwise movement of the releasing fingers 327 and the key release shaft 122.

It can be seen, therefore, that with the key release shaft 122 and its arm 326 (Fig. 13) held against clockwise movement by the bail 123, curved arm 249, clutch release lever 255, and clutch pawl 259, the nose 266 of which lies adjacent the periphery of the rotating clutch disk 267, it is unlikely that the manual release lever 332 could be rocked counter-clockwise effectively to release the depressed keys after the machine is released for operation by a motor.

However, to insure that the manual release lever 332 shall not be operable during the motor-driven operation of the machine, there is provided a link 343 (Fig. 13), one end of which is connected to an arm of the clutch release lever 255, a slot being formed in the opposite end of the link to accommodate a stud 345 on one arm of a bell crank 346 pivoted to the side frame 31. A stud 347 on the other arm of the bell crank 346 normally rests against a projection on the lower end of the key release lever 332. When the machine is released for operation, the lever 255 rocks counter-clockwise and lowers the link 343, thrusting the upper end of the slot 344 therein against the stud 345, to prevent counter-clockwise movement of the manual key release lever 322.

In addition, a horn 343 on the key release lever 332 lies in proximity to a locking cam disk 304 on the drive shaft 276. When the machine is at rest, the horn 343 lies opposite the low point of the locking cam 304 which permits unimpeded operation of the key release lever, but very shortly after the machine starts its operation the main drive shaft 276 in its rotation, brings the high periphery of the cam 304 opposite the horn 343 to effectively prevent any operation of the manual key release lever 332 until near the very end of the operation of the machine, at which time, the low point of the cam is again positioned opposite the horn 343.

Obviously the locking cam is effective irrespective of the driving power employed.

Transaction keys select totalizers

As mentioned above, depression of a transaction key 44 to 47 directly selects a totalizer corresponding to the particular key depressed. The key pins 103 on the transaction keys (see Fig. 8) are adapted to cooperate with the inclined walls of a series of recesses 136, 137, 138 and 139 formed in a totalizer selecting bar 145, the upper end of which is pivotally supported on a link 146 swinging on the key frame 102, the lower end of the selecting bar 145 being pivoted intermediate the ends of a lever 147, which is itself pivotally supported on the key frame 102.

The pin 103 of the selected transaction key wipes along the inclined wall of its corresponding recess 136—139 to shift the totalizer selecting bar 145 downwardly, to rock the lever 147 clockwise. The recesses 136—139 terminate in short radial seats, the appropriate one of which is adapted to receive the key pin 103 of the depressed key to aline the selecting bar 145 in the position to which depression of a transaction key 44—47 has shifted it. The location of the slots 136—139 on the selecting bar 145, and the different angles at which the walls incline, enables the transaction keys 44, 45, 46 or 47 to shift the selecting bar 145, and hence the lever 147, to any one of four positions, depending upon which one of the transaction keys is depressed, and the extent of movement thus imparted to the selecting bar 145 and lever depends upon the position in which the bar was left at the last previous operation of the machine.

The free end of the lever 147 is forked, as at 150, to embrace a pin 151 on one arm of a bell crank 148, pivoted on the differential supporting cross shaft 149 journaled in the machine side frames 30—31. The lever 147, when rocked by a transaction key, transmits such motion to the bell crank 148, the remaining arm 154 of which is slotted, as at 153, to embrace a stud 155 on an arm 156 pivoted on, and projecting upwardly from the totalizer frame supporting shaft 157 journaled in the machine side frame 30—31. The arm 156 is secured to a spirally slotted, totalizer selecting drum cam 158 (see also Fig. 12) also journaled on the shaft 157.

Through the leverage, just described, the differential movement of the selecting bar 145 is transmitted to the selecting cam 158 to turn the cam in either direction to any one of four different radial positions, and slide the groups of totalizers 440 on the sleeve 441 longitudinally of the machine for the purpose of selecting for operation the particular totalizer corresponding to the transaction key depressed, as will be fully described later.

A totalizer selecting slide 451 (Figs. 8 and 12) shiftably mounted on a lateral stud 452 projecting inwardly from a bracket 453, secured to the inner side of the right side frame 31 (see Fig. 12), partially embraces the selecting cam 158 and carries a roller 454 projecting upwardly into a spiral cam groove 455 in the peripheral face of the cam.

A fin 457 secured to and extending upwardly from the slide 451 extends into an annular groove 456 (Fig. 12) formed about one end of the totalizer tube 441. The drum cam 458 when rotated in a clockwise direction, as viewed in Fig. 8, by any of the transaction keys 44—47, shifts the slide 451 toward the left, as viewed in Fig. 12, which, due to the engagement of the fin 457 with the totalizer supporting tube 441, shifts this tube and all of the totalizer wheels 440 thereon along the supporting rod 442 towards the left to position a certain wheel in each group in alignment with the totalizer actuators 350 common to all the totalizers. The distance through which the totalizers are shifted, of course, depends upon the position in which they were left, or stated differently, the extent of movement of the totalizer depends upon which totalizer was selected at the last operation and which totalizer is to be selected at the instant operation.

Figure 8:
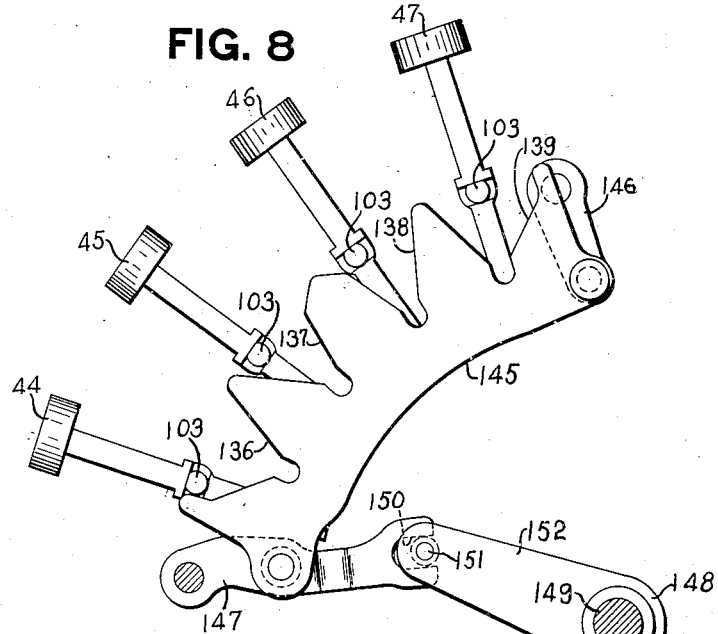
Fig. 8 is an enlarged detail view of the totalizer selecting mechanism.

In Fig. 8, the parts are shown in the positions to which they are moved by depression of the upper key 47, since the key pin 103 for this key is in alignment with the radial seat at the bottom of the V-shaped slot 139. Depression of the key 46 next below the key 47 engages its key pin 103 with the side wall of the V-shaped recess 138 and shifts the totalizer selecting bar 145 downwardly one step, which, in turn, through the train of mechanism above described, moves the totalizer wheels one space towards the left to position the second totalizer wheel from the left of each group of wheels, in alignment with the actuators 350. Since the depressed key 44—47 is only released by depression of another of said keys 44—47, it is obvious that the totalizer wheels will occupy the position to which they were last shifted until such time as another transaction key 44—47 is depressed.

Divided bank

It frequently happens that the amount of postage required ends in the fraction, one-half of one cent. Therefore, a one-half cent key is provided in the machine of the present invention to effect the registration of such fractional amount. The one-half cent key 41 (Fig. 1) is located in the "5" position in the bank of keys immediately to the right of the amount bank of cents keys 40. This key 41 is slidably mounted in a key frame 81 (Fig. 4), similar to the amount key frames 60 (Fig. 3) and is similarly supported on the cross rods 61 and 62. A spring, not shown, coiled about the shank of this key, retains the key in, and restores it to, its normal undepressed position.

When the one-half cent key is depressed, a key pin 82 (Figs. 4 and 6) in the shank thereof, engages the beveled edge of a shouldered projection 83 on a flexible detent bar 84 and cams this bar downwardly until the pin 82 has passed the shoulder on the projection 83, whereupon a spring 85 draws the detent bar upwardly and engages the shoulder on the projection 83 over the key pin 82 to retain the key 41 in its depressed position. The detent bar 84 is slotted for slidable mounting on the supporting studs 86 and 87 projecting from the key frame 81.

Additional keys 42 and 43 (Fig. 4) known as the "insured" key, and the "C. O. D." key, respectively, are also similarly mounted to slide in the key frame 81. The shanks of the keys 42 and 43 are longer than the key 41 for a purpose which will be described later. These keys do not arrest the differential mechanism of this bank, but merely control the setting of type wheels to print characters on the record strips and the "permit ticket" to indicate that a particular "permit ticket" was issued for an "insured" package or for a "C. O. D." package.

A key pin 88 on the shank of the "insured" key 42, and a key pin 89 on the shank of the "C. O.D." key 43, cooperate with shouldered projections 95 on a slotted detent bar 96 shorter than, and arranged beside the detent bar 84, and slidably mounted on the stud 86 and on a supporting stud 97 also projecting from the key frame 81.

When one of the keys 42 or 43 is depressed, the pin 88 or 89, depending upon which key is depressed, cams the short auxiliary detent bar 96 downwardly until the key pin on the particular key depressed has passed the shoulder on the projection 95 cooperating therewith, whereupon a spring 98 draws the auxiliary detent bar upwardly to engage the shoulder over the key pin on the shank of the depressed key to hold the key in its depressed position. The upper end of the auxiliary detent bar 96, under the influence of the spring 98, normally abuts a stop stud 99 projecting laterally from the main detent bar 84. When one of the keys 42 or 43 is depressed, its key pin 88 or 89, operating against the shouldered projection 95, moves the auxiliary detent bar 96 downwardly, thereby withdrawing its upper end from contact with the stop stud 99. If, after a key 42 or 43 is depressed, the one-half cent key 41 is depressed, the stud 82 thereon, acting on the beveled edge of its shouldered projection 83, moves the main detent bar 84 downwardly far enough to cause the stop stud 99 to impinge against the end of the auxiliary detent bar 96 and shift this auxiliary bar still farther downwardly a distance sufficient to remove the shouldered projection 95 from engagement with the pin 88 or 89 of the depressed key 42 or 43, thereby releasing such key to the action of its restoring spring.

This feature makes it necessary, however, to depress the one-half cent key 41 before depressing either the "insured" key 42 or the "C. O. D." key 43, when registering transactions involving an "insured" or a "C. O. D." parcel when the amount of the postage ends in a fraction of a cent.

*Locking bar for keys of divided bank*

A locking bar 100, similar to the locking bars 68 for the amount banks, is provided for the keys in the divided bank, to lock the one-half cent key 41, the "insured" key 42, and the "C. O. D." key 43 against depression or release during operations of the machine. The locking bar is moved upwardly at the instant the machine is released, by the bail 123 which contacts the swinging arm 296 forked to embrace the stud 297 on the locking bar and shifts the locking bar upwardly, as heretofore explained in connection with the amount keys, to engage hooked projections 101 on the locking bar 100 beneath the pin of the undepressed key or keys and over the key pin or pins of the depressed key or keys, to lock all of the keys in the positions occupied when the machine is released for operation.

Near the end of the operation, both the flexible detent bar 84 and the locking detent bar 100 are moved downwardly to release the depressed keys, which immediately restore to normal under the influence of their individual springs, and to free the undepressed keys, so that they may be depressed preparatory to the next operation. When the main detent bar 84 is moved downwardly, the stud 99 thereon contacts with the end of the short auxiliary detent bar 96 and carries this detent bar therewith to release the key 42 or 43, if depressed. Springs 85 and 98 then restore their respective detent bars 84 and 96 to their normal positions.

*Differential mechanism controlled by divided bank*

Separate differential mechanisms are associated with the one-half cent key, and with the "insured" and "C. O. D." keys, respectively, the former to accumulate the one-half cent values registered under the control of the half-cent key, on a totalizer wheel of lowest order, and the latter to differentially set a type wheel to print indicia on both the detail strip and the gummed "permit ticket". These latter keys do not otherwise control the machine.

An actuator 350 and a setting segment 357, exactly like those for the amount banks are operated under the control of the one-half cent key 41, as well as a zero stop arm 78. The zero stop arm for the half-cent key 41 is displaced upon depression of the half-cent key by the detent bar 84, in the same manner as explained in connection with the amount banks. As the one-half cent key differential is identical with, and operates in the same manner as the differential mechanism described above for the amount banks, no further description thereof need be included herein. It may be mentioned at this point, however, that, in the present instance, the one-half cent key actuator 350 is permitted an advance of five steps when the machine is operated with the one-half cent key depressed. As a result, the actuator, on its restoration to normal by the universal bail 352, rotates a "one-half cent" totalizer wheel 440 five spaces which, in the present instance, amounts to a half rotation. Obviously, at every second operation of the machine with the one-half cent key depressed, the "one-half cent" totalizer wheel will cause a transfer of "one" to be made into the "one cent" totalizer wheel.

The setting segment 357 paired with the actuator 350 for the half-cent key bank, meshes with a pinion 414 fast on a sleeve 214 extending into the printer section, to set a type wheel, the pinion 414 also meshing with a toothed segment 415 to set an indicator 420, as heretofore set forth in connection with the amount banks.

A coupling pinion 358 on the same rod 359 with the coupling pinions for the amount banks, is engaged and disengaged relatively to the actuator 350 and setting segment 357 of the half-cent key, in the same manner as are the coupling pinions for the amount banks.

The differential mechanism adapted to cooperate with the "insured" key 42 and the "C. O. D." key 43 (Fig. 4) is somewhat different in structure, but operates generally in the same manner as those for the amount keys 40. This differential mechanism is laterally spaced from the differential mechanism associated with the half-cent key, as shown in Fig. 20. An actuator 376

(Fig. 4) journaled on the shaft 149 is rocked clockwise by a spring 377 when released by the withdrawal, clockwise, of the universal rod 352 which normally restrains this actuator in its home position. There being no zero stop arm associated with this actuator 376, it will advance it each operation of the machine. If no key 42—43 is depressed, to interpose its angle stop 378 into the path of the finger 379 on the actuator, the latter continues its clockwise travel under the influence of the spring 377 until it is brought to rest by contact of its finger 379 with a stationary block 380 fixed to the key frame 81 in the "9" key position. The counter-clockwise movement of the actuator 376 is limited by the contact of a nose 382 thereon with the cross shaft 199.

A setting segment 383 (Figs. 4 and 20) journaled on the supporting shaft 149 alongside the actuator 376, is normally coupled thereto by a coupling pinion 358 in the same manner as the actuators 376 and setting segments 367 for the amount banks. The segment 383 does not set an indicator, although this could be easily arranged, but does set type elements in the printing mechanism, to be described later, to print characters indicating that the "permit ticket" issued was for an "insured" or a "C. O. D." parcel.

In operations wherein neither key 42 or 43 has been depressed, the actuator 376 on its return to normal by the universal bar 352, will turn the coupling pinion 358 and setting segment 383 to position its type carrier at a blank position.

Weight and zone keys

Located just to the left of the banks of amount keys are two banks of keys 48 which, in the present machine, are designated as "weight" keys. The structure of these key banks is identical with that of the amount keys, for which reason detailed illustrations and description thereof have been omitted. The "weight" keys 48 control differential mechanism to set indicators and type carriers to indicate and print the weight of the parcels.

The differential mechanisms, when controlled by the weight and zone keys do not operate their corresponding totalizer wheels 440, which serve as overflow wheels to take care of amounts exceeding the capacity of the wheels 440 corresponding with the denominational amount banks of keys.

The upper key, that is, the key in the "9" position in the left-hand bank of "weight" keys, bears the character "OZ". This symbol is also placed on the indicator for this particular bank and is engraved on the type wheels set under the control thereof, so that when the machine is operated with this particular key, known as the "ounce" key, depressed, the symbol "OZ" will appear on the indicators and will be printed on the "permit ticket", the issuing detail strip, and the permanent detail strip. The purpose of this particular character is to designate the weight of the parcel in terms of ounces. Thus, if the "permit ticket" bears the legend "OZ 6", the inspector is advised that the ticket was issued for a parcel weighing 6 ounces. If this legend does not appear in connection with the weight numeral, the weight indicated is to be read in pounds. Thus the legend "6" appearing alone on the weight indicator and in the weight column on the "permit ticket" indicates that the parcel for which that particular ticket was issued, weighed six pounds. The weight keys, like the amount keys, are automatically released at each operation of the machine, and may be manually released when depressed in error, as described.

Zone keys

To the left of the weight keys is located a bank containing a full complement of "zone" keys 49. These keys are also identical in structure and operation with the amount keys, and no further detailed description is thought to be necessary for a complete understanding thereof. These keys may bear on the tops thereof, the numerals "1" to "8", the key occupying the "9" position, however, bearing the character "L". This bank of keys also controls a differential mechanism to set an indicator and type wheels, as do the weight and zone keys, to indicate and print symbols similar to those appearing on the key tops. Thus, the numeral "8" appearing on the indicator beneath the inscription "zone" on the cabinet (see Fig. 1) indicates that the designation of the package lies in zone 8. The symbol "L" designates the "local" zone. These characters are printed on both detail strips (Fig. 28), and on the "permit ticket" (Fig. 29). Like the amount keys 40 and the weight keys 48, the zone key bank 49 is flexible to enable the depression of one key to restore an erroneously depressed key, and the depressed key is released automatically at each operation of the machine.

Weight and zone differential mechanisms

On adding operations, or "permit ticket" issuing operations, it is desired to utilize the differentials associated with the banks of weight and zone keys 48 and 49 merely to set indicators and type wheels to indicate and print the weight of the parcel and the zone to which it is to be shipped. It is not desired that these differentials actuate totalizer wheels provided in the machine to accumulate the overflow of the regular totalizer wheels on such operations. For this reason no actuator teeth are provided on the actuators 3500 (Fig. 22) for these banks.

Coupling pinions 358 are provided to couple and uncouple the paired actuators 3500 and setting segments 357 for the weight and zone banks of keys, such coupling pinions being mounted to swing with the coupling pinions for the amount banks.

Repeat mechanism

The purposes and functions of the present machine are materially improved and the desired results are more readily and quickly attained by the use of a repeat mechanism, one of the chief advantages of which is to render unnecessary that the operator know at the time of making an entry, that the operation is to be repeated. The last previous entry may be repeated at any time after the operation is completed, by merely depressing the repeat key without foreknowledge that a repetition of such operation is necessary. In the repeat mechanisms heretofore known in the art, it is necessary that the operator know before an operation that the entry is to be repeated, in order that some preliminary adjustment shall be made on the machine before it is operated to enter the original transaction.

The repeat mechanism of the present invention requires no such preliminary adjustment. The operator need only glance at the indicator to ascertain if the indicia displayed thereon correspond to the data to be entered at the next succeeding operation, and if so, he merely depresses the repeat key, whereupon the machine operates to register and enter exactly the same amount and information as that of the last operation.

It can readily be seen that, when, as often happens in mail order houses or other concerns having a great number of packages to ship by parcel post, "permit tickets" are to be issued for a number of packages of the same weight, going to the same zone and requiring the same amount of postage, a great saving in time can be effected by enabling the operator to set up the keys to enter the first of such parcels, and then merely pressing the repeat key to enter each of the remaining like parcels, should they follow in regular sequence. This repeat mechanism is of the type disclosed in the above named Letters Patent of the United States, No. 1,929,652.

One end of the arm 173 (Fig. 13) of a repeat lever 174 pivoted on the differential supporting shaft 149, projects through a suitable opening in the casing and carries the key top 56. A spring 175 normally holds the repeat lever in its normal or undepressed position, the movement of the lever 174 in either direction being limited by stop studs 176 and 177 projecting inwardly from the side frame 31.

The repeat key does not control a differential except in a general way, that is, it controls all of the differential mechanisms to make a repeat operation, but does not itself control an individual differential mechanism to set indicators and type wheels, as do the banks of keys.

Depression of the repeat key 56 locks all of the keys, except the transaction keys, against depression, and locks the total lever against movement, it being unnecessary to press any key except the transaction key to make a repeat operation. Because of the control by the transaction keys 45—47 of the machine releasing mechanism, it is necessary that a transaction key be in depressed position, but as these keys are not released as an incident to the operation of the machine, the transaction key depressed on the last operation remains depressed throughout a series of repeat operations.

The repeat key, when depressed, also disables the key releasing mechanism which, if actuated on repeat operations, would result in damage to the machine.

After effecting the results just above enumerated, the repeat lever, as it approaches the limit of its travel on depression, trips the machine releasing mechanism to release the machine for operation independently of the regular machine release bar 58.

It will be remembered that the setting segments 357 of the amount, weight, and zone banks and the divided bank remain where last adjusted, at the end of an operation.

It will also be remembered that the broad coupling pinions 358 normally lie in mesh with the respective actuators 350 and their associated setting segments 357, and upon the beginning of an adding operation, are first disengaged from their actuators and setting segments to allow the actuators to be reset under control of such keys as have been depressed, and the setting segments restored to their zero positions, after which the coupling pinions are restored to connect the respective actuators 350 with their associated setting segments 357, so that the actuators, on their return to their home positions, may set the indicators and type carriers to represent the indicia corresponding with the keys last depressed.

Furthermore, it will be remembered that the drive link 391 (Fig. 13) pivoted at one end to the curved arm 392 by which it is driven, is recessed near its upper end to fit over a pin 390 projecting from the arm 389 fast on the shaft 361, which carries the coupling pinion frame 360—359 to rock the pinions out of mesh with the paired actuators 350 and setting segments 357 at the beginning of an operation, and back into mesh after the actuators have advanced and the setting segments have been restored to their home positions.

The drive link 391 also carries a pin 395 accommodated in a slot 396 in the repeat lever 174 for guidance and support.

In view of the foregoing, it is readily appreciated that, to effect a "repeat" operation, all that is necessary to do is to place the actuators 350 which, at the end of an operation, lie in their home positions, under the control of the setting segments 357, which, at the end of an operation, occupy the positions to which they were adjusted during such last operation.

And the stud and slot connection 395—396 with the repeat key lever 174 affords a convenient means for effecting this result, by disabling the connection between the drive link 391 and the coupling pinion frame 361—359.

The repeat key 56 (Fig. 13), when depressed, rocks the repeat lever 174 counter-clockwise, which lever, through the slot 396 and stud 395 rocks the drive link 391 clockwise about its pivot on the bent lever 392 to disengage the notch in the link 391 from the stud 390 in the arm 389 of the coupling pinion frame 359—361, so that, as the arm 403 through the connecting stud 400, rocks the bent lever 392 clockwise, the link 391 is drawn downward idly, its stud 395 sliding in the slot 396, without rocking the coupling pinions 358 out of mesh with the paired actuators 350 and setting segments 357.

To hold the coupling pinions engaged with the paired actuators and setting segments, the inner arm of the repeat lever 174 is provided with an open slot 397 which, as the lever 174 rocks counter-clockwise on depression, fits itself over the stud 390 on the arm 389 of the coupling pinion frame, to latch the frame against accidental rocking.

The bent lever 392 and drive link 391 are rocked upwardly to their home positions before the end of the operation, and when the repeat lever 174 is released and the spring 175 restores it clockwise to its normal position, it will operate through the stud 395 to rock the drive link 391 counter-clockwise to re-engage the notch therein with the pin 390, at the same time disengaging the alining slot 397 therefrom.

Having arranged that the coupling pinions 358 shall remain in mesh with the paired actuators and setting segments, to the end that the actuators 350, as they advance under the influence of their drive springs 351, upon the withdrawal of the restraining and restoring bar 352, shall be controlled as to the extent of such advance, by the last-previous setting of the segments 357 as the latter are returned to their home positions by the bar 352, it is desirable to prevent depression of any of the keys other than a transaction key 44—47, the corresponding coupling pinion of which is not under control of the repeat key.

It is also necessary to displace the zero stops 78 from the paths of the actuators for the remaining banks of keys.

It is desirable to lock the total control lever in its "add" position. Since the key release mechanism is arranged to operate at each operation of the machine, it is advisable that means controlled by the repeat key be provided to disable the key release mechanism on repeat operations to avoid damage to the machine due to the fact that the repeat key sets the key locking mechanism to prevent depression of keys during a repeat operation.

To prevent depression of the keys of the keyboard on repeat operations, the forward arm 173 of the repeat key lever 174 (Fig. 13) carries a stud 289 normally in line with the open end of a cam slot 341 formed in one arm of an elbow lever 340 fast on the locking shaft 124. One wall of the slot 341 is extended to form a finger normally resting against the stud 289 which forms a stop for the elbow lever 340 and shaft 124 to limit their clockwise rotation.

The shape of the cam slot 341 is such that as the stud 289 traverses the slot upon depression of the repeat lever 174 in counter-clockwise direction, the stud will rock the elbow lever 340 counter-clockwise, and consequently, the shaft 124.

It will be remembered that the locking shaft 124 carries the denominationally arranged locking arms 192 (Fig. 3) fast thereon, so that upon turning the shaft 124 counter-clockwise, the locking arms 192 are rocked in the same direction to locate their ears 193 beneath the lugs 194 on the locking bars 68 and 84 appertinent to the several banks of keys except the transaction bank, and thus lock the keys against depression.

To prevent actuation on a repeat operation, of the key release mechanism, heretofore explained, which operates through the pitman 310 (Fig. 13) and its train of mechanism to rock the release shaft 122 with its arms 327 (Fig. 3) to draw the locking bars 68 and 84 downwardly, there is provided a link 338 connecting the remaining arm of the elbow lever 340 with the pitman 310. As the elbow lever 340 rocks clockwise when the repeat key lever 174 is depressed, it thrusts the link 338 downwardly to rock the pitman counter-clockwise and disconnect it from the arm 317 of the train of key release mechanism, thus preventing operation of the latter.

To enable the actuators 350 (Fig. 3) to advance under control of the setting segments 357 on repeat operations of the machine, it is necessary to displace the normally effective zero stops 78 from the paths of the projections 355 of the actuators. This is effected by the repeat key, depression of which enters the stud 289 (Fig. 13) into the cam slot 341 in the arm 342, and rocks the shaft 124 (Fig. 3) and its arms 192 counter-clockwise, to press their studs 191 against and rock the stop arms 78 to their ineffective positions.

Now, when the universal bail 352 swings clockwise, on operation of the machine, the actuators 350 follow under the influence of their drive springs 351 until the setting segments 357 arrive at their normal or home positions. The indicator segments 415 connected with the setting segments through the intermediate pinions 414, turn back to their zero positions as the setting segments 357 advance under the influence of the springs 351, actuators 350 and coupling pinions 358, until the indicator segments are arrested in their home positions by contact of the end walls of the slots 418 in the indicator segments 415 with the stop rod 417, and therefore, arrest the setting segments 357 in their home positions. Through the coupling pinions 358 the actuators 350 are arrested in the advanced positions in which they were arrested by the keys depressed on the preceding operation, after which the totalizer 440 is engaged with the advanced actuators, as heretofore explained.

The universal bail 352, as it returns counter-clockwise to its home position, picks up and restores the actuators 350 to their normal positions, at the same time, through the broad coupling pinions 358, moving the setting segments 357 back to the positions they occupied at the beginning of the repeat operation. The actuators, on their return, accumulate on the totalizer the amount registered on the last previous operation.

Mechanism is also operated by the repeat key 56 (Fig. 13) and its lever 174 to rock the release arm 231 (Fig. 14) to free the slide 236, thereby releasing the machine for operation directly by depression of the repeat key 56.

The repeat key lever 174, when depressed, enters the stud 207 on the repeat lever into the open end of the angle slot 279 formed in the free end of the arm 206 fast on the cross shaft 199 and, due to the angle of the slot 279, the stud 207 rocks the arm 206, cross shaft 199 and lever 198 (Fig. 14) counter-clockwise to press a stud 285 on the upper arm 286 of the lever 198, against a downwardly extending tail 287 on the release arm 231, and rock this arm clockwise to free the release slide 236 to the action of its spring 238. Thereupon, the spring 238 draws the slide 236 downwardly to release the machine for operation, rocking clockwise the arm 245 (Fig. 14), lever 247, bail 123 (Fig. 13), and the interposed locking lever 251, to release the machine for operation.

The hooked arm (Fig. 13) of the locking lever 251 is thus rocked over the stud 289 on the repeat lever 174, to hold the repeat lever in depressed position until the restoring stud 277 (Fig. 34) on the gear 272 rocks the clutch release lever 255 clockwise, whereupon the lever 255 rocks the curved arm 249 (Fig. 13) and the locking lever 251 counter-clockwise to free the repeat lever 174 to the action of its restoring spring 175. The spring 175 immediately restores the repeat lever to its normal undepressed position, and during its return, the stud 207 on the repeat lever, in disengaging itself from the cam slot 279 in the arm 206, rocks such arm clockwise, together with the cross shaft 199 and lever 286 to enable the spring 233 (Fig. 14) to return the releasing arm 231 clockwise to its normal position.

When the machine is released for operation while the total control lever 57 is in its "add" position, it is desirable to lock the total control lever 57 to prevent movement thereof either accidentally or intentionally, as such movement, while the machine is in operation, would cause damage to the machine.

Therefore, when the slide 236 (Fig. 14) rocks the lever 247 clockwise as above described, a stud 293 on the extending arm of the lever 247 rocks into one of a plurality of slots in a locking plate 295 secured to the total control lever 57, thereby locking this lever against movement while the machine is in operation.

As an example, let it be assumed that an adding operation is made with the "7" key depressed in the amount bank illustrated in Fig. 3. At the end of the operation, the setting segment 357, indicator segment 415 and, of course, the indicator 420 remain in the "7" position. After the adding operation is completed, the operator finds it necessary to repeat the operation just finished.

To do so, the operator depresses the repeat key 56 which, as above described, immediately releases the machine for operation, disables the coupling pinion actuating mechanism, and renders the zero stop arm 78 ineffective. During the clockwise travel of the universal bail 352, the drive spring 351, as mentioned above, causes the actuator to follow the bail until arrested by the stop rod 417. Since the setting segment 357 stood at "7", the clockwise movement thereof, until arrested in its normal position by the stop rod 417, is equal to seven steps of movement, and hence the actuator is arrested in its "7" position.

The universal bail 352 on its return, rocks the actuator back seven steps to normal, during which the corresponding totalizer 440 which is meshed with its actuator prior to the return of the latter, is turned seven steps, and the segment 357 and the indicator 420 are restored to their seventh positions, as on the previous operation.

The clutch release lever 255 (Figs. 13 and 34), when restored by the restoring stud 277 near the end of the "repeat" operation, operates through the arm 249 to rock the hooked arm of the lever 251 from over the stud 289 on the repeat key lever 174, whereupon the spring 175 returns the repeat key lever to normal, withdrawing its stud 289 from the slot 341 in the arm of the elbow lever 342, and likewise withdrawing its stud 207 from the angle slot 279 in the arm 206.

Thereupon, the spring 311 restores the key release pitman 310 to re-engage its notch 315 with the stud 316, and returns the elbow lever 340 and the locking shaft 124 to their normal positions.

The shaft 124, in turn, withdraws the locking arms 192 (Fig. 3) from the zero stops 78, whereupon springs 80 restore the zero stops to their effective positions.

The repeat key lever 174 also restores the drive link 391 (Fig. 13) to engagement with the pin 390 on the arm 389 of the coupling pinion frame, thus preparing the machine to make an adding or a totalizing operation.

The interposed locking lever 251 prevents depression of the repeat key 56 and its lever 174, after the machine has been released for operations while the total control lever remains in its "add" position.

To this end, the upper arm of the locking lever 251 is hooked, and when the slide 236, (Fig. 14) upon its release, as above explained, rocks arm 245 clockwise, and with it the bail 123 (Fig. 13), the latter, through its stud connection 248, rocks the locking lever 251 to interpose the end of its hooked arm in the path of a stud 289 on the repeat key lever 174, which prevents depression thereof.

The locking lever 251 is restored to idle position by the stud 277 (Fig. 34) carried by the gear 272, on the clutch release lever 255 and its train of linkage, and is held in idle position by the slide 236 (Fig. 14) when the latter is latched in its elevated position by positioning the shoulder 234 on the release arm 231 beneath the ear 235 of the slide.

Total control lever

The machine chosen to illustrate the present invention is capable of performing adding operations, sub-total taking operations, total taking operations, repeat operations and transfer total operations.

The total control lever 57 (Fig. 14) is provided to condition the machine to add amounts into the totalizers under the control of the amount keys, and to take sub-totals and totals from the various totalizers. The total lever, therefore, has three positions known as the "add" position, the "read" position, and the "reset" position. Normally the total control lever stands in the "add" position, wherein it permits addition of amounts to any of the totalizers on any of the totalizer lines.

The total control lever and its mechanism are old and well known, the main difference between former structures and that shown in the present invention, being that when the total control lever is shifted to the position to control the machine to make a totalizing operation, that is, to clear a totalizer of the amount contained thereon and to leave the totalizer wheel standing at zero, it sets certain mechanism which, on the next operation following a totalizing operation, compels the transfer of a total from one totalizer to another.

Figure 17:
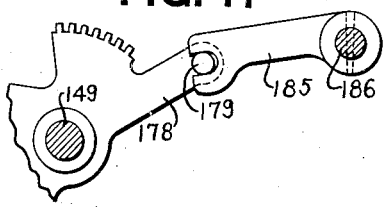
Fig. 17 is a detail view of the connection between the total lever and the transfer total control shaft.

The total lever 57 is pivoted on the differential supporting shaft 149. A rearwardly extending arm 178 of the lever carries a stud 179 projecting through a slot in the end of an arm 185 fast on a control shaft 186 (Figs. 14, 17 and 18) journaled at its opposite ends in the side frames 30 and 31. When the total lever 57 is manually shifted clockwise from the position in which it appears in Fig. 14, which is the "add" position, to its "reset" position, it rocks the arm 185 and the control shaft 186 counter-clockwise to set certain mechanism disclosed in Fig. 18 to compel a transfer total operation. This mechanism will be described more in detail later.

Total lever locks amount keys against depression

When the machine is operated under the control of the total lever 57 to "read" or "reset" one of the totalizers, the selected totalizer is first meshed with the totalizer actuators 350 and 384 which then advance under the control of the totalizer wheels 440 until the high teeth 448 of the totalizer wheels contact and are arrested by the pawls 487.

If a "reset" operation is being performed, the totalizer, the elements of which are now in their zero position, is disengaged from its actuators, which latter are then restored to their home positions, to set up the total amount registered by the totalizer, on the type carriers and indicators.

If a "read" operation is being performed, the totalizer remains in mesh with the actuators as they are restored to their home positions, during which return the actuators turn the totalizer wheels to again register thereon the amount accumulated before the "read" operation, as well as setting the indicators and type carriers accordingly. At the end of a "read" operation, the totalizer is disengaged from its actuators, as in adding operations. It is necessary that no amount keys be depressed on such operations, and mechanism is operated by the total lever, as it is moved to the "read" or "reset" positions, to prevent depression of any of the amount keys, including the one-half cent key, or any weight key, zone key, or the repeat key.

The "read" and "reset" positions on the total lever are located above the "add" position. The operator rocks the total control lever 57 clockwise to its "read" or "reset" position to condition the machine to "read" or "reset" a particular totalizer, selected by depression of a particular one of the transaction keys 44 to 47. As the total lever rocks clockwise, a stud 187 (Fig. 14) on a downwardly extending arm 188 of the total lever contacts the foot 189 of an arm 190 fast on the cross shaft 124, on which the machine locking bail 123 is mounted, and rocks this arm and shaft counter-clockwise.

The denominational locking arms 192 (Fig. 3) fast on the shaft 124, adjacent each bank of amount keys 40, weight keys 48, zone keys 49 and the half-cent key 41, each carry a stud 191 which extends across the plane of its adjacent zero stop 78 appropriate to the several banks of keys just mentioned, in such a manner that, when the locking shaft 124 is rocked counter-clockwise by the total control lever 57, the studs 191 rock the zero stops 78 clockwise to permit free operation of the differential mechanisms under the control of the totalizer wheels. An ear 193 on the end of each locking arm 192 is thus positioned in the path of a corresponding pawl 194 pivotally supported on its respective flexible detent bar 66 and 84, (Fig. 6), whereby to lock the keys 40, 48, 49 and 41 against depression, by preventing downward movement of the corresponding detent bars.

After the totaling operation, the total control lever 57 is manually rocked counter-clockwise to its "add" position preparatory to the accumulation of another total, and as it is thus returned, the lever withdraws the stud 187 (Fig. 14) relatively to the arm 190 on the cross shaft 124, whereupon the springs 80, (Figs. 3 and 4), which have been tensioned by the displacement of the zero stops 78 under the influence of the locking arms 192, operate to rock their respective stop arms 78 counter-clockwise to their normal effective positions. The zero stop arms, in turn, press against the studs 191 on the locking arms 192, to restore the latter and the cross shaft 124 clockwise to their normal positions, at which time the foot 189 (Fig. 14) of the arm 190 returns to its normal position in the path of the stud 187 on the total control lever.

*Total lever locks repeat key on totaling operations*

It is also desirable to prevent manipulation of the repeat key lever 174 (Fig. 13) on totaling operations, to which end, when the total lever is shifted to one of its totalizing positions, the depending arm 188 of the total control lever contacts a stud 196 on one arm of the lever 198 fast on the cross shaft 199, journaled in the side frames 30 and 31, to rock this lever and shaft clockwise. The broadened prong 205 of the normally idle bifurcated arm 206 (Fig. 13), fast on the shaft 198 near the left side frame 31 and adjacent the repeat lever 173, is thereby rocked beneath the stud 207 projecting from the repeat lever 174, to effectually prevent manipulation of the repeat mechanism while the total control lever remains out of its "add" position.

When the total control lever 57 is returned to its normal or "add" position, after the completion of an operation, the spring 208 (Fig. 13) coiled about the cross shaft 199 between the arm 206 and the left side frame 31, and having its ends projecting upwardly to embrace a stud 209 on the arm 206 and a stud 210 projecting inwardly from the side frame 31, returns the bifurcated arm 206, cross shaft 199 and the lever 198 (Fig. 14) to their normal positions, as shown in Figs. 13 and 14, regardless of the direction in which these parts were rocked.

*Key release disabling mechanism*

As in repeat operations, the actuation of the automatic key release mechanism on total taking operations, would damage the machine. The total control lever 57, when adjusted to either the "read" or "reset" positions, rocks the cross shaft 124 (Fig. 3) and the locking arms 192 fast thereon, counter-clockwise to move the zero stop arms 78 to their ineffective positions, and enable the differentials to advance under control of the totalizer wheels. The locking arms 192, when shifted to their effective positions, locate their ears 193 beneath the pawls 194 on the detent bars 66 and 84. If the key release shaft 122 could now be rocked to positively lower these detent bars, it can be seen that damage to the parts would result. To prevent such possibility, the following arrangement is employed.

It will be remembered that when the total control lever 57 (Fig. 14) is rocked clockwise to either its "read" or "reset" positions, the stud 187 on the depending arm 188 thereof, acting on the foot 189 of the arm 190, rocks the key release shaft 124 counter-clockwise. The curved link 338 (Fig. 13) connects an arm 339 of an elbow lever 340 fast on the shaft 124 with the key release pitman 310. The shaft 124, when turned counter-clockwise by the total lever 57 as it is manually adjusted to one of its totalizing positions, rocks the elbow lever 340, which movement is transmitted by the link 338 to the pitman 310, to swing the latter downwardly around the drive shaft 276 as a center, and disengage the notch 315 of the pitman from the stud 316 in the lever 317. The pitman remains disengaged from the lever 317 so long as the total control lever remains out of its "add" position, so that when the cam 307 shifts the pitman 310 towards the left, it does not displace the lever 317 nor the arm 326, and the key release shaft 122 remains idle during total taking operations.

The total lever 57 when restored to its "add" position, withdraws the stud 187 (Fig. 14) from the arm 190, whereupon the spring 311 (Fig. 13) assisted by the restoring springs 80 (Figs. 3 and 4) for the zero stops 78, rock the shaft 124 counter-clockwise to normal, drawing the link 338 (Fig. 13) upwardly, and re-engaging the notch 315 with the stud 316.

*Total lever control of overflow totalizer wheels*

On totalizing operations, when the operator wishes to indicate and print the amounts accumulated on the entire totalizer, it is desired to control the movement of the actuators 3500 for the weight and zone banks by the corresponding higher order or overflow totalizer wheels alined therewith. A normally inactive totalizer actuator segment 384 (Figs. 20 and 22) complementary to each of the actuators 3500 for the weight and zone banks of keys, is journaled on the differential supporting shaft 149 adjacent its appropriate actuator 3500 and normally locked in its home position. Each complementary segment 384 carries a coupling hook 385 having a stud 386 projecting through an angular slot in an arm 387 fast on the cross shaft 199, the stud passing beneath a bevel 398 formed on the lower end of a plate 160 secured to the key frame 60. The shaft 199 is held against movement on adding operations by the spring 208 (Fig. 13) embracing the stud 209 on the slotted arm 206 fast on the shaft 199, so that the studs 386 remain beneath the beveled portion 398 of their respective key frames 60 for the weight, and zone banks of keys, and the possibility of clockwise movement of the normally inactive complementary segments 384 on adding operations is prevented. The actuators 350⁰ and setting segments 357 for the weight and zone banks of keys are actuated on adding operations in exactly the same manner as those for the amount banks. On total taking operations, it is desired that the actuators 350⁰ for the weight and zone banks turn clockwise under the control of the totalizer wheels, just as do the actuators for the amount banks, for which reason means is provided to couple the normally idle segments 384 to the actuators 350⁰ of the weight and zone banks on such operations.

It will be remembered that movement of the total lever 57 (Fig. 14) clockwise from its "add" position to either its "read" or "reset" position, engages the face 195 on the arm 188 of the total lever with the stud 196 on the arm 197 of lever 198, and rocks this arm and the shaft 199 slightly clockwise for the purpose of rocking the tail 205 of the slotted arm 206 (Fig. 13) beneath the stud 207 to prevent depression of the repeat key 56 after the total control lever 57 is so positioned. The shaft 199, in turn, rocks the arms 387 (Fig. 22) clockwise therewith to engage the coupling hooks 385 over pins 388 on the actuators 350⁰ and shift the studs 386 from beneath the beveled edges 398 of the key frames 60.

Now, when the actuators 350⁰, urged by their springs 351, travel clockwise upon the withdrawal of the universal bail 352, they rotate the complementary segments 384 therewith, the studs 386 riding along the inner peripheries of the key frames to hold the coupling hooks 385 engaged with the pins 388.

On total taking operations, the actuators 350⁰ and their complementary segments 384 advance under the control of the overflow totalizer wheels, which are engaged therewith before the commencement of the clockwise movement. As soon as the universal rod 352 has completed its clockwise travel, the coupling pinions 358 associated with the actuators 350⁰ and setting segments 357 for the weight and zone banks, and which were disengaged therefrom at the beginning of the total taking operation, as heretofore explained, are re-engaged therewith, thereby coupling the actuators 350⁰ and their complementary segments 384 with the setting segments 357 so that, when the universal rod 352 restores the actuators 350, 350⁰ and 384 counter-clockwise to normal, the setting segments 357 move therewith a like number of steps, to set the indicators and type carriers to indicate and print the amounts accumulated on the totalizer.

As the actuators 350⁰ and their complementary segments 384 arrive at their normal positions, the studs 386 enter the slots in the arms 387, and when the total control lever 57 is shifted counter-clockwise manually from either of its totalizing positions to its "adding" position, the spring 208 (Fig. 13) rocks the arm 206 and cross shaft 199 counter-clockwise to their normal positions, which movement likewise rocks the arms 387 (Fig. 22) counter-clockwise and, due to the engagement of the studs 386 with the slots in the arms, the latter rock the coupling hooks 385 counter-clockwise to disengage the coupling hooks from the pins 388 on the actuators 350⁰, thereby disconnecting the actuators 350⁰ from their complementary segments 384, and locking the studs 386 beneath the beveled corners 398 of the key frames 60, to hold the complementary segments 384 in their normally inactive positions.

A short clearance slot is provided in the arms 387 for the studs 386 to permit counter-clockwise rotation of the shaft 199 by depression of the repeat key 56 to release the machine for operation, as described above.

*Totaling operation*

It will be recalled that, in adding operations, the positioning arm 466 (Fig. 14) by reason of its pin and slot connection 464—465, holds the adustable link 458 of the totalizer engaging and disengaging carriage 443, in such position that its stud 460 lies in the slot 461 of the ear 462 on the engaging and disengaging arm 463 rocked by the cam disk 475 on the main drive shaft 276, to enable the arm 463 to engage the selected totalizer 440 with the actuators 350, after the latter have advanced, the totalizer being disengaged from the actuators after the latter have been restored to their home positions.

On total and sub-total taking operations, however, it is necessary to engage and disengage the totalizer relatively to the actuators at different times than on adding operations, for which reason separate totalizer shifting cams and arms are provided for use in adding, sub-totalizing and totalizing operations.

When the total control lever 57 (Fig. 14) is rocked one space clockwise to condition the machine to make a sub-total operation, a stud 476 in the depending arm 188 of the total lever 57, projecting through a slot 477 in the positioning arm 466, rocks this arm also clockwise. The positioning arm 466, in turn, rocks the engaging link 458 clockwise about its fulcrum on the engaging arm 459, to withdraw the stud 460 from the slot 461 in the engaging arm 463 effective on adding operations, and positions the stud 460 in a slot 480 in the conveniently bent ear 481 on the upper end of a second totalizer engaging arm 482 (Fig. 16) lying parallel with and journaled, for compactness, on a hub 483 of the engaging arm 463.

The engaging arm 482 is similar to, but somewhat shorter than, the engaging arm 463, and carries a stud 484 which projects into a cam groove 485 in that face of the cam disk 408 opposite the face having the groove 407 therein. The configuration of the cam groove 485 differs from that of the groove 469 of cam 475, in that the walls of the groove 469, acting through the engaging arm 463, moves the totalizer into engagement with the actuators 350 after said actuators are set differentially under the control of the depressed keys, and disengages totalizers therefrom after the actuators have been restored to home position by the universal bail 252, whereas, the walls of the cam groove 485 operate through the arm 482 to rock the totalizer into engagement with the actuators 350 before the latter advance, and to disengage the totalizer therefrom after the actuators are restored to their home positions. As a result, the actuators advance under control of the totalizer to clear the totalizer and set the total amount on the indicator and type wheels, and then return, replacing the total on the totalizer.

When the total lever 57 is moved two steps in a clockwise direction from its adding position to its resetting position, the positioning arm 466 (Fig. 14) rocks the engaging link 458 farther clockwise to shift the coupling stud 460 into an open slot 486 formed in the shoulder of the arm 405 described heretofore in connection with the coupling pinion actuating mechanism.

It will be remembered that the walls of the cam groove 407 in the face of the cam disk 408 function as the machine starts its operation, and before the actuators advance, to rock this arm first clockwise to disengage the coupling pinions 358 from the actuators 350, and then, after the actuators have had time to complete their advance, the cam walls rock the coupling pinion arm 405 counter-clockwise to re-engage the coupling pinions with the actuators and setting segments 357. When the total lever 57 occupies its "reset" position, and the stud 460 lies in the slot 468 of the arm 405, the walls of the cam groove 407 rock the arm 405 to engage the totalizer with the actuators 350 before the latter advance, and then, after the actuators have completed their advance, disengage the totalizer therefrom before the universal bail 252 starts to restore the actuators to their home positions. As a result, the actuators turn the totalizer wheels back to zero where they are arrested under the control of the usual long tooth 448 (Fig. 3) with which each totalizer wheel is provided, after which the totalizer is disengaged from its actuators, thereby leaving the totalizer standing at zero.

Restoration of the total lever 57 to its adding position from either its "reset" or "read" positions, of course, restores the stud 460 of the engaging link 458 to coactive relation with the engaging arm 463 effective in adding operations.

Means is provided to align the totalizer selecting slide 451, and hence the totalizers, against lateral movement while the selected totalizer is in mesh with the actuators 350. For this purpose, teeth 445 (Figs. 12 and 14) on a projection 446 extending downwardly from the totalizer carriage 443, mesh with teeth 447 on the totalizer selecting slide 451 when the totalizer carriage rocks to engage the totalizer wheels with the actuators 350. The disengaging movement of the totalizer carriage, of course, unmeshes the teeth 445 and 447, to free the totalizers for the selection of another totalizer, if desired.

*Lock to prevent unauthorized access to the group totalizers*

In order to prevent the operator from taking a total of either the "Group Total Postage" or "Group Total Cancellation" totalizers, that is, from either "reading" or "resetting" such group totalizers, means is provided to prevent the operator from shifting the total control lever 57 out of its "add" position when any of the group totalizers are in effective position relatively to their actuators, i. e., have been selected for operation.

As one such means there is provided a link 240 (Fig. 14) depending from the total control lever 57 to which it is pivoted at 244. The link is slotted to accommodate a guide stud 241 carried on one arm of a normally stationary yoke lever 242 pivoted at 243 to the adjacent side frame 30.

The lower end of the link 240 extends to a point adjacent the totalizer selecting slide 451, and is provided with a shoulder 471 which is positioned just beneath one edge of the totalizer selecting slide or of a rib 470 thereon, when the total control lever 57 is in its "add" position.

Figure 12:
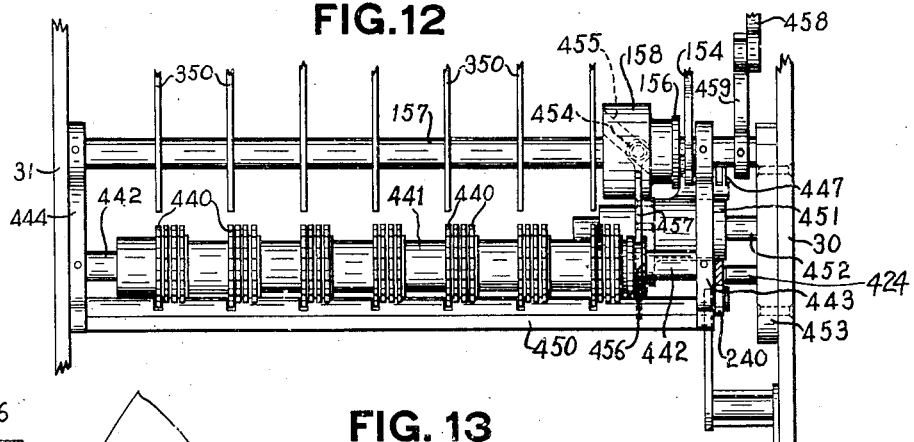
Fig. 12 is a top plan view of the group of totalizers and the totalizer shifting or selecting cam.

The "List Postage" and "List Cancellation" keys 44 and 45, when depressed, to select the corresponding item totalizers, shift the totalizer selecting slide 451 with the totalizers to their extreme limit of travel to the left, as viewed in Fig. 12, or one step short thereof, respectively, in which positions the right-hand end of the totalizer selecting slide 451 lies out of the path of the link 240 to permit the operator to adjust the total control lever 57 to either its "read" or "reset" position, in taking a sub-total or a total of the amounts accumulated on the respective list or item totalizers, but selection of any of the group totalizers for operation by depression of the group totalizer selecting keys 46 or 47, shifts the totalizer selecting slide 451 to the right (Fig. 12) a sufficient distance to position its rib 470 over the shoulder 471 on the link 240 to prevent clockwise adjustment of the total control lever 57 out of its "add" position.

If, when the total lever is in either its "read" or "reset" position, an attempt is made to select a group totalizer by depression of a group totalizer selecting key 46 or 47, the selecting slide 451 is immediately arrested in its travel to the right by contact with the side of the link 240 which is held against yielding, by a stud 424 projecting inwardly from the bracket 453 (Fig. 12).

To enable a duly authorized person, as the proprietor or an employee of the postal service to have access to the totals accumulated on the group totalizers, means under lock and key is provided to displace the link 240 relatively to the totalizer selecting slide 451, to which end, the remaining arm 473 (Fig. 14), of the yoke lever 242 is bifurcated to embrace a stud 494 projecting from an ear 495 carried by and extending at right angles to a slide 496 mounted to shift vertically on the inner face of a lock plate 472, and adapted to be raised and lowered by a key 497 when rotated in the barrel of a lock 498.

The key 497, when turned in one direction, raises the slide 496 to rock the yoke lever 242 clockwise about its fulcrum 243 and causes the guide stud 241 lying in the slot in the lower end of the link 240 to rock the link clockwise about its fulcrum 244 on the total control lever 57, and withdraw the shoulder 471 from beneath the rib 470 on the totalizer selecting slide 451, thereby permitting free clockwise adjustment of the total control lever 57 from its "add" position to its "read" or "reset" position, regardless of which of the transaction keys is depressed.

The key 497, when turned in the opposite direction, restores the shoulder 471 on the link 240 to its locking position beneath the rib 470 on the totalizer selecting slide. The proprietor or postal official may then remove the key 497, thus locking the group totalizers against being read or reset by unauthorized persons.

An opening 499 (Fig. 1) formed in the cabinet opposite the barrel of the lock 498 permits insertion and removal of the key.

*Transfer total*

It has been stated that after either of the item totalizers containing the "List Postage" total, or the "List Cancellation" total is reset to zero, mechanism is provided to compel the operator to transfer the total back into one of the group totalizers before the machine may be operated to add further amounts onto a totalizer or to issue a "permit ticket". For example, after a number of "permit tickets" are issued in the usual manner, and the individual amounts thereof accumulated on one of the item totalizers, the total control lever 57 is adjusted (see Fig. 1) to the "reset" position, and the machine is then operated to clear such item totalizer, as, for instance, that totalizer selected by the "List Postage" key, to print such total.

After this has been done, that is, after the "List Postage" totalizer has been reset to zero, mechanism now to be described, locks the machine against operation until the total lever 57 is adjusted to its "add" position. This having been done, mechanism which was adjusted by the total lever, when shifted to its "reset" position, still remains effective to lock the amount keys against depression. However, the group total posting key 46 may now be depressed, and the machine released for an effective repeat operation by depression of the motor release bar 58, to accumulate the total just taken from the "List Postage" totalizer onto the "Group Total Postage" totalizer, it being remembered that the setting segments 357 are left at the end of a totaling operation in positions corresponding to the digital values of the total amount registered by the totalizer.

The purpose of compelling this transfer total operation is to prevent loss of the totals of the "permit tickets" and the "cancellations", by insuring the transfer of these totals into totalizers which are inaccessible to the operator of the machine so that no mis-manipulation can effect the totals. The group totalizers are normally locked against reading or resetting, as heretofore explained, the key to which lock is in the possession of the proprietor, or of a postal official, who may withdraw the lock (Fig. 14) to enable the total lever 57 to be shifted to either its "read" or "reset" position when either of the group totalizers is adjusted to position to coact with the actuators 350, whereupon such official may read or reset the "Group Total Postage" or "Group Total Cancellation" totalizers at will.

Figure 18:
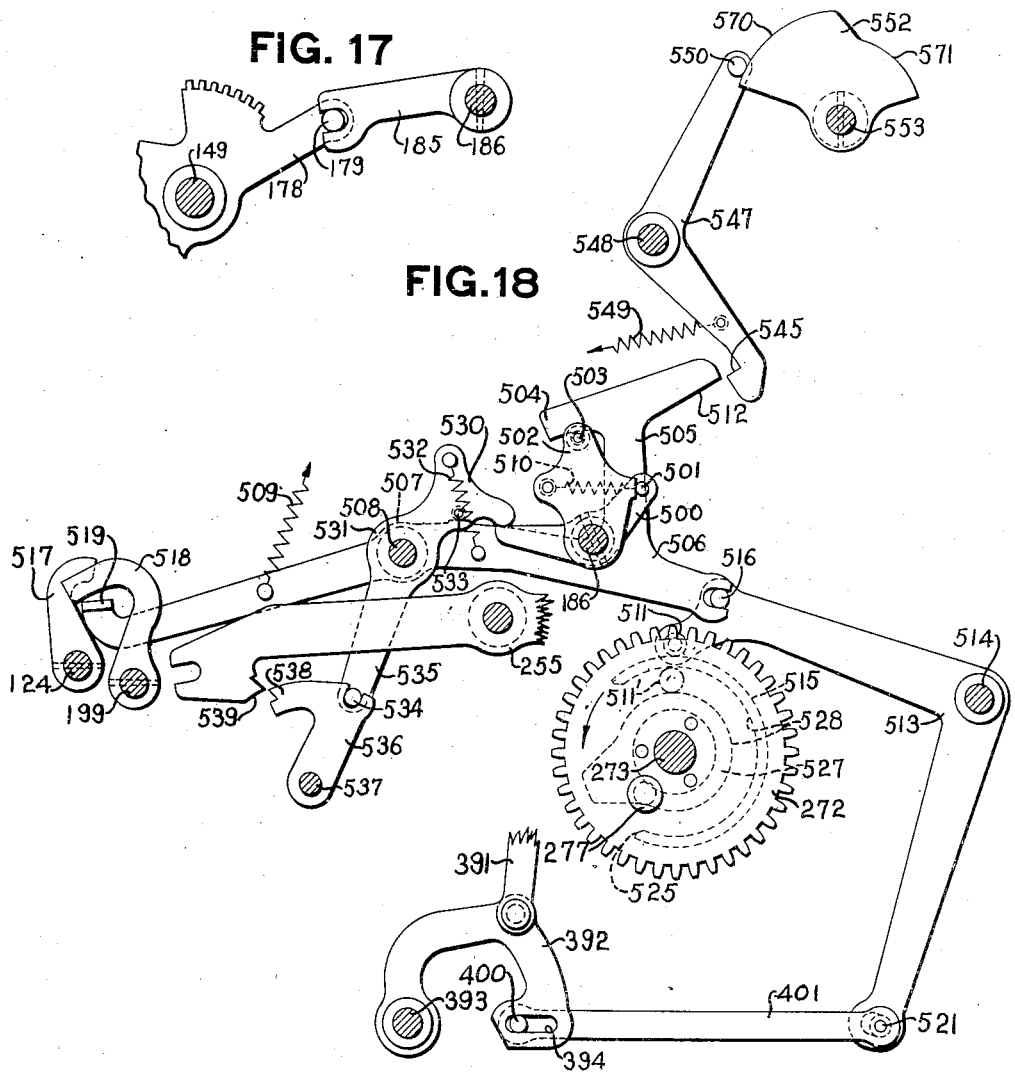
Fig. 18 is a detail view of a part of the mechanism to compel a transfer total operation after certain totalizing operations before the machine can be operated for any other purpose.

The mechanism for compelling the transfer total operation is best shown in Fig. 18. It will be remembered that upon adjusting the total control lever 57 (Fig. 14) to its "read" or "reset" position, the rearwardly extending arm 178 thereof and the stud 179 thereon, rock counter-clockwise the arm 185 and the shaft 186 (Figs. 17 and 18) journaled in the side frames 30 and 31. The shaft 186, in turn, rocks counter-clockwise a lever 500 (Fig. 18), fast on the shaft to the left of, and outside of, the left side frame 31. A stud 501 projecting from one arm of the lever 500, rocks counter-clockwise a restraining arm 502 journaled on the shaft 186 and normally held against the stud 502 by a spring 510, the restraining arm 502, when thus rocked, operating to remove a restraining stud 503 thereon from beneath a tail 504 of a T-shaped projection 505 extending upward from the arm 506 of a lever 507 pivoted at 508 to the side frame 31.

The retaining stud 503 and its yielding arm 502 normally restrain the lever 507 against its tendency to rotate in clockwise direction under the influence of a spring 509 attached to the opposite arm of the lever 507. The arm 506 of the lever 507 is bifurcated to embrace a pin 516 on one arm of a bell crank 513 fulcrumed at 514 to the side frame 31.

As soon as the stud 503 on the restraining arm 502 clears the tail 504 of the projection 505, the spring 509 endeavors to rock the lever 507 clockwise, but such movement is now obstructed by a stud 511 on one arm of the bell crank 513, which stud rests upon the outer periphery of a segmental flange 515 projecting outwardly from one face of the drive gear 272. As later described, the stud 511 rests on the flange 515 until during the last half of a total taking operation, that is, until the end 525 of the flange 515 passes from beneath the stud 511. The remaining arm of the bell crank 513 extends downwardly and is slotted to accommodate a stud 521 on the end of the coupling pinions disabling link 401 which carries the coupling stud 400 connecting the fast and loose arms 403 (Fig. 19), and 392 (Fig. 18), of the coupling pinion rocking mechanism.

The total control lever 57, as it is adjusted to the "reset" position, causes the stud 187 on its depending arm 188 to rock the shaft 124 (Figs. 14 and 18) counter-clockwise, to lock the amount keys against depression, as heretofore explained, and also, by contact of the face 195 on the arm 188 against the stud 196 on arm 197, rocks the cross shaft 199 clockwise, as viewed in Figs. 14 and 18, to lock the repeat key against depression, and rock the coupling hooks 385 to effective position, all as heretofore explained.

The shaft 124 carries a curved arm 517 (Fig. 18) fast thereon which rocks counter-clockwise with its shaft. The shaft 199 also carries a curved arm 518 fast thereon which rocks clockwise as the curved arm 517 rocks counter-clockwise, to separate the ends of these arms 517 and 518 preparatory to receiving there-between a blocking ear 519 extending horizontally from the end of the forwardly extending arm of the lever 507. This ear, when positioned between the arms 517 and 518, prevents restoration of shafts 124 and 199 to normal, and hence retains effective the locking means preventing depression of the amount and repeat keys, and the coupling hooks 385 (Fig. 22) for the complementary actuators 384. The arms 517 and 518 remain separated as long as the total control lever 57 remains in either its "read" or "reset" position.

The restoring gear 272 turns counter-clockwise throughout a single rotation at each operation of the machine, during which, one end 525 of the mutilated annular flange 515 thereon, passes beneath the stud 511 on the arm of the bell crank lever 513. Ordinarily, due to the restraint imposed by the stud 503 of the yielding arm 502 to clockwise rotation of the lever 507, the presentation of the gap between the ends of the mutilated flange 515 to the stud 511 is without effect, but when this occurs on total taking operations, at which time the restraining stud 503 is displaced, the spring 509 rocks the lever 507 clockwise to rock the bell crank 513 counter-clockwise to lower the stud 511, causing the latter to strike one side of the lobe of a restoring cam 527 which immediately rocks the bell crank 513 clockwise and the lever 507 counter-clockwise slightly past home position, to permit the stud 503 on the restoring arm 502 to restore to its effective position beneath the tail 504 if permitted.

But since the total lever 57 continues in its "reset" position, the yielding arm 502 and its stud 503 are held clear of the path of the tail 504, so that, as the lobe of the cam 527 passes from beneath the stud 511 of the bell crank 513, the spring 509 again rocks the lever 507 clockwise and the bell crank 513 counter-clockwise, to cause the stud 511 to ride down the adjacent flank of the lobe and enter an open groove 528 formed by the inner periphery of the flange 515 and the periphery of the restoring cam 527.

The lobe of the cam 527 lies in the opening or gap intermediate the ends of the mutilated annular flange 515, the outer end of the lobe of the cam lying concentric with the exterior periphery of the flange.

Simultaneously with the entry of the stud 511 of the bell crank 513 into the groove 528, the lever 507 in rocking clockwise, positions the ear 519 on its forward arm between the free ends of the hooked arms 517 and 518, on the respective shafts 124 and 199, to maintain these arms apart.

And furthermore, the lever 507 on its clockwise rotation, positions the end of the tail 504 of its T-shaped extension in the path of return of the restraining stud 503.

The bell crank 513 on its counter-clockwise travel, draws the coupling pinion control link 401 towards the right, as viewed in Fig. 18, to position the outer end of its stud 400 in the right-hand end of the slot 394 of the bent arm 392, thereby locating the inner end of the stud in line with the arcuate portion 402 of the slot in the driving arm 403, which disables the coupling pinion rocking mechanism by preventing the driving arm 403 from transmitting movement to the bent arm 392.

At the end of a "reset" operation, the stud 511 on the bell crank 513 occupies a position in the groove 528 indicated by dotted lines at 511' (Fig. 18), the mouth of the groove 528 having advanced but a short distance beyond the stud.

The parts of the machine are now at rest with the total control lever 57 in its "reset" position. A convenient form of mechanism to compel the operator to restore the total lever to its "add" position before the machine may be released for either another total operation or an "add" operation, is as follows.

It will be recalled that in adding operations the clutch control lever 255 (Figs. 13, 18 and 34) is rocked first counter-clockwise to displace the clutch disabling latch 259, and then clockwise to restore the latch 259 to effective position.

Obviously, if the clutch control lever 255 cannot operate to trip the latch, the machine remains idle, and to effect this result a locking means, controlled by the total lever 57, is provided for the clutch control lever 255.

Such lock may conveniently include a locking arm 536 (Fig. 18) pivoted at 537 to the side frame 31 and having a recessed nose 538 adapted to enter the path of the clutch control lever 255 to prevent its clockwise travel.

One arm of a lever 531 pivoted at 508 to the adjacent side frame, carries a pin 534 entered in a slot in the locking arm 536, and a spring 532 urges the lever 531 clockwise to rock the locking arm 536 to effective position.

As long as the total control lever 57 remains in its "add" position, the forwardly projecting arm of the lever 500 contacts the rounded end of the arm 530 of the lever 531 to restrain the latter against clockwise travel under spring tension, and holds the locking arm 536 idle.

However, when the total control lever 57 rocks the lever 500 (Fig. 18) counter-clockwise, preparatory to performing a totalizing operation, the forwardly extending arm of the lever 500 withdraws from beneath the rounded end of the arm 530, and after the arm of the lever 500 is rocked out of the way of the arm of the lever 531, a stud 533 on the arm 530, and, normally in contact with the lever 507, still restrains the lever 531 and locking arm 536.

But, when, during a "reset" operation, the lobe of the cam 527 passes from beneath the stud 511 on the bell crank 513, and the spring 509 rocks the lever 507 clockwise, to cause the stud 511 to enter the groove 528, the lever 531 follows in clockwise direction under the influence of its spring 532, and in so doing, rocks the locking arm 536 to position its nose 538 beneath the edge 539 of the clutch release lever 255. However, just prior to the movement of the arm 536 beneath the edge 539 of the lever 255, the stud 277 moves the lever 255 to its locking position shown in Figs. 18 and 34, to permit such movement of the lever 536, to prevent counter-clockwise movement of this lever, which would release the machine for operation, as heretofore explained. Therefore, the machine cannot be released for operation before the arm 536 is withdrawn, and such withdrawal is effected by moving the total lever to its "add" position, as described below.

Thus, the operator cannot depress the starting key 58 to effect a second operation of the machine while the total control lever 57 is out of its "add" position, and because the lever 507 remains at its extreme clockwise limit of travel, the ear 519 on the forward arm thereof holds the shafts 124 and 199 in their set positions to prevent depression of the amount and repeat keys.

The only way in which the machine may now be released for operation, is to displace the nose 538 on the locking arm 536 from beneath the clutch-release lever 255, and the only way in which this may be done, is to rock the total control lever 57 counter-clockwise to its "add" position, during which movement the arm 178 (Fig. 14) and the stud 179 rock the arm 185, shaft 186 (Fig. 18) and the lever 500 clockwise, and as the lever 500 returns to its normal position it contacts the rounded end of the arm 530 of the lever 531 and rocks the latter counter-clockwise relatively to the lever 507 and against the tension of the spring 532 to restore the locking arm 536 to, and hold it in, its normal ineffective position.

The machine may now be released by merely depressing the releasing bar 58. But this is the only operation that can be effected, except pressing a transaction key, since the lever 507 remains in its adjusted position with its ear 519 retaining effective the locking devices for the amount and repeat keys.

Thus, the locking arm 536 serves to compel the restoration of the total lever 57 to its "add" position. When the total control lever 57 is restored to adding position under the condition just described, the spring 510 (Fig. 18) draws the restraining arm 502 clockwise with the lever 500 until the stud 503 strikes the end of the tail 504, thereby arresting the clockwise movement of the restraining arm. The lever 500, however, continues its clockwise travel to normal position, stretching the spring 510. After the total lever 57 has been returned to its "add" position, the desired "group" key 46 or 47 is depressed to select the proper totalizer into which the total is to be transferred.

As disclosed, it would be possible to mismanipulate the machine by depressing a key 44 or 45 and transferring the total, either back into the totalizer from whence it was taken, or into another totalizer not intended for receiving such transfer totals, yet no serious result would obtain since, a record of such act is made on the detail record strip, so that such improper operation will be discovered immediately upon inspection of the printed strip.

It will be remembered that the setting segments 357 (Fig. 3) are left in the positions to which they were set at the last operation of the machine. In the instant case, the actuators 350 were moved on the previous operation, which was a reset operation, under the control of the totalizer wheels 440, and the setting segments 357, gears 414, segments 415, and indicators 420 were consequently adjusted to positions corresponding to the digital amounts on the several totalizer wheels 440, and were left in their several positions at the end of the operation just completed.

The total control lever 57 now stands in the "add" position as required to release the locking arm 536. The coupling pinion actuating mechanism is still disabled by the displacement of the stud 400 (Fig. 13) which was drawn to the right-hand end of the slots 394, 402 and 404 by the link 401 when the bell crank 513 was rocked counterclockwise, and since the total last taken was that accumulated on the "List postage" totalizer, and should be stored in the "Group total postage" totalizer, the operator will have depressed the transaction or totalizer selecting key 46 to position this group totalizer opposite the actuators 350.

With the parts in the positions just described, the release bar 58 is depressed to release the machine for operation. When the universal rod 352 travels clockwise, (Fig. 3) the setting segments 357 and the actuators 350 follow under the influence of the springs 351 until they are arrested by the contact of the ends of the concentric slots 418 in the indicator segments 415 with the abutment rod 417, at which time, the setting segments rest in their home positions and the actuators in the positions to which they were moved on the totalizing operation immediately preceding, under the control of their respective totalizer wheels. It will be borne in mind that, because the rocking mechanism for the coupling pinions is disabled, the coupling pinions 358 remain in mesh with the actuators 350 and the segments 357, as in repeat operations.

Since it is desired to add the totals into the appropriate group totalizer selected, the cam 475 (Fig. 15) now operates to engage the totalizer wheels 440 with their actuators 350, after which the universal rod 352 returns to its home position, carrying the actuators 350 therewith, and thus adding an amount equal to the total previously taken from the totalizer on the preceding operation, onto the totalizer selected by depression of the transaction key 46 immediately before the commencement of the instant operation. The coupling pinions 358, gears 414 and segments 415 rotate the indicators like distances to cause them to again indicate the total accumulated in the selected totalizer.

On this transfer total operation, the restoring gear 272 (Fig. 18) makes a single complete rotation, as usual, and the stud 511 of the bell crank 513 is retained in the concentric groove 528 until, near the end of such rotation, the lobe of the cam 527 forces the stud out of the groove, raising it slightly above its home position, and in so doing, rocks the bell crank 513 clockwise and the lever 507, with its T-shaped extension 505, counter-clockwise. As soon as the tail 504 of the extension 505, clears the restraining stud 503, on the counter-clockwise travel of the lever 507, the spring 510 snaps the restraining arm 502 clockwise beneath the tail 504, to retain the parts in their home positions against the tension of the spring 509. The stud 501 on the lever 500, which was rocked to normal position by the total lever 57 when adjusted to its "add" position before the machine was released for the transfer total operation, arrests the restraining arm 502 in effective position.

Restoration of the lever 507 to its normal position, rocks downwardly the ear 519 on the forward arm thereof from between the curved arms 517 and 518 on the locking shaft 124 and the cross shaft 199, respectively, whereupon the spring 208 (Fig. 13) rocks the slotted arm 206 counterclockwise to its normal position to remove the tail 205 of the arm from beneath the stud 207 on the repeat key lever 174, and free the repeat key for operation.

Likewise, upon the displacement of the ear 519, the springs 80 (Fig. 3) for the zero stops 78 act upon the disabling arms 192 to restore such arms and the locking shaft 124 to their normal positions and free the amount keys, which include the weight and zone keys and the half-cent key, for operation, the curved arms 517 and 518 on the shafts 124 and 199 being rocked to their normal positions, as shown in Fig. 18.

Also, the bell crank 513, on its return to normal, thrusts the link 401 (Fig. 18) towards the left to reconnect the bent arm 392 with its operating arm 403. Near the end of the transfer total operation, as the restoring gear 272 completes its rotation, it introduces the flange 515 beneath the stud 511 of the bell crank 513. The machine is now in condition to perform any operation of which it is capable under the regular control devices therefor.

It is only desired to compel transfer total operations following those resetting operations at which a totalizer selected by depression of either the "List Postage" key 44 or the "List Cancellation" key 45 (Fig. 7) is cleared, in order to preserve these totals by transferring them to the "Group Total Postage" totalizer and the "Group Total Cancellation" totalizer, respectively. This requirement is not present when the proprietor or postal official resets the "Group Totalizers", therefore, mechanism is provided under the control of the transaction keys 44 to 47 to determine whether the transfer total enforcing mechanism just described shall become effective or remain ineffective.

It will be recalled that the locking lever 507 carries a T-shaped extension 505, and has a limited travel clockwise from the position shown in Fig. 18, upon the displacement of the total lever-controlled restraining arm 502 with its stud 503 and the presentation of the gap between the ends of the mutilated annular flange 515 to the stud 511 on the bell crank 513.

As a convenient means to control the effectiveness or ineffectiveness of the mechanism to compel an automatic repeat operation after a totaling operation involving the use of certain of the totalizers, there is provided a latch 545 (Fig. 18) on one arm of a lever 547 pivoted at 548 to the side frame 31, which latch is adapted to coact with a projection 512 of the T-shaped extension 505 on the locking lever 507 to retain the latter in its normal idle position, against the tension of its drive spring 509.

A spring 549 urges the latch lever 547 in a clockwise direction to hold a stud 550 on the other arm of the latch lever in contact with the periphery of a cam 552 fast on a shaft 553 journaled in the indicator frames 36. This shaft and cam are differentially set under the control of the transaction keys, as follows.

The toothed portion of the segment 555 (Fig. 7) meshing with the gear 554 differentially driven by the transaction setting segment 357, is of greater extent than those on the corresponding segmental gears 555 for the amount banks, in order to mesh with a pinion 556 fast on a shaft 557 journaled in the indicator frames 35 and 36. A pinion 558 also fast on the shaft 557, meshes with a pinion 559 fast on a shaft 560 journaled in the indicator frames 35 and 36, and having a pinion 561, fast thereon, meshing with a segmental gear 562 journaled on a rod 563 which segmental gear 562, in turn, meshes with a gear 564 fast on the shaft 553. A clearance slot 565 in the segment 562 surrounds a tie rod 566 extending between the indicator frames 35 and 36. The differential adjustment of the setting segment 357 for the transaction bank is thus transmitted by the train of gears, just described, to correspondingly set the cam 552 to any one of the several positions determined by the particular key 44—47 depressed. The periphery of the cam 552 is divided into high and low areas 570 and 571.

When the machine is operated with either the "List Postage" key or the "List Cancellation" key depressed, the differential mechanism associated therewith, through its train of gears, adjusts the cam 552 to maintain a high area 570 of the cam 552 in co-operative relation with the stud 550 (Fig. 18) on the latch lever 547, to hold the latch 545 thereon in ineffective position relatively to the locking lever 507. This permits the transfer total enforcing mechanism (Fig. 18) to function, as described. But, if one of the group total keys 46 or 47 is depressed, and the machine be operated, the cam 552, under the influence of the transaction differential and its train of gears, turns to position a low area 571 in co-operative relation with the stud 550 of the latch lever, whereupon, the spring 549 rocks the latch lever 547 clockwise to position the latch 545 beneath the prong 512 of the T-shaped extension 505 of the lever 507, to hold the transfer total enforcing mechanism ineffective.

Obviously, the periphery of the latch-controlling sector 552 may have the high and low areas thereon variously arranged to enable any of the transaction keys 44—47 to position the latch accordingly, and when the latch is effective, totals can be taken from any of the totalizers at such times positioned opposite the actuators, and the totalizers left clear.

*Printer*

The printing mechanism provided in the machine chosen to illustrate one form of the present invention, is similar to that described in the above mentioned patents, Nos. 1,795,509 and 1,929,652, and includes, generally, groups of type carriers (Fig. 24) simultaneously set by the differential mechanisms under the control of the depressed keys, or of the totalizer wheels, depending upon the nature of the operation. Printing hammers are provided to take impressions from the types, one to take impression from one group of type wheels on an issuing detail strip, and another to take a plurality of impressions at each operation of the machine from the remaining group of type carriers, one of such impressions being made on an issuing "permit ticket", and another on a permanent detail record strip, retained in the machine. The issuing detail hammer is actuated at each operation to effect a single impression on the issuing detail strip, but means is provided to control the permanent detail and ticket printing hammer at will, so that one of its impression movements may be eliminated when it is not desired to print a "permit" ticket. This hammer, however, makes one impression on the permanent detail record strip at each operation of the machine.

*Printer—type wheels*

Figure 32:
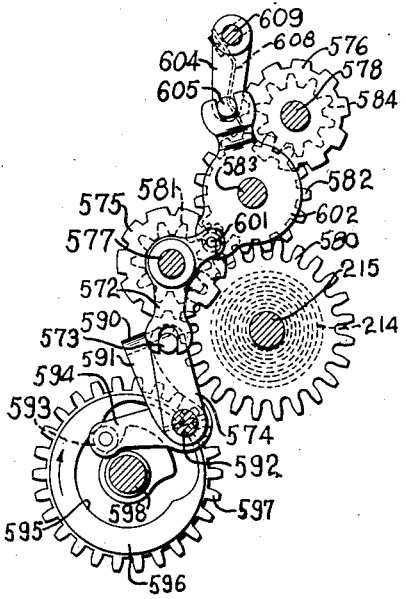
Fig. 32 is a detail view of the type wheel aligners and the operating means therefor.
Figure 33:
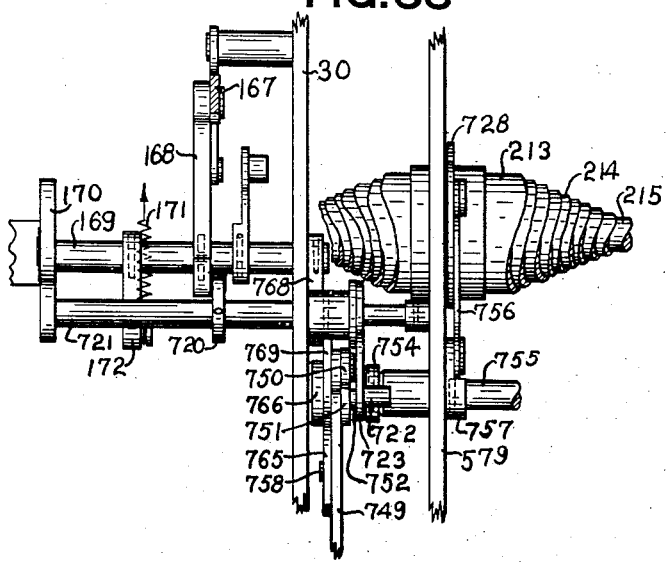
Fig. 33 is a fragmentary view in front elevation of the disabling device for the consecutive number printer.

The groups of type wheels or carriers 575 and 576 are rotatively mounted on the respective supports 577 and 578, projecting from a printer frame 579, suitably secured to right side frame 30 and spaced therefrom (Fig. 33). The shaft 215 and the nested tubes 213—214 extend from the accumulating section of the machine, through the side frame 30 and printer frame 579, into the printing mechanism, and have gears 580 (Fig. 32) fast on the outer ends thereof, meshing with gears 581, one fast on the side of each of the type wheels 575. The gears 580 also mesh with a group of intermediate pinions 582 rotatively mounted on a support 583 projecting from the printer frame 579, which pinions mesh with type wheel gears 584, fast on the sides of the respective type wheels 576. Thus, the differential rotation of the gears 414 (Fig. 3) and of the tubes 214 imparted thereto by the setting segments 357—383 is transmitted to the type wheels 575, 576 to set these wheels to print characters corresponding to the depressed keys of the keyboard.

An ink ribbon 585 (Fig. 24) adapted to be alternately wound and unwound on two spools 586 and 587 rotatively supported on studs 588 and 589 projecting from the printer side frame 579, is interposed between the groups of type wheels 575 and 576 and their respective printing hammers 610, 611. A plurality of studs projecting from the printer frame 579 guide the ribbon to clear the gears 580 and the type wheels. Feed and reverse mechanism for the ribbon may be like that shown in the former Robertson patents referred to, and is not shown herein.

After the type wheels are set, they are aligned to hold them stationary while impressions are being taken therefrom.

An aligner bar 590 (Fig. 32) carried by a pair of arms 591 fast on a short rock shaft 592 journaled in the printer frame 579 and in the printer bracket 217, (Fig. 23), respectively, is rocked into and out of the inter-dental spaces of the gears 580. Normally, the aligner bar 590 is disengaged from the gears 580. To rock the shaft 592, a stud 593 on an arm 594 also fast on the short shaft 592, projects into a cam groove 595 in the face of a cam 596 secured to a gear 597 journaled on a rod 598 suitably supported in the machine side frame 30 and the printer frame 579. A gear 599 (Fig. 35) journaled on a stud 600 supported between the frames 30 and 579 meshes with the gear 597 and with the gear 320, which, it will be remembered, meshes with the gear 322 fast on the drive shaft 276. It will be remembered, also, that the shaft 276 makes one complete rotation in counter-clockwise direction at each operation of the machine, and, through the train of gears just described, rotates the gear 597 and cam 596 one rotation in clockwise direction at each operation of the machine. The gear 320 also meshes with the toothed wheel 301 turning about the stud 303, the toothed wheel meshing with the crank-actuated pinion 298, so that the parts may be operated by the hand crank or by motor.

After the type carriers have been set according to the keys depressed (or, in case a totalizing operation is being performed, according to the amount registered on the several totalizer wheels) and the machine starts its operation, the walls of the cam groove 595 (Fig. 32) function to rock the arm 594, shaft 592 and arms 591 clockwise to shift the aligning bar 590 into one of the spaces between the teeth of the gears 580, to align these gears and the type wheels 575.

Due to lost motion between the gears 580, 582 and 584 for setting the type wheels 576, the alignment of the gears 580 by the bar 590 does not always align the type wheels 576 with sufficient accuracy. Therefore, a separate aligner 608 (Fig. 32) is provided to cooperate with the gears 584, fast with the type wheels 576, to align these type wheels directly. The aligner comb 608 is secured to a flat side of a rock shaft 609 journaled in the frame 30 and in the bracket 217. To operate this aligner 608, one arm of a bell crank lever 572 journaled on the stud 577, is bifurcated to embrace a stud 573 on an arm 574 fast on the rock shaft 592. A stud 601 on the other arm of the bell crank lever 572 projects through a slot in one arm of a disk lever 602, journaled on the stud 583, the other arm of the disk lever 602 being bifurcated to embrace a stud 603 on the free end of an arm 604 fast on the rock shaft 609. Obviously, the shaft 592, when rocked by the cam groove 595 and the arm 594, actuates the leverage just described, to rock the shaft 609 to engage and disengage the aligner 608 relatively to the gears 584 at the proper times during the operation of the machine.

*Printer—impression hammers*

After the type wheels 575 and 576 are set under control of the keys on the keyboard, or of the totalizer, and are aligned in their new positions, printing hammers are operated to take impressions therefrom on an issuing detail strip, a permanent detail record strip, and on an issuing gummed label or ticket, which is adapted to be severed and ejected from the machine, and which forms a "postage permit ticket" to be applied to the parcel for which it was issued. These hammers are of the same type as the hammers disclosed in the Robertson patents, Nos. 1,795,509, 1,924,290, and 1,929,652, above referred to.

The printing hammers of the present invention include platens 610 (Figs. 23 and 24) and 611 carried by hammer arms 612 and 613, respectively. The hammer arm 612 forms a part of a lever 614 pivoted on the stud 303, supported in the frames 30 and 579. A spring 616 normally holds a stud 617 on the lever 614 against the face of a projection 618 on an operating arm 619 also pivoted on the stud 303. A strong spring 620 normally holds the hammer operating arm 619 against an abutment 621 on the side frame 30, with one end of the arm adjacent a hammer operating cam 632. The hammer arm 613 is similarly pivoted on a stud 622 supported in the frames 30 and 579. A spring 623 normally holds a stud 624 on the tail 625 of the hammer supporting arm 613, against the face of a projection 626 of a hammer operating lever 627, also pivoted on the stud 622. A strong spring 628 attached to one arm of the lever 627, holds a roller 630 on the other arm 631 of the lever 627 against the periphery of the hammer-cocking cam 632 fast on the drive shaft 276.

As the shaft 276 and the cocking cam 632 rotate, lobes 633 and 634 on the cam successively engage the roller 630 to rock the hammer-operating lever 627 clockwise against the tension of its spring 628, to retract the hammer 611. A stud 635 on the arm 631 of the hammer-operating lever 627 projects beneath a lug 636 on the hammer-operating arm 619, so that as the hammer-operating lever 627 is rocked by the cam 632, the hammer-operating lever 627 will rock the hammer-operating arm 619 counter-clockwise against the tension of its spring 620, the spring 616 retracting the hammer 610 as the projection 618 withdraws from the stud 617. As the lobes 633 and 634 of the cam pass from beneath the nose 637 and roll 630 on the arm 631, the lever 627 and the arm 619 are freed to the action of their drive springs 628 and 620, which immediately rock the lever 627 and arm 619 sharply towards each other until the lever is arrested by contact of its nose 637 with the low face of the cam 632, the arm 619 being arrested by the abutment 621.

The hammer-operating lever 627, under the influence of its drive spring 628, rocks the hammer arm 613 counter-clockwise to cause the platen 611 to strike sharply against the type wheels 576 to take two impressions from the type wheels at each operation of the machine. The first of these impressions, that is, the one generated by the lobe 633, is made upon the issuing check or "permit ticket". The second impression, caused by the lobe 634, is made on the permanent record strip, the "permit ticket" having been ejected from the machine immediately following the first impression.

At the clockwise operation of the hammer-operating lever 627, the stud 635 thereon rocks the hammer-operating arm 619 counter-clockwise against the tension of the drive spring 620, the spring 616 at the same time rocking the hammer arm 612 counter-clockwise to hold the stud 617 against the projection 618, thereby retracting the platen 610. However, it is only desired to make one impression at each operation of the machine from the issuing detail strip, and for this reason a segment 638 secured to the cocking cam 632, moves under the foot 639 on the free end of the operating arm 619 before the lobe 633 clears the nose 637, thereby restraining the operating arm 619 against the action of the spring 620 while the spring 628 is free to rock the operating lever 627 counter-clockwise to make the first impression on the "permit ticket". Just before the radial side of the lobe 634 clears the nose 637 to enable the second impression to be made on the permanent record strip by the hammer platen 611, the segment 638 clears the foot 639 of the operating arm 619. However, the operating arm 619 is still held retracted by the contact of the stud 635 on the operating arm 631 with the lug 636 of the operating arm 619. When the lobe 634 clears the nose 637, to enable the return of the operating lever 627 to normal position, the spring 620 is freed to rock the operating arm 619 sharply clockwise to drive the platen 610 against the type wheels 575, and cause an impression to be made upon the issuing detail strip.

*Printer—Rebound preventer*

The operating arm 619 is arrested on its clockwise movement by the abutment 621 and the operating lever 627 is arrested on its counter-clockwise movement by the nose 637 striking the low area of the cam 632. The momenta of the hammer arms 612 and 613, however, snap their respective platens into contact with the type wheels 575 and 576 to take the impressions therefrom, and in so doing, move relatively to the operating arm 619 and operating lever 627 to move their studs 617 and 624 away from the projections 618 and 626. The resiliency of the platen material assisted by the springs 616 and 623 causes the hammer arms to recoil after delivering their blows, so that the studs 617 and 624 again contact the projections 618 and 626, respectively, with sufficient force, it may be, to cause them to rebound against the type wheels, and effecting a double impression or smudge. To obviate the possibility of this undesirable condition, individual rebound preventers are provided for the hammers. The rebound preventers operate on the same principle, but due to difference of structure it is deemed advisable to describe both of them.

A flattened pin 645 on the lower arm 646 of the hammer lever 614 normally lies in a recess formed in the upper edge of a rebound preventing arm 647 pivoted on a stud 648 supported between the frames 30 and 579. One wall of the recess is inclined. A larger recess formed in the upper edge of a detent slide 649 slidably supported on the pivot stud 648 and on a guide stud 650 projecting from the rebound preventing arm 647 also loosely embraces the pin 645 on the lever arm 646, to enable movement of the pin 645 relatively to the recess in the slide 649.

The slide 649 rocks with the rebound preventing arm 647 about the stud 648, and slides endwise relatively to the studs 648 and 650, but is normally prevented from sliding towards the pivot stud 648 by a stop 651 projecting from the frame 30, which lies in the path of a shoulder 652 on the slide 649. A spring 653 normally holds the parts in the positions in which they appear in Fig. 24, with the upper edge of the slide 649 in contact with the stud 651.

When the hammer lever 614 rocks counter-clockwise, under the influence of the spring 616, as the cam 632 retracts the arm 619 counter-clockwise, the pin 645 in the lower arm of the hammer lever, acting on the inclined side wall of the recess in the rebound preventing arm 647, cams this arm counter-clockwise about the stud 648, the slide 649 rocking therewith until the pin 645 strikes the right-hand side wall of the recess in the slide 649 which, by this time, has been rocked counter-clockwise to cause the shouldered projection 652 to clear the stud 651. Farther counter-clockwise movement of pin 645 and its lever 614 shifts the slide 649 bodily towards the stud 648 to position the shouldered projection 652 on the slide beneath the stud 651, which also holds the rebound preventing arm. The segment 638 now rocks beneath the foot 639 on the hammer-operating arm 619, to hold the issuing detail hammer 610 in its retracted position until, shortly before the end of the operation, the lobe 634 passes from beneath the nose 637, whereupon the spring 620 rocks the hammer-operating arm 619 sharply clockwise until arrested by the stud 621, and drives the platen 610 sharply against the type wheels 575 to take an impression therefrom.

On this clockwise movement of the hammer lever 614, the pin 645 in the arm 646 thereof sweeps across the recess in the slide 649 unimpeded by the recess in the rebound preventing arm 647 and strikes the left-hand wall of the recess in the slide to shift the slide to the left (Fig. 24) and displace its projection 652 from beneath the stud 651, the pin 645 passing above the recess in the rebound preventing arm 647, which latter, as the shoulder 652 clears the stud 651, rocks clockwise under the influence of the spring 653 until an unrecessed portion 643 of the upper edge of the arm, strikes the pin 645. The resiliency of the platen 610 and the spring 616 now partially retract the hammer until the stud 617, striking the projection 618 on the operating arm 619, tends to cause the hammer to rebound in clockwise direction due to the resiliency of the drive spring 620. However, as the hammer and its lever 614 recoil after making the impression, the pin 645 is positioned over the recess in the rebound preventing arm 647 to free the arm to the action of the spring 653, which immediately rocks the rebound preventing arm 647 and the slide 649 clockwise about the pivot stud 648 until they are arrested by contact of the slide with the stud 651. Now, should the hammer lever 614 attempt to rebound from the operating arm 619, the stud 645 will collide with the abrupt side wall of the recess in the rebound preventing arm 647 which arrests clockwise travel of the hammer lever 614 on the rebound before the platen 610 can strike the type wheels 575 a second time, thereby preventing a double impression or smudge.

The rebound preventer associated with the check and permanent record hammer 611 operates on the same principle, but is of somewhat different structure than the one just described.

When the cocking cam 632 (Fig. 24) rocks the operating lever 627 which draws the spring 623, to rock the hammer arm 613 clockwise and retract the hammer, a stud 654 on an ear 655 at the upper end of the arm 613, wipes along a reduced inclined edge formed on one arm of a rebound-preventing lever 656 pivoted intermediate its ends on a stud 657 supported in the side frame 30, and rocks the rebound-preventing lever clockwise. A stud 658 on the other arm of the rebound-preventing lever 656 projects through a slot in a detent slide 659 shiftable longitudinally of the rebound-preventing lever 656, and rocks the detent slide clockwise with the rebound-preventing lever 656, against the tension of a spring 660 which normally tends to hold the inclined edge of the rebound-preventing lever 656 in contact with the stud 654.

Figure 24:
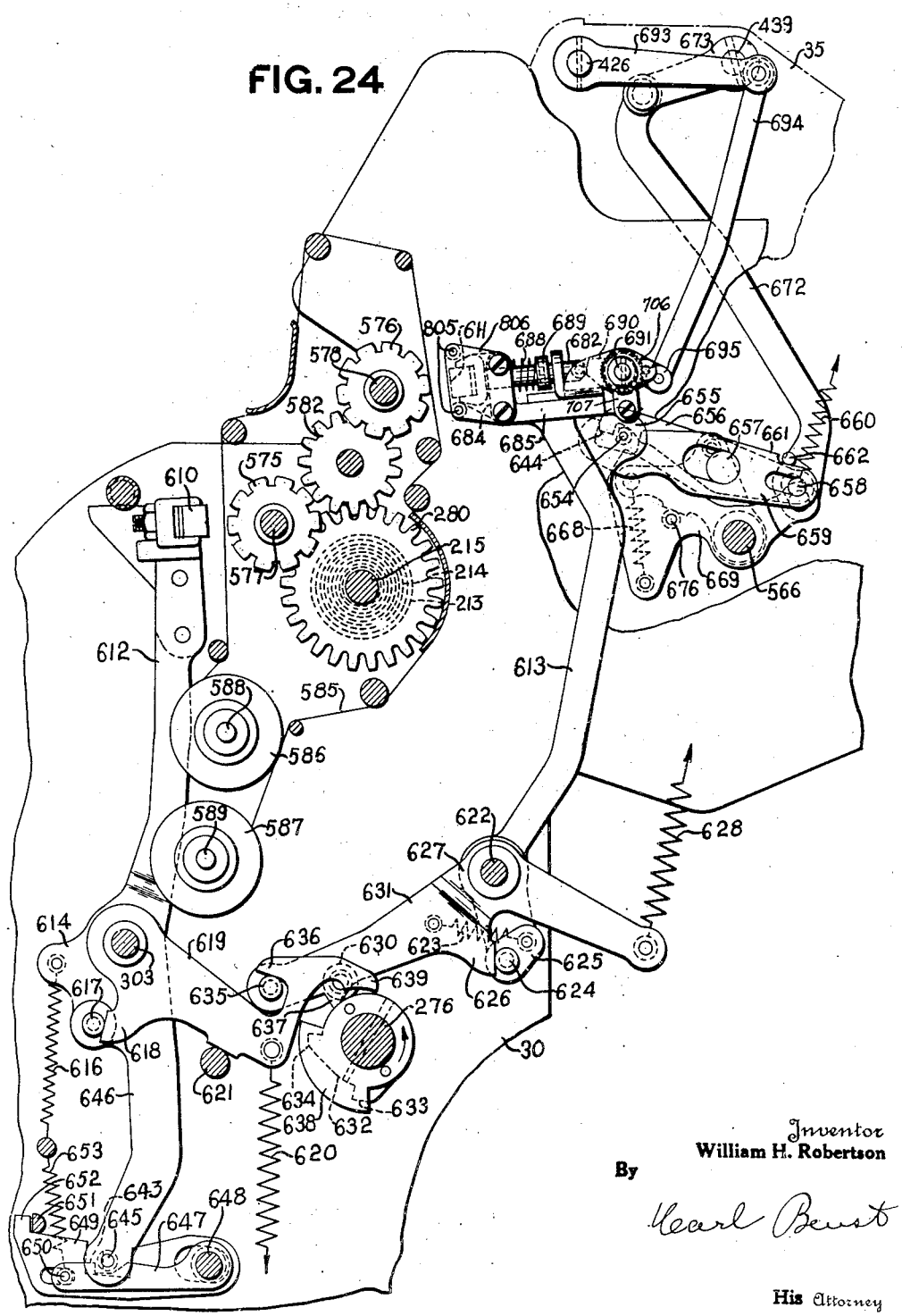
Fig. 24 is a detail view of the printing hammer and operating mechanism therefor.

The stud 654 also lies and is shiftable within a notch formed near the left-hand end of the detent slide 659, and, as the stud 654 moves clockwise, it strikes the abrupt right-hand side wall of this recess and moves the slide 659 towards the right, as viewed in Fig. 24, to position a shoulder 661 on the upper edge of the slide, beneath a stud 662 projecting from the frame 30. Now, as the drive spring 628 rocks the operating lever 627 and the hammer arm 613 counter-clockwise to take the impressions from the type wheels 576, the stud 654 moves with the hammer arm 613 and strikes the abrupt left-hand wall of the recess in the slide 659, carrying the detent slide therewith towards the left to displace the shoulder 661 from beneath the stud 662, whereupon the spring 660 attempts to rock the rebound-preventing lever 656 and the detent slide 659 counter-clockwise, movement of which, however, is prevented at this time by contact of a lug 644 on the rebound-preventing lever 656 with the stud 654.

The hammer 611, having struck the type wheels 576 to take the impression therefrom, the spring 623 immediately rocks the hammer arm 613 clockwise until the stud 624 strikes the projection 626. On this clockwise movement of the hammer arm 613, its stud 654 registers with the reduced edge of the rebound-preventing lever 656, whereupon the spring 660 rocks the lever 656 counter-clockwise so that when the hammer now rebounds from the resiliently held operating lever 627, the stud 654 is arrested by the shoulder formed by the lug 644 in the reduced edge of the lever 656, to prevent further counter-clockwise rebound of the hammer.

Control of ticket printing and issuing means by transaction keys

The "List postage" key 44 (Figs. 7 and 25), when depressed, controls the printing mechanism to issue a "permit ticket". However, when operating the machine under the control of the "List Cancellation", "Group Total Postage", or "Group Total Cancellation" keys, it is not desired to print and issue a "permit ticket" as, on these transactions, no parcels are being prepared for mailing, and therefore, no postage amount is being entered in the machine. Thus a "permit ticket" is only issued when registering amounts of postage, which only occurs when the machine is operated with the "List Postage" key 44 depressed.

Depression of any one of the three keys, 45, 46 or 47, operates mechanism in the printer to disable the "permit ticket" printing means for one stroke and for rendering ineffective the "permit ticket" issuing mechanism. Depression of one of the transaction keys, just mentioned, forces its key pin 103 inwardly along an inclined wall of a recess formed in the periphery of a printer control sector 165 (Figs. 7 and 25) on the outer end of an arm 166 pivotally mounted on the differential supporting shaft 149, and rocks this arm in a clockwise direction. There is a recess with an inclined wall formed in the periphery of the sector 165 for each of the keys 45, 46 and 47. Depression of any of keys 45, 46 or 47 rocks the sector 165 and the arm 166 through a fixed and equal arc of travel. A link 167 connects the sector 165 with one arm of a lever 168 fast on a short shaft 169 (Figs. 7, 14, 25, 30, 31 and 33) journaled in the right side frame 30 and in a bracket 170 secured to the cross frame 33. The sector 165 and its arm 166, when rocked clockwise by depression of one of the keys 45, 46 or 47, thrusts the link 167 and the lever 168 to the right to rock the shaft 169 slightly clockwise.

A pitman 663 (Figs. 7 and 25), one end of which is pivotally connected at 675 to the lever 168, is slotted at its opposite end to embrace and slide upon a supporting stud 664 projecting inwardly from the side frame 30.

Normally, a shoulder 665 on the pitman 663 lies in the path of a stud 666 mounted on an arm 667 journaled on the tie rod 566 and connected by a spring 668 to one arm of a hammer-arresting lever 669 also pivoted on the tie rod.

A stud 670 on the opposite arm of the hammer-arresting lever 669 is held at one end of a slot 671 formed in the depending end of a link 672, by the tension of the spring 668, the upper end of the link 672 being pivoted to an arm 673 (Fig. 24) fast on the cross shaft 439 in the indicator frame.

It will be recalled that a second arm 438 (Fig. 7) on the shaft 439 has a pin and slot connection 436 with the upper end of a thrust link 433, which is reciprocated up and down by the cams 427, 428 at each operation of the machine, to control the indicator detents 425.

Obviously the thrust link 433, in its reciprocation, rocks the arm 438 and shaft 439 to lower and raise the link 672, (Fig. 25), the lower end of which link, due to its slot 671, moves idly relatively to the stud 670. A stud 676 in the lever 669 co-acts with one edge of the arm 667 which, it will be remembered, is normally prevented from counter-clockwise travel by contact of its stud 666 with the shoulder 665 on the pitman 663, to prevent the arresting lever 669 from rocking during those operations of the machine wherein the "List Postage" key 44 is depressed.

When, however, any of the transaction and totalizer selecting keys 45, 46 or 47 is depressed, it rocks the arm 166, and through the link 167, rocks the lever 168 to thrust the pitman 663 rearwardly; the pitman, in turn, rocking the arm 667 clockwise to tension the spring 668, the arresting lever 669 being held against clockwise rotation by the contact of the stud 670 with the lower end of the slot 671.

Now, when the link 672 shifts downwardly (Figs. 24—25) it releases the arresting lever 669 to the action of the tensioned spring 668 which rocks the lever clockwise to position its broad end 674 opposite the stud 654, to block and prevent retraction of the hammer arm 613.

The clockwise travel of the arresting lever 669 is limited by contact of its stud 676 with the edge of the spring-tensioning arm 667.

The arresting lever 669 remains in its effective position to prevent the hammer 613 from making the first of its two impressions, and if permitted, would prevent the second impression as well.

However, in the present instance, it is desired to obtain one impression on the detail record strip, and therefore, means is provided and so timed in relation to the operation of the hammer-retracting means, as to restore the hammer-arresting lever 669 to its idle position prior to the retraction of the hammer arm 613 preparatory to making the second impression.

To this end, after the lobe 663 (Fig. 24) of the cam 632 has passed the nose 637, and before the hammer is retracted to take the second impressions, the cams 427—428 (Fig. 7) raise the link 433, rocking the shaft 439 and arm 673 clockwise to draw the link 672 upwardly. The link 672, acting through the slot 671 and stud 670, rocks the arresting lever 669 counter-clockwise to remove its broad end 674 from the path of the stud 654, thus permitting retraction of the hammer to cause the second impression.

As long as one of the transaction keys 45, 46 or 47 is depressed, the pitman 663 (Fig. 25) remains in its right-hand position, holding the spring tensioning arm 667 at its clockwise limit of travel. Under this condition, the cams 427—428 (Fig. 7) lower and then raise the link 672 at each operation of the machine to permit the spring 668 to rock the stop lever 669 to effective position, thereby preventing the first impression blow of the hammer arm 613.

The key pin 103 (Fig. 7) of the "List Postage" key 44 does not coact with the sector 165 and arm 166, and upon depression of the "List Postage" key the depressed transaction key 45, 46 or 47 is released, as heretofore explained, and returns to its normal position, withdrawing its key pin 103 from the sector 165, which frees the sector and its connected mechanism to the action of the spring 171, which rocks the shaft 169 counter-clockwise to restore the sector to its normal position, and returns the pitman 663 to its normal position. Withdrawal of the pitman 663 enables the spring 668 to rock the tensioning arm 667 counter-clockwise therewith. During an operation of the machine with the parts in their normal positions, the link 672 slides idly relatively to the stud 670. On such operations, that is, with the key 44 depressed, the check and permanent record hammer is free to operate to take both impressions, the first on the "permit ticket", and the second on the permanent detail record strip.

The foregoing explains how depression of any of the transaction keys 45, 46 and 47 prevents the first of the two successive impression strokes of the printing hammer 613, the idea being to prevent an impression on the "permit ticket" strip which is printed by the first of the two hammer blows.

It is also desired that no blank portion of the "permit ticket" strip be fed out of the machine, and yet, during the same operation, it is desired to effect a record of the operation on the permanent detail record strip and to advance such strip.

For this reason, the second impression of the printing hammer is unaffected by the hammer arresting lever 669, and hence an imprint is made on the permanent detail strip. And as one convenient means to enable the first hammer blow to impress the "permit ticket" strip, and the second hammer blow to effect an impression of the types on the permanent detail record strip, there is provided the following mechanism.

Figure 26:
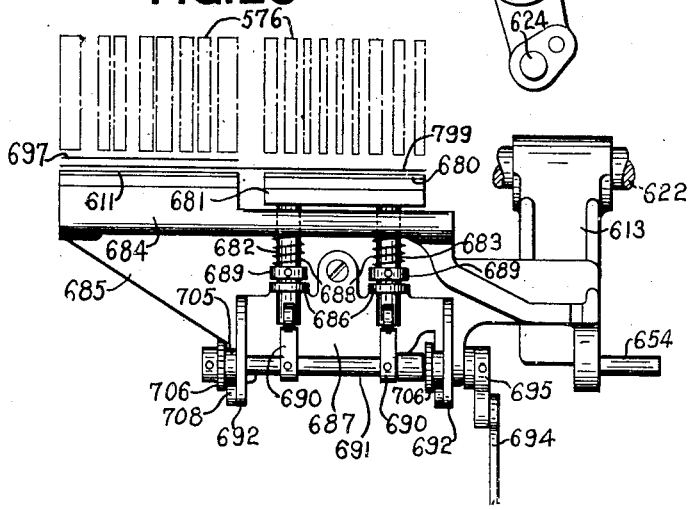
Fig. 26 is a top-plan view of the permanent detail and "permit ticket" printing hammers, showing the mechanism for withdrawing the transaction platen when printing "permit tickets".
Figure 31:
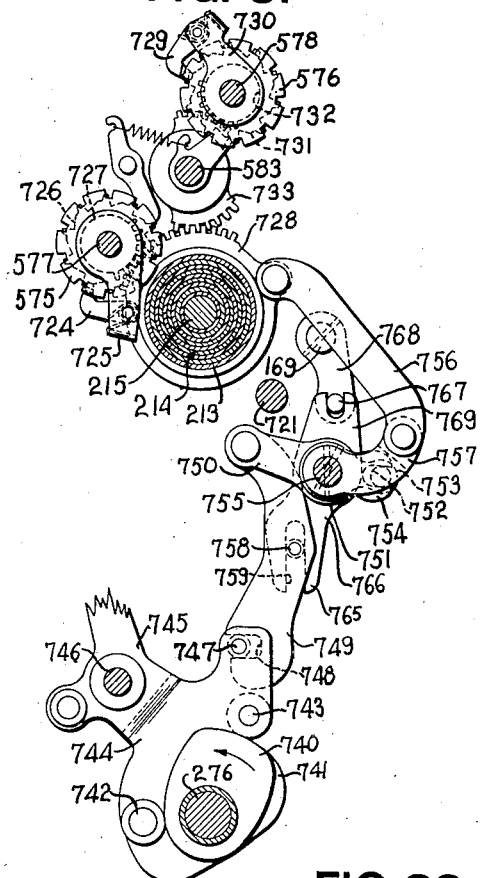
Fig. 31 is a detail view of the consecutive number operating and disabling mechanism.

For a better understanding of the machine, it should be stated that the permanent detail strip 799 is about twice as wide as the "permit ticket" strip 697 (Fig. 30), the "permit ticket" strip lying parallel with the permanent record strip and to one side of the median line thereof, as indicated in Fig. 26.

Thus there are two thicknesses or plies of paper between one side of the printing hammer 613 and the types, one of such plies only (the permanent detail strip) being wide enough to extend across the other side of the printing hammer.

Printer—Sectional hammer

The hammer arm 613 carries a laterally extending table 685 at its upper free end which projects through an opening (Fig. 23) in the printer side frame 579. This table is substantially horizontal (Figs. 25 and 26) and has a substantially vertical rib 684 along its forward edge opposite the type wheels.

For substantially half its length, the rib is channelled on its outer face to accommodate the platen 611, which is adapted to print on the permanent detail strip 799 the data shown in the left-hand column (Fig. 29), and also to print the same data on the "permit tickets" (Fig. 30) when not disabled by the arresting lever 669 just previously explained.

The forward ends of parallel plungers 682, 683 (Figs. 23–26) arranged horizontally above the table 685, project through the un-channeled section of the rib 684, and carry a channel 681 to accommodate a platen 680 adapted to print the data in the right-hand column of the permanent detail strip (Fig. 29).

The platens 611 and 680 are normally in alinement and extend across the entire series of typewheels 576.

Ears 686 extending upwardly from a bracket 687 fastened to the table 685, co-act with the rib 684 to support the plungers 682, 683, the rear ends of which lie in contact with cams 690 fast on a shaft 691 passing through slots (dotted lines, Fig. 25) in a pair of ears 692 projecting from the bracket 687.

Adjusting cams 705 journaled on the cam shaft 691 near its opposite ends, are equipped with knurled disks 706 (Fig. 24) engaged by clips 707 fastened to the table 685, the cams 705 co-acting with lateral abutments 708 on the ears 692.

Turning the adjusting cams 705 while in contact with the abutments 708 effects the adjustment of the cam shaft 691 and its cams 690, in the slots in the ears 692, to crowd the platen 680 towards the type wheels 576 or to enable the platen to recede therefrom. This arrangement enables the operator to control the pressure exerted by the platen 680 against the type wheels 576.

Springs 688 coiled about the plungers 682, 683 and compressed between the rib 684 and collars 689 fast on the plungers, tend to withdraw the adjustable platen 680 from the type wheels 576, and press the free ends of the plungers in contact with the operating cams 690.

As heretofore explained, the first blow of the printing hammer 613 causes the platen 611 to impress the "permit ticket" strip against the types 576, when the ticket strip is allowed to advance.

Of course, the left-hand section of the permanent detail strip is also forced towards the types, but since the "permit ticket" strip intervenes between the type wheels and the permanent detail strip, no ink impression is made on the latter.

The "permit ticket" is then severed and ejected from the machine, thereby uncovering the left-hand side (Fig. 26) of the permanent detail strip to the type wheels 576, so that the second blow of the impact hammer will drive the permanent detail strip against the type wheels to print the various details of the item clear across the strip, as disclosed in Fig. 29.

Obviously, if the sectional platen 680 which effects the imprint of the data on the type wheels opposite the uncovered right-hand side (Fig. 26) of the permanent detail strip, is allowed to function on the first blow of the hammer, as well as on the second blow, the data on the right-hand side would be over-printed or double-printed, and, since the data in the column of figures at the right-hand half of the permanent detail strip, (Fig. 29), that is, the transaction, consecutive number, and permit number, is not printed from the type wheels 576 on the ticket, due to the narrowness thereof, it is desirable to prevent operation of the platen 680 (Fig. 26) which normally prints this group of characters.

Therefore, means is provided to render the sectional platen 680 inoperative on the first stroke or hammer blow, when a "permit ticket" is printed, it being obvious that when the machine is operated under control of the transaction keys 45, 46 or 47, the first hammer blow is entirely eliminated.

When a "permit ticket" is to be printed, the sectional platen 680 is drawn to the rear to render it ineffective just before the first impression blow of the hammer arm 613, and is restored to its effective position after the first impression blow and before the second impression. This is accomplished through the operation of the indicator aligner shaft 426 (Figs. 7 and 24) which, it will be remembered, is rocked clockwise soon after the beginning of the operation, and then counter-clockwise shortly after the first impression has been made by the link 433 actuated by the cams 427 and 428 (Fig. 7).

The right-hand end of the indicator aligner shaft 426 (Fig. 24) extends through the indicator side frame 36 on the right side frame 30, and carries an arm 693 fast thereon, connected by a link 694 to an arm 695 fast on the cam shaft 691. The shaft 426, on its clockwise movement at the beginning of the operation of the machine, through this linkage, rocks the cam shaft 691 clockwise (as viewed in Figs. 24 and 25) to remove the cams 690 from behind the rear ends of the plungers 682 and 683, whereupon the springs 688 force the plungers towards the rear, carrying the channel bar 681 and the platen 680 therewith until arrested by the cross rib 684. Then, when the hammer is propelled against the type wheels 576 to make the first impression on the issuing "permit ticket", only the platen 611 comes into contact with the type wheels to print the "zone", "weight", "postage", and "insurance" or "C. O. D." on the ticket.

Shortly after the first impression blow, and before the second impression blow of the hammer arm 613, the cams 427—428 rock the shaft 426 counter-clockwise to reengage the aligner detents 425 (Fig. 7) with the indicator gears 419, and, through the arms 693 and 695, and the connecting link 694, the shaft 426 rocks the cam shaft 691 and its cams 690 counter-clockwise to force the plungers 682 and 683 forwardly, returning the platen 680 to its effective position so that when the hammer is rocked to take the second imprint, both platens 611 and 680 strike the type wheels 576 and print both groups or columns of figures on the permanent record strip 799 (see Fig. 29).

*Printer—Ticket feed cylinder*

The "permit tickets" are formed from a supply roll 697 (Fig. 23) of paper about half the width of the permanent detail strip and preferably having its rear face coated with a suitable adhesive. This gummed paper strip roll is supported in the machine on a stud 698 projecting from the printer side frame 579 near the base of the machine.

The free end of the "permit ticket" strip is led upwardly between suitable feed rolls, only one of which, 699, is shown. This roll 699 is a feed and electro cylinder of the usual type suitably supported in the printing mechanism, and is rotated to feed the web from the roll 697 upwardly between the type wheels 576 and the platen 611 to receive impressions, after which the printed ticket is severed therefrom and ejected from an aperture in the top of the cabinet.

This ticket printing and issuing mechanism is substantially the same in structure and operation as that disclosed in the Robertson Patent No. 1,816,263, and in Patent No. 1,843,982 issued to Walter J. Kreider on February 9, 1932. Therefore, only a brief description of the mechanism is included in this specification.

An impression roller (not shown herein) presses the gummed strip against the electro cylinder 699, which makes one rotation counter-clockwise at each operation at which a "permit ticket" is issued. The cylinder 699, as it feeds the ticket strip upwardly past the printer hammer 613, also impresses the date and consecutive number of the ticket on the strip, from type wheels mounted in the cylinder and which rotate therewith in a well known manner. The date type wheels (not shown) are set manually by a series of knobs 700 (Fig. 23) projecting from the ends of nested tubes extending through the cylinder end wall, which tubes have gears (not shown) on their inner ends cooperating with the date type wheels, also not shown. A knob 701 is secured to the end of a consecutive number reset shaft (not shown) which also extends into the printing and feed cylinder, to enable the shaft to turn the consecutive number type wheels to zero in a manner old and well known in the art.

The impression roller (not shown) is normally spring-pressed against the periphery of the feed cylinder, but is adapted to be manually released therefrom to thread the end of the strip between the cylinder and roll, by rocking a release lever 702 pivoted on a stud 703 projecting from the bracket 217. The outer arm of the lever 702 carries a conveniently bent ear for use as a handle, the remaining arm of the release lever carrying a stud 704 which projects through a horizontal slot in a slide 710, the latter being guided by the stud 703 and a stud 711 also projecting from the bracket 217. The lever 702, when rocked clockwise, raises the slide 710 which carries a stud 712 on its lower end, the stud 712 projecting through a slot in the printer bracket 217 to release the pressure roll (not shown).

An ink roll 713 (Fig. 23) carried in a pair of arms 714, only one of which is shown herein, is spring-pressed against the electro carried by the cylinder 699 to ink the electrotype, and the date and consecutive number type wheels, whereby the "permit number" and other data of a permanent or unchanging nature is printed on the "permit ticket".

Figure 25:
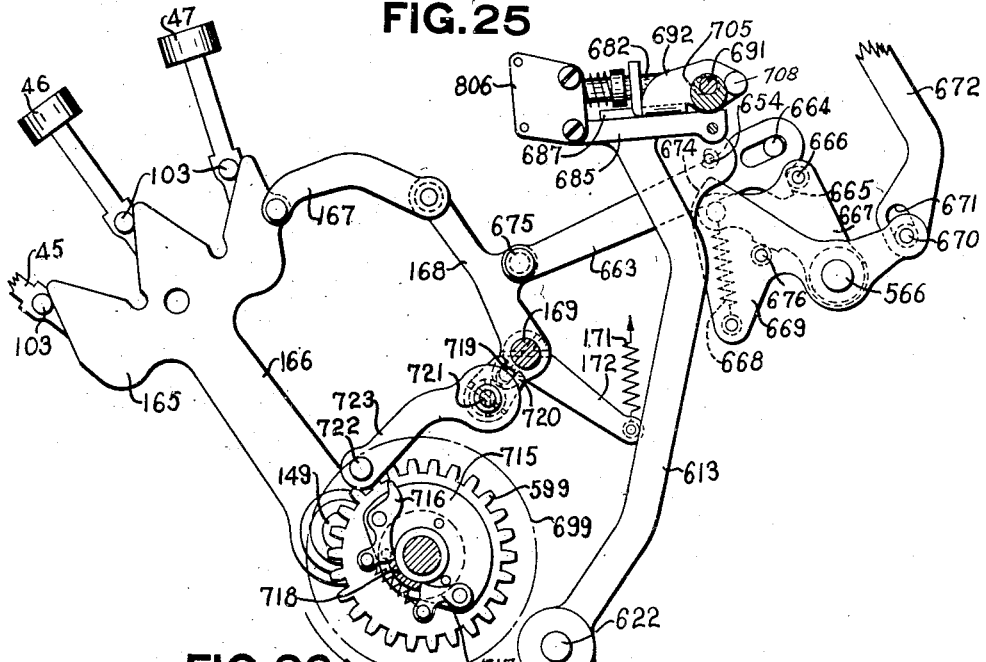
Fig. 25 is a detail view of the mechanism for disabling the detail record and "gummed label" or "permit ticket" printing hammer when depressing certain transaction keys.

The cylinder 699, the outline of which is shown in dot and dash lines in Fig. 25, is rotated by the gear 599, to one side of which is secured a mutilated disk 715 carrying a driving pawl 716 and a retaining pawl 717. These pawls cooperate with a lug 718 (shown in cross-section only) projecting from the inner end of the cylinder 699. This mechanism is plainly disclosed in Robertson United States Letters Patent, No. 1,795,509. As the disk 715 rotates, it can be seen that the pawl 716 drives the lug 718 and turns the electrocylinder 699 to feed the ticket web and print thereon from the electrotype.

It will be remembered, however, that at certain operations of the machine it is desirable to prevent the issuance of a "permit ticket", such operations, as for instance, "list cancellation", "transfer total", and "totalizing operations," and in fact, in the present machine at any operation which does not register the data concerning a parcel to be mailed. For this reason, mechanism is provided to disable the electro cylinder on such operations.

It will be remembered that any one of the three upper transaction keys 45, 46 or 47, when depressed, operates the control sector 165, link 167, and rocks the lever 168 and ticket issuing shaft 169 clockwise (see Fig. 25) to disable the ticket and permanent detail strip hammer on the first impression. A stud 719 (Fig. 25) on the tail of the arm 168, close to the shaft 169, projects through a bifurcated arm 720 fast on a short shaft 721 journaled in the frames 30 and 579 and in the bracket 170 (Fig. 33). The shaft 169, on its clockwise rotation (Fig. 25), to disable the ticket printing hammer, rocks the arm 720 and the shaft 721 counter-clockwise. An arm 723 fast to and projecting forwardly from the shaft 721 carries a stud 722 which, upon the counter-clockwise travel of the shaft 721, enters the path of the tail on the drive pawl 716, so that when the gear 599 and its mutilated disk 715 carrying the drive pawl, rotate, the tail of the drive pawl contacts the stud 722, and cams itself out of cooperative relation with the lug 718 before the latter has been appreciably advanced, so that the pawl rotates idly with the disk 715, leaving the electrocylinder 699 in a state of rest throughout the operation.

As soon as the depressed transaction key 45, 46 or 47 is released, the spring 171 restores the ticket issuing shaft 169 and its connected parts to their normal positions, rocking the stud 722 clockwise out of the path of the tail of the driving pawl 716. In this position, the pawl is free to drive the cylinder at the next operation of the machine.

Total lever control of ticket printing and issuing mechanism

The total lever 57, when adjusted out of its normal "add" position to either of its "read" or "reset" positions, sets a type carrier in the printing mechanism to cause symbols to be printed on the several record materials to identify the operations as either total or sub-total operations. To enable the total lever to set the type carriers, a sector gear 211 (Fig. 14), projecting upwardly from the total lever, meshes with the partial gear 212 secured to one end of a tube 213, the tube being one of a plurality of nested tubes 214 surrounding the shaft 215 supported in the left side frame 31, and extending through the printing mechanism where it is journaled in a printer plate 217 (Fig. 23).

When operating the machine under control of the total lever to "read" or "reset" the totalizer, it is not desired to print and issue postage "permit tickets". Mechanism is, therefore, provided, under the control of the total lever, to disable the ticket printing and issuing mechanism, when the total lever is moved to either its "read" or "reset" position.

A cam 218 (Fig. 14), journaled on the tube 213, is connected by a sleeve 219 with and turned by the partial gear 212. The cam 218 cooperates with an anti-friction roller 224 on an arm 225 fast on the shaft 169 controlled by the transaction keys 45, 46 and 47, and extending into the printing mechanism to control the "permit ticket" printing and issuing mechanism.

The total lever 57, when adjusted to one of its totalizing positions, rocks the partial gear 212 and cam 218 counter-clockwise. The cam rocks the arm 225 and shaft 169 (Fig. 25) clockwise to thrust the pitman 663 rearwardly. The shoulder 665 of the pitman, which is in contact with the stud 666 on the tensioning arm 667, rocks the arm clockwise to tension the spring 668, so that when the link 672 frees the arresting lever 669 for operation, the spring 668 will rock the lever to interpose its broad end 674 in the path of the stud 654 to prevent the retraction of the printing hammer 613, in the same manner as when any of the transaction keys 45, 46 and 47 are operated.

The pitman 663 remains in its effective position, as long as the total lever 57 remains in either its "read" or "reset" position.

The ticket-issuing control shaft 169 also rocks the arm 168, (Figs. 7 and 25), which, through the link 167, rocks the control sector 165 clockwise. If one of the keys 45, 46 or 47 was depressed before the total lever 57 was adjusted to one of its totalizing positions, the shaft 169 will have been rocked clockwise by the sector 165 and link 167, and will have rocked the roller 224 clockwise away from the periphery of the cam 218, in which case, the subsequent adjustment of the total lever merely rocks the lobe of the cam 218 under the roller.

The total lever 57, when restored to its "add" position after a totaling operation, of course, rotates the cam 218 clockwise to normal, thereby removing the lobe of the cam 218 from beneath the roller 224. If, at this time, the arm 225 is not held up by the sector 165 under the influence of a depressed transaction key 45, 46 or 47, the spring 171 (Figs. 7, 14 and 25) rocks the ticket issuing control shaft 169 counter-clockwise until the roller rests upon the concentric periphery of the cam 218.

The total control lever 57 (Fig. 14) acting through the cam 218 and arm 226, also rocks the ticket issuing shaft 169 to disable the ticket hammer and the feed and electrocylinder 699, in the same manner as described above in connection with the transaction keys 45, 46, 47.

Printer—Consecutive number

Certain of the type wheels 575—576 are grouped separately to form the consecutive number type wheels, the units wheels of which are advanced one step at each operation of the machine to print the consecutive number of the "permit ticket" issued, on the issuing detail strip 770 and on the ticket strip and permanent detail strip, respectively.

In the instant invention, it is only intended that the consecutive number be advanced when a "permit ticket" is issued, and for this reason, means to be described later, is provided to disable the consecutive number advancing means on those operations during which "permit tickets" are not issued.

A spring-pressed tined pawl 724, pivotally mounted in a yoke 725, pivoted on the totalizer rod 577, cooperates with a series of ratchets 726, one secured to each of the consecutive number type wheels 575 on this totalizer rod. A small segmental gear 727 secured to the inner face of one arm of the yoke 725, (Fig. 31), meshes with a partial gear 728 journaled on the tube 213. Likewise, a spring-pressed tined pawl 729 carried by a yoke 730 journaled on the totalizer rod 578, cooperates with a series of ratchets 731, the individual ratchets of the series being fast to the sides of the respective consecutive number printing type wheels 576. A small segmental gear 732, fast to the inner face of one arm of the yoke 730 behind the group of type wheels 576 (Fig. 31), meshes with a mutilated gear 733 journaled on a stud 583. This mutilated gear 733 also meshes with the partial gear 728 which is turned first counter-clockwise, to rock the yoke 725 to advance the consecutive number type wheel 575 of lowest order one step in clockwise direction, and through the mutilated gear 733 and partial gear 732, rocks the yoke 730 counter-clockwise to advance the lowest order consecutive number type wheel 576 one step in counter-clockwise direction.

The means for driving the partial gear 728 includes a pair of cams 740 and 741 (Fig. 31) fast on the drive shaft 276, which makes one rotation in counter-clockwise direction at each operation of the machine. These cams cooperate with a pair of rollers 742 and 743 on the forked arm 744 of a three-armed lever 745 pivoted on a stud 746 supported in the side frames 30 and 579, and rock the lever 745 first clockwise, and then counter-clockwise, at each operation of the machine.

A stud 747 on the forked arm 744 projects through an open slot 748 in the lower end of a link 749 depending from an arm 750 of a lever 751 journaled on a stud, indicated in Fig. 33, supported in the side frame 30. A stud 752 on the other arm 753 of the lever 751 projects through a bifurcated arm 754 fast on the end of a shaft 755, journaled in the side frame 579 and the printer bracket 217, the shaft 755 being in axial alignment with the stud supporting lever 751, (Fig. 33). A link 756 connects an arm 757 fast on the shaft 755 just outside the side frame 579, with the partial gear 728.

The forked arm 744, when rocked by the cams 740—741, actuates the linkage just described to rock the partial gear 728 and advance the consecutive number type wheels 575 and 576 one step at each operation of the machine. A stud 758 on the link 749 projecting into a substantially vertical slot 759 in an arm 765 of a lever 766 journaled on the stud (not shown), which supports the lever 751, guides the link 749 and at the same time holds the notch 748 therein in co-operative relation with the stud 747 and the forked arm 744 of the lever 745.

Printer—Consecutive number disabling mechanism

It is the purpose of the consecutive numbering device to count and print the serial numbers of "permit tickets" issued by the machine, and, the cams 740 and 741 rotate at each operation of the machine to effect such imprints. It is desirable at times, to prevent the actuation of the consecutive number printers, which are also step-by-step counters, to which end, means is provided to disable the consecutive number operating means to prevent the addition of "1" on the consecutive number type wheels when the machine is operated for transactions other than "permit ticket" issuing operations, such as "list cancellation" and "transfer total" operations, or "totalizing" operations.

These operations, it will be remembered, are effected under the control of the "List cancellation" key 45, the "Group total" keys 46 and 47, and the total control lever 57, respectively. Also, it will be remembered that depression of any one of the keys 45, 46 or 47 (see Figs. 7 and 25), or the adjustment of the total control lever 57 (Fig. 14), rocks the ticket issuing shaft 169 (Figs. 7, 14, 25, 31 and 33) in clockwise direction to disable the upper or "permit ticket" and permanent detail hammer, (Fig. 24), and to disable the ticket web and electrocylinder 699 (Fig. 23). An arm 768 (Fig. 31) is fast on one end of the ticket issuing shaft 169 outside of the frame 30 (see also Fig. 33).

A stud 767 on the arm 768 projects through the bifurcated end of an arm 769 of the lever 766, and upon depression of any of the transaction keys 45, 46 or 47, or adjustment of the total control lever 57 out of its "add" position, the shaft 169 actuated thereby, will rock the lever 766 counter-clockwise, and due to the pin and slot connection 758, 759 between the arm 765 and the link 749, the pending link 749 will be rocked counter-clockwise to disengage the notch 748 therein from the stud 747 in the forked arm 744, to disable the drive connection between the cams 740, 741 and the pawls 724, 729 which actuate the consecutive number printing wheels.

When the key 45, 46 or 47 is released, or the total control lever 57 is restored to the "add" position, the spring 171 rocks the ticket-issuing shaft 169 counter-clockwise to restore the lever 766 and re-engage the link 749 with the stud 747, to enable the consecutive number type wheels 575 and 576 to be advanced one step at the next succeeding operation of the machine.

Printer—Issuing detail strip feed

In addition to operating the consecutive number numbering mechanism, the cams 740 and 741 operate mechanism to feed the issuing detail strip and the permanent record strip, and mechanism (not shown) to feed the ink ribbon 585 (Fig. 24).

A supply of issuing detail paper of the desired width is unwound from a supply roll 770 (Figs. 23 and 28) rotatively mounted on a stud 771 projecting from the side frame 579. After leaving the roll 770, the issuing detail strip 772 passes into a chute 773, (Fig. 28), suitably supported in the printing frame. The strip 772 passes between the feed roller 774 and a tension roller 776. The feed roller is rotatively mounted on a stud 775 projecting from the frame 579, and having its outer end supported in a bracket 791 suitably supported on studs projecting from frame 579. The tension roller 776 is carried by a pair of arms 777 swung from a short shaft 778 journaled in the side frame 579 and in the bracket 791 (Fig. 23). Each of the arms 777 is provided with a spring 779 to press the tension roller 776 against the feed roller 774 to grip and feed the strip 772.

A manually operated releasing arm 780, fast on the shaft 778, has a downwardly extending finger co-operating with a stud, not shown, in that arm 777 which is concealed by the arm 777 appearing in Fig. 28. A releasing finger 781, also fast on the shaft 778, cooperates with a stud 782 on the arm 777 (Fig. 28). The releasing arm 780, when depressed, rocks the shaft 778 and both arms 777 counter-clockwise to release the roller 776 from the roller 774 to permit the operator to thread the leading end of the strip therebetween, and upwardly through the chute 773 between the platen 610 (Fig. 23) and the group of type wheels 575. After the issuing detail strip paper is thus inserted in the machine, the operator releases the handle 780, whereupon the springs 779 restore the roller 776 to its normal effective position to grip the strip 772.

One arm 784 of the cam-actuated three-armed lever 744 carries a stud 783 entered in a slot in one arm of a feed lever 786 pivoted on a stud 787 extending between the side frame 579 and a bracket 790 (Fig. 23) secured to the side frame 579.

During the operation of the machine, the cams 740—741 (Fig. 28) rock the lever 744 clockwise, and the feed lever 786 counter-clockwise. A spring-pressed feed pawl 788, pivoted to the upwardly extending arm of the lever 786, (which arm is bent upwardly almost at right angles to clear the stud 771), cooperates with a ratchet 795 secured to the inner end of the issuing detail strip feed roller 774. The feed lever 786, on its counter-clockwise travel, draws the pawl 788 downwardly to rotate the ratchet 795 and the feed roller 774 one step counter-clockwise at each operation of the machine, and on its clockwise travel, the lever 786 retracts the pawl 788 preparatory to another feeding operation.

A spring-pressed dog 796 pivoted on a stud projecting from the frame 579, also cooperates with the ratchet 795 to prevent retrograde movement of the feed roller 774.

The issuing detail strip passes upwardly out of the upper end of the chute 773 which protrudes beyond the cabinet 38, and passes over a stationary knife blade 797 (Fig. 23) across which the operator may draw the detail strip to sever the desired portion from the strip.

A flat key 798 (Figs. 1 and 23) which projects outwardly through an aperture in the cabinet 38, forms a convenient means to enable the operator to manually rotate the feed roller 774 to advance the issuing detail paper, to bring the last printed item thereon above the knife blade 797.

*Printer—Permanent detail paper feed*

The permanent detail strip indicated at 799 (Fig. 27), is unwound from a supply roll 800 rotatively mounted on a stud 801 projecting from the printer frame 579. This paper is not fed from the machine, but is located at a point inaccessible to the operator, and is wound on a receiving roll 802, rotatively mounted on a stud 803, suitably supported on the frame 579 within the cabinet. After leaving the supply roll 800, the strip 799 passes over a pair of guide studs 804 projecting from the printer frame 579, and then around a pair of rollers 805 supported between a pair of brackets 806, secured to the end of the cross rib 684 on the table 685 of the ticket and permanent detail printing hammer (see Figs. 24 and 26). From the rollers 805, the strip 799 passes over a single guide stud 818, and is then wound on the receiving roll 802, which turns step by step counter-clockwise at each operation of the machine to feed the permanent detail web.

A link 807 (Figs. 2, 7 and 28) connects one arm of the feed lever 786 with a lever 808 pivotally supported at one end on a stud 809 on the printer frame 579. At the counter-clockwise travel of the feed lever 786, on its counter-clockwise travel, thrusts the link 807 to the right to rock the lever 808 clockwise.

A pawl-carrying lever 810 pivoted on the stud 803 is connected with the lever 808, by a stud 811 thereon projecting through a notch 812 in the lever 808, the pawl-carrying lever 810 being rocked counter-clockwise and then clockwise by the lever 808, to cause a spring-pressed feed pawl 813 pivoted on the lever 810 to engage a ratchet 814 secured to the inner end of the receiving roller 802 and advance this roller one step at each operation of the machine, to present a blank space on the permanent detail strip 799 to the printing line to receive the impression of the type wheels 576. A spring-pressed retaining dog 815 pivoted on a stud in the frame 579 co-acts with the ratchet 814 to prevent retrograde movement of the receiving roller 802.

When the cams 740 and 741 rock the multiple-armed lever 745 counter-clockwise to normal position, thereby rocking the feed lever 786 clockwise, the link 807 rocks the lever 808 counter-clockwise to rock the pawl lever 810 clockwise, drawing the feed pawl 813 idly over the ratchet 814 to its normal position wherein said pawl rests behind the next succeeding ratchet tooth.

A flat key 816 (Fig. 23) may project outwardly through an aperture in a normally locked door 817, (Fig. 1), to permit the operator to advance the strip 799 by manually rotating the feed roller 802.

*Printer—Paper slackening device*

The permanent detail strip 799 passes around its printing hammer to form a loop, and it is possible that mutilation or other injury to the paper strip might occur during the printing operation, as the printing hammer delivers its impression blow, and in so doing, forces the strip against the type wheels 576.

Also, if the strip was held taut between the hammer and the supply roll 800, the hammer in delivering its impression blow, would have to overcome the inertia of the roll and draw therefrom a certain portion of the strip, which additional work might impede its operation and affect the clearness of the imprint, to prevent all of which disadvantages, a paper slackening device is provided to unwind sufficient paper from the supply roll 800 to allow free movement of the strip with the printing hammer.

To these ends, a slot 825 formed in the upper end of the lever 808 (Fig. 27) embraces a stud 826 on one arm of a lever 828, journaled on the supply roll stud 801 to rock this lever first counter-clockwise and then clockwise to normal as the cams 740—741 actuate the paper feeding mechanism. A stud 829 on the remaining arm of the lever 828 projects through a cam slot 831 in one arm 832 of a bail comprising the arms 832 and 834, carrying a rod 833, the arms being fast on a shaft 835 journaled in the frame 579 and a bracket 836 suitably supported on studs projecting from the printer frame 579.

The lever 828, as it rocks counter-clockwise, causes its stud 829 to cam the bail counter-clockwise, rocking the rod 833 downwardly between the two guide studs 804 into contact with the permanent record strip 799. Continued counter-clockwise movement of the bail carries the strip 799 downwardly between the guide studs 804, forming a bight therein, as indicated by dot-and-dash lines at 836 (Fig. 27) to unwind sufficient paper from the supply roll 800 to form enough slack to permit free action of the printing hammer and relieve the strip of any strain.

The cams 740—741 restore the levers 808, 828 to their normal positions, raising the slack-forming rod 833 from between the guide studs 804 before the printing hammer is actuated to take the impression, so that when, at the proper time, the "permit ticket" and permanent detail hammer delivers its impression blow, the guide rolls 805 carried thereby take up the slack in the strip 799, and tauten the latter, the strip then assuming a position straight across the tops of the studs 84, as indicated by the full line in Fig. 27. Now, when the hammer comes to rest in its normal position, there remains a small amount of slack in the web 799 which merely sags between the lower guide stud 818 and the receiving roll 802 to be taken up early in the next succeeding operation when the receiving roll 802 is advanced to feed the web.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed as new, is:

1. In a machine of the class described; the combination with manipulative keys; a plurality of totalizers; actuators to drive the totalizers; and manipulative means to condition the machine to take totals from the totalizers; of a slide to control the positions of the totalizers relatively to their actuators; means operable by the manipulative keys to shift the slide to select any one of the totalizers; and means cooperating with the slide when the slide is in position to select certain of the totalizers to obstruct movement of the conditioning means to total taking position.

2. In a machine of the class described, the combination with a plurality of totalizers; actuators therefor; a support for the totalizers; and means to shift the support to select any one of the totalizers for operation; of means to condition the machine to take totals from any one of the totalizers; and means controlled by the shifting means when certain of the totalizers are in selected positions, to lock the conditioning means in its normal position.

3. In a machine of the class described; the combination with manipulative devices; a plurality of totalizers; actuators relatively to which the totalizers are adapted to be shifted to select the desired totalizer for operation; and adjustable means to condition the machine to take totals from the selected totalizer; of a slide operatively connected with the totalizers; means operated by actuation of the manipulative devices to shift the slide to select the totalizer; and a link pivoted on the adjustable conditioning means and cooperating with the slide, when said slide is shifted to select certain of the totalizers, to prevent adjustment of the conditioning means to its total taking position.

4. In a machine of the class described; the combination with a plurality of totalizers shiftable to select any one of the totalizers for operation; a slide to shift said totalizers; means to actuate the slide; and an adjustable member having a normal position and a total taking position; of a shouldered link pivoted to and depending from the adjustable member, the shoulder cooperating with the slide when the slide is moved to certain of its positions, to render the total taking position inaccessible to the adjustable member.

5. In a machine of the class described; the combination with a plurality of totalizers shiftable to select any one of the totalizers for operation; a slide to shift said totalizers; means to actuate the slide; and an adjustable member having a normal position and a total taking position; of a shouldered link pivoted to and depending from the adjustable member, the shoulder cooperating with the slide when the slide is moved to certain of its positions, to render the total taking position inaccessible to the adjustable member, the link having a slot; a lever provided with a stud coacting with the slot in the link; and means to rock the lever to withdraw the link from cooperative relation with the slide to render the total taking position accessible to the adjustable member at any position of the slide.

6. In a machine of the class described; the combination with a plurality of totalizers; a slidable member to support the totalizers; a plurality of manipulative devices; means operated by the manipulative devices to slide the totalizer support to select any one of the totalizers; and adjustable means to condition the machine to add amounts onto the totalizers and to condition the machine to take totals from the totalizers; of means controlled by the conditioning means and cooperable with the totalizer sliding means to determine whether or not the adjustable conditioning means can be adjusted.

7. In a machine of the class described; the combination with a plurality of totalizers; a slidable member to support the totalizers; a plurality of manipulative devices; means operated by the manipulative devices to slide the totalizer member to select any one of the totalizers; and adjustable means to condition the machine to add amounts onto the totalizers and to condition the machine to take totals from the totalizers; of means controlled by the conditioning means and cooperable with the totalizer sliding means to determine whether or not the adjustable conditioning means can be adjusted.

8. In a machine of the class described; the combination with a group of totalizers; a slidable member to support the totalizers; means to slide the totalizer member to select any one of the totalizers; and means adjustable to a plurality of positions to condition the machine to make adding or total taking operations; of a locking device controlled by the conditioning means and cooperating with the totalizer sliding means to control movement of the conditioning means to its total taking position; and a lever to rock the locking device to ineffective position.

9. In a machine of the class described; the combination with a plurality of totalizers; and conditioning means having an adding position and a resetting position, to control the machine to accumulate amounts on the totalizers and to control the machine to reset the totalizers to zero; of means to reset the totalizers to zero and to add the amount taken from the totalizers into any selected totalizers; means controlled by movement of the conditioning means to its reset position and the selection of certain totalizers to compel the return of the conditioning means to adding position before the machine can be operated following a reset operation; and means to select the totalizer to be reset, and to select the totalizer upon which to add the total.

10. In a machine of the class described; the combination with a plurality of totalizers; actuators for the totalizers; means to select any one of the totalizers; and means to condition the machine to accumulate amounts on the totalizers and to condition the machine to reset the totalizers to zero; of means to control the actuators to accumulate the amount taken from a totalizer on a resetting operation into another totalizer; and means to compel adjustment of the conditioning means to accumulate amounts before another operation of the machine can be initiated, after a resetting operation.

11. In a machine of the class described; the combination with a plurality of totalizers; actuators for the totalizers; means to select any one of the totalizers; and means to condition the machine to accumulate amounts on the totalizers and to condition the machine to reset the totalizers to zero; of means to control the actuators to add the amount taken from a totalizer on a resetting operation into a selected totalizer; means to lock the machine, after a resetting operation, said locking means rendered ineffective only upon adjusting the conditioning means to add the total into a selected totalizer; and means under the control of the totalizer selecting means to determine the effectiveness of the lock means.

12. In a machine of the class described; the combination with a plurality of totalizers; actuators for the totalizers; means to select any one of the totalizers; and means to condition the machine to accumulate amounts on the totalizers and to condition the machine to reset the totalizers to zero; of means operable after the completion of a resetting operation to condition the actuators to add on one of the totalizers, the amount taken from the totalizer on the preceding resetting operation; and means set under the control of the conditioning means to lock the machine until the conditioning means is adjusted to cause that operation of the machine following a resetting operation to add the total on the selected totalizer.

13. In a machine of the class described; the combination with a plurality of totalizers; actuators for the totalizers; manipulative devices to select any one of the totalizers; and means to condition the machine to accumulate amounts on the totalizers, and to condition the machine to reset the totalizers to zero; of means operable after the completion of a resetting operation to control the actuators to add on one of the totalizers the amount taken from the totalizer on the preceding resetting operation; means under the control of the conditioning means to lock the machine until the conditioning means is adjusted to cause that operation of the machine, after a resetting operation, to add the total into a selected totalizer; and means under the control of certain of the manipulative devices to render the locking means ineffective.

14. In a machine of the class described; the combination with a plurality of totalizers; actuators for the totalizers; manipulative devices to select any one of the totalizers; and means to condition the machine to accumulate amounts onto the totalizers, and to condition the machine to reset the totalizers to zero; of means to control the actuators to add the amount taken from certain of the totalizers into a selected totalizer on resetting operations; and means under control of the conditioning means to lock the machine against release for operation until the conditioning means is adjusted to a predetermined position after certain reset operations.

15. In a machine of the class described; the combination with a plurality of totalizers; actuators for the totalizers; means to select any one of the totalizers; and a conditioning means adjustable to condition the machine, having an adding position and a resetting position; of means set under the control of the totalizer wheels, as the wheels are reset to zero on resetting operations, to subsequently control the actuators to add the total on certain of the totalizers previously selected by the selecting means; means under the control of the conditioning means to prevent operation of the machine, following certain resetting operations until the conditioning means is moved to its adding position; and means under the control of the totalizer selecting means to determine the effectiveness of the preventing means.

16. In a machine of the class described, equipped with drive mechanism; the combination with totalizers; actuators therefor; means to select a totalizer for operation; and a conditioning means adjustable to condition the machine, having an adding and a resetting position; of means under the control of the totalizer as it is cleared on resetting operations, to control the actuators to add the total on a selected totalizer; and means under control of the drive mechanism to lock the machine against operation following a resetting operation, said lock adapted to be moved to ineffective position only when the conditioning means is adjusted into its adding position.

17. In a machine of the class described; the combination with a plurality of totalizers; actuators for the totalizers; means to select any one of the totalizers; and conditioning means having an adding position and a resetting position; of means differentially set on resetting operations to control the actuators; and means released by the conditioning means as the latter is adjusted to its resetting position, to lock the machine at the end of certain resetting operations, said locking means adapted to enforce the adjustment of the conditioning means to a predetermined position before the machine can be operated following a resetting operation.

18. In a machine of the class described; the combination with totalizers; actuators for the totalizers; means to select any one of the totalizers; and conditioning means having an adding position and a resetting position; of means set differentially on resetting operations to control the actuators to add the totals into a selected totalizer; means under the control of the conditioning means to lock the machine after a resetting operation, said lock means adapted to be released by the conditioning means only when adjusted to adding position; and differentially controlled means to determine the effectiveness of the locking means.

19. In a machine of the class described, including a drive shaft, the combination with a totalizer; and means to condition the machine to add on the totalizer, or to reset the totalizer; of means including a device to lock the machine when the totalizer has been reset, said lock adapted to be released only upon conditioning the machine to add after the totalizer has been reset.

20. In a machine of the class described, including a drive shaft, the combination with a totalizer; and means to condition the machine to add on the totalizer, or to reset the totalizer; of means set by the conditioning means to lock the machine when the totalizer has been reset, said lock adapted to be released only upon conditioning the machine to add after the totalizer has been reset.

21. In a machine of the class described, including a drive shaft, the combination with a totalizer; and means to condition the machine to add on the totalizer, or to reset the totalizer; of means set by the conditioning means and controlled by the drive shaft, to lock the machine when the totalizer has been reset, said lock adapted to be released only upon conditioning the machine to add after the totalizer has been reset.

22. In a machine of the class described, the combination with totalizers; selecting means therefor; and means to condition the machine to add amounts onto the totalizers, or to reset the totalizers; of means controlled by the conditioning means to lock the machine following a resetting operation, said lock adapted to be rendered ineffective only by adjusting the machine for the performance of an adding operation immediately following certain resetting operation.

23. In a machine of the class described, the combination with totalizers; selecting means therefor; and means to condition the machine to add amounts onto the totalizers, or to reset the totalizers; of means controlled by the conditioning means, to become effective upon the resetting operation to prevent further operation of the machine while the conditioning means is in its reset-controlling position, said last named means rendered ineffective by the conditioning means when moved to add position preparatory to the next succeeding operation, to add the total into a selected totalizer.

24. In a machine of the class described; the combination with totalizers; selecting means therefor; and means to condition the machine to add amounts onto the totalizers, or to reset the totalizers; of means controlled by the conditioning means to prevent any operation except an adding operation following certain resetting operations; means, operable on said adding operations, to add the total into a selected totalizer;

and means controlled by the totalizer selecting means to determine which of the resetting operations shall be followed by such an adding operation.

25. In a machine of the class described; the combination with totalizers; selecting means therefor; and means to condition the machine to make adding or resetting operations; of means controlled by the conditioning means to prevent any operation except an adding operation following certain resetting operations; means operable on such compulsory operations to add the total into a selected totalizer; and differential means positioned on resetting operations to determine if said resetting operation shall be followed by a compulsory operation.

26. In a machine of the class described; the combination with totalizers; totalizer-selecting means; and means to condition the machine to make adding operations or resetting operations; of means set under the control of the conditioning means during a resetting operation to prevent any operation except an adding operation following said resetting operation; means to maintain the last named means in such position at the end of a resetting operation; and means, effective on the last named adding operation, to add the total on the selected totalizer.

27. In a machine of the class described; the combination with totalizers; totalizer-selecting means; and means to condition the machine to make adding or resetting operations; of means, set under the control of the conditioning means as the conditioning means is adjusted to condition the machine to make resetting operations, to prevent any operation except an adding operation following a resetting operation; means effective during the said adding operation to add the total into a selected totalizer; and means set differentially at the resetting operation to determine if said resetting operation is to be followed by an adding operation.

28. In a machine of the class described; the combination with a totalizer; and means to condition the machine to make adding or resetting operations; of spring-urged means, having an ineffective position and an effective position, to prevent any operation of the machine except an operation of a predetermined character following a resetting operation; and means under the control of the conditioning means to restrain the compelling means in ineffective position.

29. In a machine of the class described; the combination with a totalizer; and means to condition the machine to make adding or resetting operations; of means to prevent any operation of the machine except an operation of predetermined character following a resetting operation; means operated by the conditioning means, as the latter is adjusted to its reset position, to free the preventing means for operation; and other, separately controlled means, superseding the means to free the preventing means, to retain the preventing means in its original position.

30. In a machine of the class described; the combination with a totalizer; and means to condition the machine to make adding or resetting operations; of means to prevent any operation except a predetermined operation of the machine following a resetting operation; means to retain the preventing means idle; and means operated by the conditioning means, as the latter is adjusted to condition the machine to make resetting operations, to release the preventing means.

31. In a machine of the class described, the combination with means adjustable to condition the machine to make adding or resetting operations; of means to prevent any operation except an operation of predetermined character of the machine following a resetting operation; means to restrain the preventing means; means operated by the conditioning means, adjusted to resetting position, to move the restraining means to release the preventing means; means to actuate the preventing means when freed for operation; and other, separately controlled means to retain the preventing means.

32. In a machine of the class described; the combination with means to condition the machine for adding or resetting operations; of means to prevent the performance of any except a particular operation of the machine following a resetting operation; means to restrain the preventing means; means actuated by the conditioning means, when adjusted to resetting position, to disable the restraining means and free the preventing means for operation; means to shift the preventing means to effective position; and a differentially controlled member to determine if the preventing means shall become effective.

33. In a machine of the class described; the combination with means to condition the machine for adding or resetting operations; of means to prevent the performance of any except a particular operation following a resetting operation; means to restrain the preventing means; means actuated by the conditioning means, when adjusted to resetting position, to disable the restraining means, and free the preventing means for operation; means to shift the preventing means to effective position; a second means to restrain the preventing means in its ineffective position, notwithstanding the release of the retaining means; and differential means to control the effectiveness of the second-named means.

34. In a machine of the class described; the combination with means to condition the machine for adding or resetting operations; of means to prevent the performance of any except a particular operation following a resetting operation; means, controlled by the conditioning means, to retain the preventing means ineffective; means to move the preventing means to effective position; and other means to temporarily restrain the preventing means in ineffective position after the retaining means is disabled.

35. In a machine of the class described; the combination with a conditioning means having an adding position or a resetting position; of a means to prevent the performance of any except a particular operation following a resetting operation; means to retain the preventing means ineffective; means actuated by the conditioning means, when adjusted to resetting position, to disable the retaining means; means to shift the preventing means to effective position; other means to restrain the preventing means in its ineffective position; and rotatable means to determine the effectiveness of the last-named restraining means.

36. In a machine of the class described; the combination with means to condition the machine for adding or resetting operations; of means to prevent the performance of any except a particular operation following a resetting operation; means to move the preventing means to effective position; normally effective means controlled by the conditioning means to retain the preventing means in ineffective position; a second means to maintain the preventing means out of its effective position; and means, operated as an incident to the operation of the machine, to displace the second means to maintain the preventing means out of its effective position.

37. In a machine of the class described; the combination with means to condition the machine for adding or resetting operations; of means to prevent the performance of any except a particular operation following a resetting operation; normally effective means to retain the preventing means in ineffective position; means to restrain the preventing means ineffective after the first-named retaining means is disabled; means controlled by the conditioning means to disable the first-mentioned retaining means before the resetting operation; and means to displace the second-mentioned restraining means during the resetting operation.

38. In a machine of the class described; the combination with means to condition the machine for adding or resetting operations; of means to prevent the performance of any except a particular operation following a resetting operation; means, controlled by the conditioning means, to normally retain the preventing means in ineffective position; a flange to restrain the preventing means in ineffective position subsequently to its release from the first-named retaining means; and means to move the flange away from the preventing means to release the preventing means for operation.

39. In a machine of the class described, the combination with means to condition the machine for adding or resetting operations; of means to prevent the performance of any except a particular operation following a resetting operation; means, controlled by the conditioning means, to normally retain the preventing means ineffective; and means to temporarily restrain the preventing means in its ineffective position immediately after the retaining means is disabled, and to lock the preventing means in its effective position later in the operation of the machine.

40. In a machine of the class described, the combination with means to condition the machine for adding or resetting operation; of means to prevent the performance of any except a particular operation following a resetting operation; means, controlled by the conditioning means, to normally retain the preventing means ineffective; and means to lock the preventing means in effective position intermediate the resetting operation and the particular enforced operation designed to succeed the resetting operation.

41. In a machine of the class described; the combination with conditioning means having an adding position or a resetting position; of means to prevent the performance of any except at operation of a predetermined character following a resetting operation; an arm to normally restrain the preventing means in ineffective position; a circular flange having an opening therein, to restrain the preventing means in ineffective position when the normal restraining arm is released; means operated by the conditioning means to disable the restraining arm; means to rotate the flange to release the preventing means for operation; and separate means to control the effectiveness of the preventing means, said separate means superseding the foregoing restraining means.

42. In a machine of the class described; the combination with conditioning means having an adding position and a resetting position; of means to prevent the performance of any except an operation of a particular kind, following a resetting operation; means controlled by the conditioning means to normally restrain the preventing means in ineffective position; a flange having an opening therein, to temporarily restrain the preventing means in ineffective position subsequent to its release by the normal restraining means; means to rotate the flange to release the preventing means; other means, superseding the restraining means, to latch the preventing means in its ineffective position and differentially adjustable means to determine the effectiveness of the latching means.

43. In a machine of the class described; the combination with conditioning means having an adding position and a resetting position; of a lever to prevent the performance of any except a particular operation, following a resetting operation; means to normally retain the lever in its ineffective position; a partial flange to temporarily restrain the lever in its ineffective position subsequently to its release by the normal retaining means; and means to shift the flange to free the lever for operation.

44. In a machine of the class described; the combination with conditioning means having an adding position and a resetting position; of a lever to prevent the performance of any except a particular operation, following a resetting operation; means to normally retain the lever in its ineffective position; a partial flange to retain the lever in its ineffective position subsequently to its release by the normal retaining means; means to shift the flange to free the lever; and additional means, superseding the restraining means, to control the effectiveness of the lever.

45. In a machine of the class described; the combination with conditioning means having an adding position and a resetting position; of means to prevent the performance of any except a particular operation, following a resetting operation; means to normally retain the preventing means in ineffective position; a gear having a partial flange thereon, the flange being effective to temporarily restrain the preventing means in ineffective position subsequently to its release by the normal retaining means; means, operated by adjustment of the conditioning means to resetting position, to disable the normally effective retaining means; and means to rotate the gear to rotate the restraining flange from the path of the preventing means, to free the preventing means for operation, the flange subsequently engaging the preventing means to retain it in its effective position.

46. In a machine of the class described; the combination with means to condition the machine for adding or resetting operations; of means to prevent the performance of a particular operation following a resetting operation; means to normally retain the preventing means in ineffective position; a gear having a partial flange thereon, the flange being effective to restrain the preventing means in ineffective position subsequently to the release of such means by the retaining means; means to displace the retaining means to release the preventing means; means to rotate the gear to remove the restraining flange; the flange becoming effective to hold the preventing means in its effective position; and means to positively restore the preventing means to its ineffective position.

47. In a machine of the class described; the combination with means to condition the machine for adding or resetting operations; of means to prevent the performance of any except a particular operation, following a resetting operation; means to normally retain the preventing means in ineffective position; a gear having a partial flange thereon, the flange being effective to restrain the preventing means in ineffective position subsequently to the release of the preventing means by the normal retaining means; means operated by the conditioning means to disable the retaining means; means to rotate the gear to displace the restraining flange and free the preventing means for operation; the flange adapted to restrain the preventing means in its effective position; and a cam to positively restore the preventing means to its ineffective position.

48. In a machine of the class described; the combination with means to condition the machine to make adding or resetting operations; of means to prevent the performance of any except a particular operation, following a resetting operation; amount retaining mechanism adapted to have the total taken from the totalizer during a resetting operation stored thereon; means under the control of the conditioning means to render the preventing means effective; and means under the control of the preventing means to render the amount retaining mechanism effective to add the amount thereon into a totalizer.

49. In a machine of the class described; the combination with means to condition the machine for adding or resetting operations; of means to prevent the performance of any except a predetermined operation, following a resetting operation; an amount retaining mechanism adapted to have the total taken from the totalizer during a resetting operation stored thereon; means operated by the conditioning means, when adjusted to resetting position, to release the preventing means for operation; and means actuated by the preventing means, as it shifts to effective position, to render the amount retaining mechanism effective to add the amount thereon into a totalizer.

50. In a machine of the class described, the combination with a totalizer; and means to condition the machine to reset the totalizer; means to condition the machine for automatically adding the total taken from the totalizer into another totalizer; of means, controlled by the means which conditions the machine for resetting, to prevent any operation other than the addition of said total into said totalizer subsequently to a resetting operation.

51. In a machine of the class described, the combination with a totalizer; means to condition the machine to reset the totalizer; amount retaining mechanism adapted to have the total taken from the totalizer during a resetting operation stored thereon; means to condition the amount retaining mechanism to add the amount stored thereon into another totalizer; and means, controlled by the means which conditions the machine for resetting operations, to render the retaining mechanism effective, and so maintain it in effective condition until the end of that operation succeeding a resetting operation.

52. In a machine of the class described, the combination with a totalizer; means to condition the machine to reset the totalizer; amount retaining mechanism adapted to have the total taken from the totalizer during a resetting operation stored thereon; means to condition the amount retaining mechanism to add the amount stored thereon into another totalizer; and means, controlled by the means which conditions the machine for resetting operations, to render the retaining mechanism effective, and so maintain it in effective condition until the end of that operation succeeding a resetting operation; and selective means to disable the control of the retaining mechanism by the resetting means.

53. In a machine of the class described; the combination with means to condition the machine for adding or resetting operations; amount retaining mechanism adapted to have the total taken from the totalizer during a resetting operation stored thereon; and means to normally disable the amount retaining mechanism; driving means for the disabling means; of means to lock the machine following a resetting operation; means, under the control of the conditioning means, to unlock the machine when moved to condition the machine for adding; and means controlled by the locking means to disconnect the disabling means from its driving means.

54. In a machine of the class described; the combination with means to condition the machine for adding or resetting operations; amount retaining mechanism adapted to have the total taken from the totalizer during a resetting operation stored thereon; and means to normally disable the amount retaining mechanism; of means to operate the amount retained disabling means; means to prevent the performance of any operation except a particular operation following each resetting operation; means operatively connected to the preventing means and adapted to disconnect the amount retaining disabling means and render the amount retaining mechanism effective on compulsory operations; and means to restore the preventing means to ineffective position to thereby re-connect the amount retaining disabling means with its amount retaining mechanism.

55. In a machine of the class described; the combination with means to condition the machine for adding or resetting operations; amount retaining mechanism adapted to have the total taken from the totalizer during a resetting operation stored thereon; means to normally disable the amount retaining mechanism; means operable at each operation of the machine to actuate the disabling means; means to compel the performance of a particular operation following each resetting operation before any other operation may be performed; means operated by the compelling means to render ineffective the disabling means for the amount retaining mechanism to enable the amount retaining mechanism to function on compulsory operations; and differentially controlled means to determine the effectiveness of the compelling means, and of the means for rendering the amount retaining disabling means ineffective.

56. In a machine of the class described; the combination with a manipulative device; means to condition the machine for adding or resetting operations; amount retaining mechanism adapted to have the total taken from the totalizer during a resetting operation stored thereon; and means normally effective to disable the amount retaining mechanism; of means to compel the performance of a particular operation following each resetting operation before any other operation may be performed; means to hold the compelling means ineffective; means operated by the conditioning means as the latter is adjusted to resetting position, to disable the holding means; rotatable restraining means for the compelling means; means operated as an incident to the operation of the machine to displace the rotatable restraining means; means operated by the compelling means as the latter becomes effective, to disconnect the amount retaining mechanism disabling means from its operating means; and means under the control of manipulative device to determine the effectiveness of the compelling means.

57. In a machine of the class described, the combination with means to condition the machine for adding or resetting operations; of means controlled by the conditioning means, when adjusted to its resetting position, to compel the performance of a particular operation of the machine after such resetting operation before any other operation may be performed; and means to retain the compelling means effective after the conditioning means is restored to its adding position.

58. In a machine of the class described, the combination with a totalizer; actuators therefor; manipulative amount determining devices to control the actuators; means to arrest the actuators; an amount retaining mechanism adapted to have the amount taken from the totalizer during resetting operation stored thereon; means normally effective to disable the amount retaining mechanism; means to condition the machine for adding or resetting operations, such last-named means adapted to render the actuator-arresting means ineffective; of means to compel the performance of a particular operation following a resetting operation before any other operation may be performed, such compelling means adapted to render effective the amount retaining mechanism; means to enforce the return of the conditioning means to normal position subsequently to the completion of a resetting operation and prior to the compulsory operation, means to retain the compelling means in its effective position, notwithstanding the return of the conditioning means to its normal position, to maintain ineffective the actuator-arresting means, and to continue the amount retaining mechanism in effective condition.

59. In a machine of the class described, the combination with manipulative amount determining devices; amount retaining mechanism; means normally effective to disable the amount retaining mechanism; and means to condition the machine for adding or resetting operations; of means controlled by the conditioning means, when adjusted for a resetting operation, to compel the performance of a predetermined operation following a resetting operation before any other operation may be performed, including means to lock the amount determining devices against operation; means controlled by the compelling means and the conditioning means, to lock the machine against operation following a resetting operation; and means to retain the compelling means in effective position subsequently to the return of the conditioning means to its adding position.

60. In a machine of the class described, the combination with manipulative amount determining devices; a totalizer; and actuators therefor controlled by the amount-determining devices; amount retaining mechanism; means normally effective to disable the amount retaining mechanism; and means to condition the machine for adding or resetting operations; of means controlled by the conditioning means, when adjusted for a resetting operation, to compel the performance of a predetermined operation following such resetting operation before any other operation may be performed; including means to lock the amount determining devices against operation, and means to render ineffective the disabling means; means controlled by the compelling means and released by the conditioning means, to lock the machine against operation; and means to retain the compelling means in effective position until the performance of the compulsory operation.

61. In a machine of the class described; the combination with a manipulative device having an adding position and a resetting position; and a plurality of means controlled by the manipulative device to condition the machine for adding or resetting operations; of means to compel the performance of a predetermined operation following a resetting operation before any other operation may be performed; means to retain the compelling means in effective position after the return of the manipulative device to normal; and means controlled by the compelling means to retain in effective position certain of the plurality of means controlled by the manipulative device, to enable the performance of the desired predetermined operation.

62. In a machine of the class described; the combination with adjustable means to condition the machine for adding or resetting operations; a pair of shafts rocked in opposite directions by the conditioning means, when adjusted to resetting position; of arms fast on the respective shafts; means to compel the performance of a predetermined operation of the machine following a resetting operation before any other operation may be performed; and means on the compelling means positioned between the arms, when the compelling means shifts to effective position, to prevent restoring movement of the shafts, and hence retain the mechanism controlled by the shafts in resetting position.

63. In a machine of the class described, the combination with amount retaining mechanism; means to condition the machine for adding or resetting operations, including a control member to adjust certain elements of the machine for resetting and adding operations, and set to effective position by the conditioning means when adjusted for a resetting operation; of means controlled by the conditioning means, to compel the performance of a predetermined operation following a resetting operation before any other operation may be performed; means to enforce the restoration of the conditioning means to adding positions; and means controlled by the compelling means to retain the control member in its set position, and enable the performance of the predetermined operation, subsequently to the return of the conditioning means to adding position.

64. In a machine of the class described, adapted for adding or resetting; the combination with adjustable means to condition the machine for resetting operations; of means controlled by the adjustable means to compel the performance of a particular operation following a resetting operation before any other operation may be performed; and amount retaining mechanism rendered operable by the adjustable means when conditioning the machine for resetting operations.

65. In a machine of the class described; the combination with means to condition the machine for resetting operations; amount retaining mechanism; means to disable the amount retaining mechanism; settable means to prepare the machine for resetting operations; and means operated by the conditioning means, as the latter is adjusted to resetting position, to render the settable means effective; of means to compel the performance of an operation of predetermined character, before any other operation may be performed following a resetting operation; means under the control of the conditioning means, to release the compelling means for operation; means operated by the compelling means, as the latter shifts to effective position, to render ineffective the amount retaining mechanism disabling means; and means controlled by the compelling means to hold the settable means in adjusted position when the conditioning means is shifted out of resetting position; to enable the machine to make an operation during which the amount standing on the amount retaining mechanism is added into a totalizer.

66. In a machine of the class described; the combination with means to condition the machine for adding or resetting operations; amount retaining mechanism; means normally effective to disable the amount retaining mechanism; settable means adapted to be positioned to prepare the machine for resetting operations; and means operated under the control of the conditioning means, as the latter is adjusted to resetting position, to render the settable means effective; of means to compel the performance of a particular kind of operation before any other operation may be performed, following a resetting operation; means under the control of the conditioning means to release the compelling means for operation; means operated by the compelling means, as the latter shifts to effective position, to render ineffective the amount retaining mechanism disabling means; means operable under the control of the compelling means to enforce movement of the conditioning means out of resetting position before the machine can be released for the compulsory operation; and means controlled by the compelling means to maintain the settable means in effective position when the conditioning means is shifted out of its resetting position.

67. In a machine of the class described, the combination with means to condition the machine for adding or resetting operations; amount retaining mechanism; means normally effective to disable the amount retaining mechanism; settable means adjustable to prepare the machine for resetting operations; and means operated by the conditioning means as the latter is adjusted to resetting position to render the settable means effective; of means to compel the performance of a particular operation before any other operation may be performed, following a resetting operation; means, under the control of the conditioning means, to shift the compelling means to effective position; means operated by the compelling means, as the latter shifts to effective position, to render ineffective the amount retaining mechanism disabling means; means to compel adjustment of the conditioning means out of its resetting position before the machine can operate to perform the compulsory operation; and means to retain the settable means effective notwithstanding the adjustment of the conditioning means out of its resetting position.

68. In a machine of the class described; the combination with means to condition the machine for adding or resetting operations; and amount retaining mechanism; of means to compel the performance of an adding operation of the machine before any other operation may be performed, following a resetting operation; means controlled by the conditioning means to prepare the machine for resetting operations; means necessitating the displacement of the conditioning means from its resetting position as a preliminary to such compulsory operation; and means on the compelling means to retain the preparing means effective when the conditioning means is shifted out of its resetting position.

69. In a machine of the class described; the combination with means to condition the machine for adding or resetting operations; and amount retaining mechanism; of means to compel the performance of an adding operation of the machine, before any other operation may be performed following a resetting operation; means controlled by the conditioning means to prepare the machine for resetting operations; means necessitating the displacement of the conditioning means from its resetting position as a preliminary to such compulsory operation; means controlled by the compelling means to retain the preparing means effective when the conditioning means is shifted out of its resetting position; and means to render the compelling means ineffective at the completion of the compulsory operation.

70. In a machine of the class described; the combination with means to condition the machine for adding or resetting operations; and amount retaining mechanism; of means to compel the performance of an adding operation of the machine, before any other operation may be performed following a resetting operation; means controlled by the conditioning means to prepare the machine for resetting operations; means necessitating the displacement of the conditioning means out of resetting position as a preliminary to such compulsory operation; means controlled by the compelling means to retain the preparing means effective when the conditioning means is shifted out of its resetting position; and means to hold the compelling means ineffective.

71. In a machine of the class described; the combination with a plurality of totalizers shiftable to select any one of the totalizers for operation; a slide to shift said totalizers; means to actuate the slide; and an adjustable member having a normal position and a total taking position; of a shouldered link pivoted to and depending from the adjustable member, the shoulder cooperating with the slide when the slide is moved to certain of its positions, to render the total taking position inaccessible to the adjustable member, the link having a slot; and a lever provided with a stud coacting with the slot in the link, the lever adapted to withdraw the link from cooperative relation with the slide to render the total taking position accessible to the adjustable member at any position of the slide.

72. In a machine of the class described; the combination with a plurality of totalizers; a slidable support for the totalizers; a plurality of manipulative devices; means operated by the manipulative devices to slide the totalizer support to select any one of the totalizers; and adjustable means to condition the machine to add amounts onto the totalizers or to take totals from the totalizers; of means cooperable with the totalizer support to determine whether or not the adjustable conditioning means can be adjusted.

WILLIAM H. ROBERTSON.